United States Patent [19]
Toms et al.

[11] Patent Number: 5,684,469
[45] Date of Patent: *Nov. 4, 1997

[54] METHOD OF CONFIGURING A FURNITURE UTILITY DISTRIBUTION SYSTEM

[75] Inventors: John Schackelford Toms, University Heights, Ohio; Steven M. Brown, Grand Rapids, Mich.; William L. Miller, Ada, Mich.; George V. Weller, Grand Rapids, Mich.; Scott H. Russell, Kalamazoo, Mich.; Joseph R. Branc, Grand Rapids, Mich.; David C. Sweeton, Cleveland Heights, Ohio; Matthew M. Mikolajczak, Novi, Mich.

[73] Assignee: Steelcase Inc., Grand Rapids, Mich.

[*] Notice: The term of this patent shall not extend beyond the expiration date of Pat. No. 5,530,435.

[21] Appl. No.: 475,797

[22] Filed: Jun. 7, 1995

Related U.S. Application Data

[63] Continuation of Ser. No. 165,029, Dec. 9, 1993, Pat. No. 5,530,435.

[51] Int. Cl.[6] .................................................. H04Q 1/00
[52] U.S. Cl. .................... 340/825.07; 340/310.08; 340/825.53; 52/221; 160/357; 312/223.6
[58] Field of Search .................. 340/825.07, 825.52, 340/310.08, 310.01, 825.53, 825.37; 52/239, 221; 160/135, 357; 312/223.6

[56] References Cited

U.S. PATENT DOCUMENTS

| | | |
|---|---|---|
| 4,038,648 | 7/1977 | Chesley . |
| 4,060,294 | 11/1977 | Haworth et al. ............ 52/239 |
| 4,354,226 | 10/1982 | Flickinger et al. . |
| 4,596,982 | 6/1986 | Bahr et al. . |
| 4,635,192 | 1/1987 | Ceccon et al. . |
| 4,682,457 | 7/1987 | Spencer ....................... 52/239 |
| 4,685,255 | 8/1987 | Kelley ........................ 52/221 |
| 4,792,955 | 12/1988 | Johnson et al. . |
| 4,918,690 | 4/1990 | Markkula, Jr. et al. . |
| 4,939,728 | 7/1990 | Markkula, Jr. et al. . |
| 4,941,143 | 7/1990 | Twitty et al. . |
| 4,947,484 | 8/1990 | Twitty et al. . |
| 4,955,018 | 9/1990 | Twitty et al. . |
| 4,969,146 | 11/1990 | Twitty et al. . |
| 4,969,147 | 11/1990 | Markkula, Jr. et al. . |
| 4,975,831 | 12/1990 | Nilsson et al. . |
| 4,979,107 | 12/1990 | Advani et al. . |
| 4,979,183 | 12/1990 | Cowart . |
| 5,018,138 | 5/1991 | Twitty et al. . |
| 5,029,180 | 7/1991 | Cowart . |

(List continued on next page.)

OTHER PUBLICATIONS

Hanover, George, "Networking the Intelligent Home," *IEEE*, Oct., 1989, pp. 48 and 49.

*Primary Examiner*—Brian Zimmerman
*Attorney, Agent, or Firm*—Price, Heneveld, Cooper, DeWitt & Litton

[57] ABSTRACT

A utility distribution system is provided for modular furniture of the type comprising individual furniture units which are juxtaposed to form one or more workstations. A signal conductor is positioned in each furniture unit, and extends generally between opposite sides thereof. Quick-disconnect connectors are provided at the opposite ends of each of the signal conductors, and mate with like quick-disconnect connectors in adjacent furniture units to create a communications network through the workstations. Each furniture unit has a signaler physically associated therewith, which is connected with an associated signal conductor at a coupler. A network controller is operably connected to the network to evaluate the network and/or the associated furniture units. The furniture units may be equipped with one or more utility ports, which are connected with the coupler, and service utility appliances, such as personal computers, telephones, facsimile machines, switches, power outlets, data receptacles, and the like. The utility appliances preferably have memory capability to internally store operating instructions for the same, which are transmitted to the network controller when the utility appliance is initialized.

60 Claims, 51 Drawing Sheets

U.S. PATENT DOCUMENTS

| | | |
|---|---|---|
| 5,034,882 | 7/1991 | Eisenhard et al. |
| 5,038,320 | 8/1991 | Heath et al. |
| 5,086,385 | 2/1992 | Launey et al. ............... 340/825.37 |
| 5,152,698 | 10/1992 | Juhlin et al. ............... 439/215 |
| 5,157,273 | 10/1992 | Medendorp et al. ............... 307/147 |
| 5,164,609 | 11/1992 | Poppe et al. ............... 307/147 |
| 5,268,666 | 12/1993 | Michel et al. ............... 340/310.01 |
| 5,277,006 | 1/1994 | Ruster ............... 52/239 |
| 5,341,615 | 8/1994 | Hodges et al. ............... 52/239 |

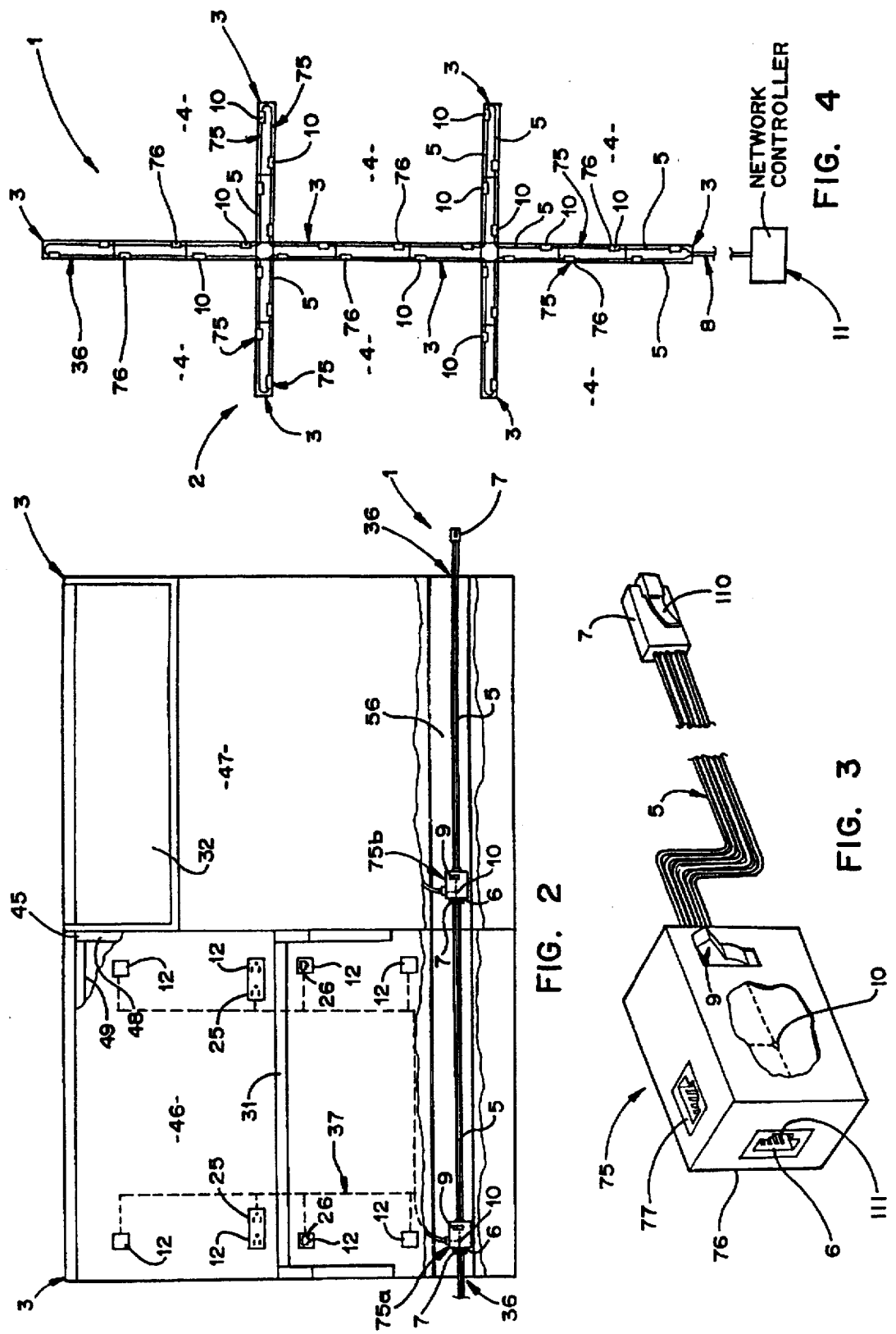

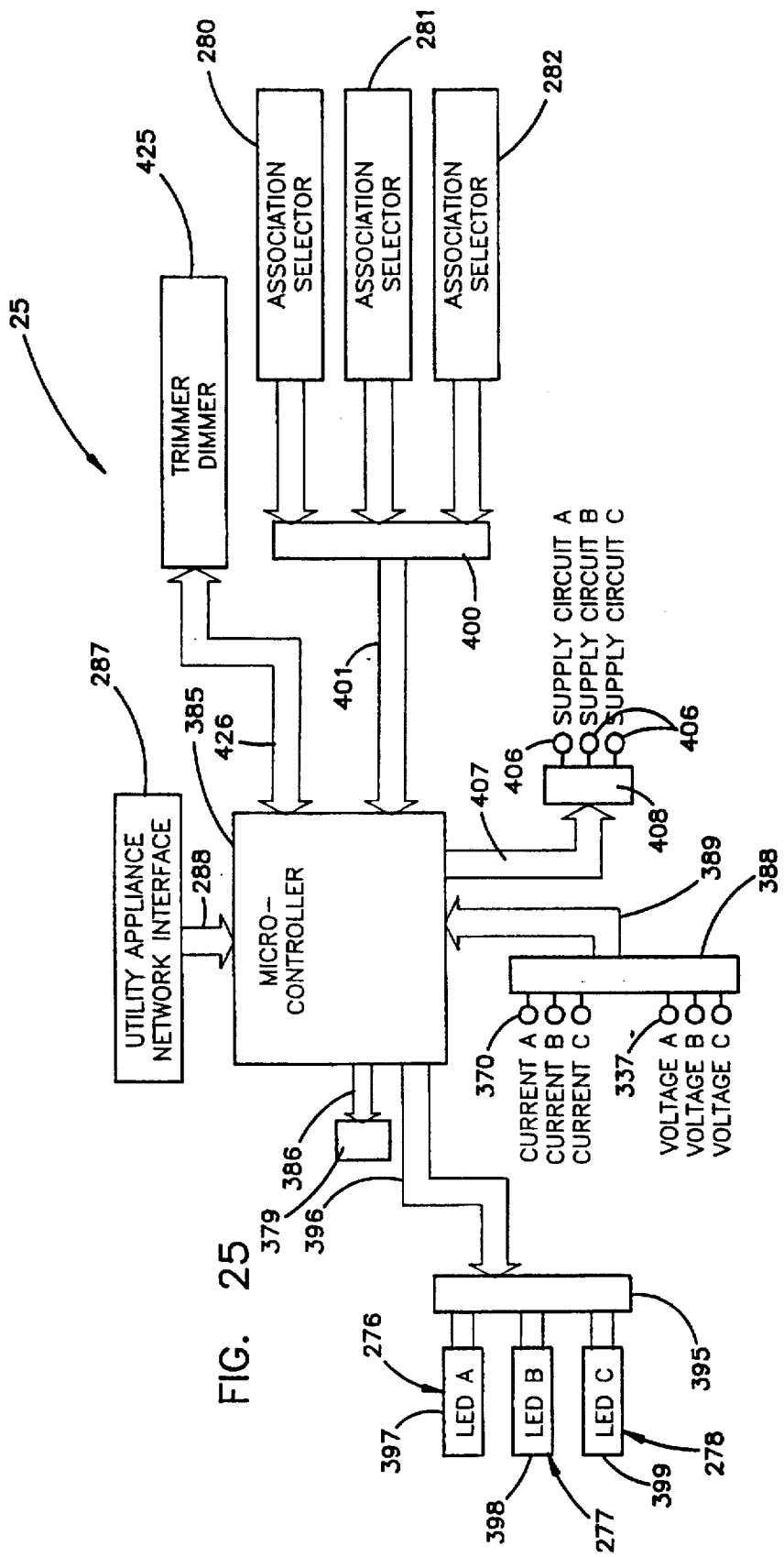

METHOD OF CONFIGURING A FURNITURE UTILITY DISTRIBUTION SYSTEM

This is a continuation of application Ser. No. 08/165,029, filed Dec. 9, 1993 now U.S. Pat. No. 5,530,435.

BACKGROUND OF THE INVENTION

The present invention relates to the distribution of utilities in modular furniture systems and the like, and a control arrangement therefor.

Modern offices are becoming increasingly complicated and sophisticated due largely to the ever increasing needs of the users for improved utilities support at each workstation. These "utilities," as the term is used herein, encompass all types of resources that may be used to support or service a worker, such as communications and data used with computers and other types of data processors, electronic displays, etc., electrical power, conditioned water, and physical accommodations, such as lighting, HVAC, security, sound masking, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily controlled. For example, both personal security and information security are ever-growing concerns in today's office environment, particularly as more and more sensitive business data is being transmitted electronically. Complex video and computer systems have been developed which have a central location from which all workstations in any given grouping and/or building can be continuously monitored, and the security of each associated piece of electronic equipment connected with a communications network can be checked. Related alarms and electronic locking mechanisms are typically integrated into such security systems to provide improved effectiveness. These types of security systems must presently be hard-wired in place in the building and the associated workstations. This serves to increase the cost of the office space, and severely limit its ability to be readily reconfigured.

Another example of the increasing need to control the distribution of utilities in offices relates to energy management. Electrical power is clearly an essential element of the modern office. From an energy management standpoint, it is desirable to minimize peak power consumption, as unit costs can thereby be reduced, and energy conservation realized. Also, when power supplies are disrupted, such as due to a black out, a brown out, or another similar type of power disturbance, it is very important to be able to marshal the use of all available power and/or route emergency power to critical equipment, such as emergency lighting, security systems, communications equipment, etc. Some industries, such as financial brokerages, telemarketing firms, mail order sales, and others have become so dependent upon electrically powered computers and communication devices that even very minor power variations can create major problems that result in significant business losses. Hence, the ability to control the distribution of electrical power in office environments, and other similar settings is of utmost importance.

Signaling and/or communications is another essential utility in modern offices which must be effectively distributed and controlled. In addition to state-of-the-art telephone communications, interactive computers, electronic mail, facsimile messages, remote banking, computer stock trading, and many other similar activities, electronic information transfers are now becoming a part of everyday business practice. As these new forms of communications become well entrenched, our dependence upon them increases proportionately, such that even temporary signal overloads or interferences can result in significant reductions in worker productivity.

Other important utilities also need to be distributed and controlled in modern office settings. These utilities generally relate to physical ambient controls, such as building and local HVAC, ceiling lighting, task lighting, audio information such as music, alarms, sound masking, etc., video information, including cable TV, electronic display boards, and the like. The ability to provide the office worker with ready access to all of these utilities, as well as those other utilities discussed above, is clearly advantageous in the quest to promote worker well-being and effectiveness. Since many of today's utility devices are readily portable, such as lap-top PCs, wireless telephones, etc., the difficulties experienced in keeping track of these facilities and managing their use is greatly exacerbated.

The efficient use of building floor space is also an ever-growing concern, particularly as building costs continue to escalate. Open office plans have been developed to reduce overall office costs, and generally incorporate large, open floor spaces in buildings that are equipped with modular furniture systems which are readily reconfigurable to accommodate the ever-changing needs of a specific user, as well as the divergent requirements of different tenants. One arrangement commonly used for furnishing open plans includes movable partition panels that are detachably interconnected to partition off the open spaces into individual workstations and/or offices. Such partition panels are configured to receive hang-on furniture units, such as worksurfaces, overhead cabinets, shelves, etc., and are generally known in the office furniture industry as "systems furniture." Another arrangement for dividing and/or partitioning open plans involves the use of modular furniture, in which a plurality of differently shaped, complementary freestanding furniture units are positioned in a side-by-side relationship, with upstanding privacy screens available to attach to selected furniture units to create individual, distinct workstations and/or offices. All of these types of modular furniture systems have been widely received due largely to their ability to be readily reconfigured and/or moved to a new site, since they are not part of a permanent leasehold improvement.

In order to gain increased efficiency in the use of expensive office real estate, attempts are now being made to try to support highly paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever-changing needs of the user, the distribution and control of utilities throughout a comprehensive open office plan has emerged as a major challenge to the office furniture industry.

At present, some types of modular furniture systems, such as selected portable partition panels and freestanding furniture units, can be equipped with an optional electrical powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard-wired at each of the desired outlets. While this type of distribution system has proven somewhat effective, the types of utilities provided are rather limited, their distribution is not wholly modular, thereby resulting in higher installation and reconfiguration costs, and there is little or no control for those utilities available, at least on an overall systems level.

The inherent nature of modular furniture systems, which permits them to be readily reconfigured into different arrangements, makes it very difficult to achieve adequate utility distribution and control. To be effective, not only must the furniture units have built-in utility capabilities, but the distribution system should also be able to determine the location of each particular furniture unit within a system of multiple workstations, monitor its utility usage, and then control the same, all at a relatively low cost and readily adaptable fashion, which will function effectively, regardless of where the individual furniture unit is positioned or how it is configured.

SUMMARY OF THE INVENTION

One aspect of the present invention is a system for distributing utilities in modular furniture of the type wherein individual furniture units are juxtaposed in a preselected configuration to form one or more workstations. Each furniture unit includes a signal conductor positioned therein which extends through a portion thereof. First and second quick-disconnect connectors are connected with the opposite ends of the signal conductor, and are configured to mate with like quick-disconnect connectors associated with other similarly equipped furniture units to define a communications network for the workstations. A coupler is positioned in each of the furniture units, and is connected with the signal conductor at a location operably intermediate the first and second quick-disconnect connectors. A signaler is also physically associated with each furniture unit, and is connected with the signal conductor at the coupler to communicate through the signal conductor and the communications network, so as to facilitate the controlled distribution of utilities to the workstations.

Another aspect of the present invention is a system for evaluating a modular furniture arrangement having a plurality of individual furniture units configured to form one or more workstations. At least one signal conductor extends along at least a portion of the furniture arrangement to define a communications network. A signaler is connected to the signal conductor, and is adapted for physical association with at least one of the furniture units. A network controller is coupled to the signal conductor for transmitting control signals to the signaler through the signal conductor, and receiving control signals from the signaler through the signal conductor, whereby the network controller evaluates the furniture arrangement to facilitate the distribution of utilities to the workstations.

Yet another aspect of the present invention is a utility distribution system for a modular furniture unit or the type having at least two portions thereof associated with different workstations. A first communication module is physically associated with one of the furniture portions, and includes a first signal conductor with quick-disconnect connectors at opposite ends thereof, and a coupler positioned therebetween. A second communications module is physically associated with the other furniture portion, and includes a second signal conductor extending between opposite sides thereof, with quick-disconnect connectors at opposite ends thereof, and a coupler positioned therebetween. The first and second communication modules each provide a respective communication path through both portions of the furniture unit to individually control the distribution of utilities to both of the different workstations.

Yet another aspect of the present invention is a communications network for a plurality of furniture units. A signal conductor is configured to extend along the furniture units. At least one signaler is associated with at least one of the furniture units, and is operably coupled to the signal conductor. A network controller is operably coupled to the signal conductor for communicating with the signaler, whereby the network controller and the signaler communicate information associated with the furniture units through the signal conductor.

Yet another aspect of the present invention is a communications network for a furniture arrangement, comprising at least one signal conductor extending along the furniture arrangement. A network controller is connected to the signal conductor, and includes control circuitry for the communications network. At least one utility appliance is coupled to the signal conductor for communicating with the network controller, and includes a memory unit storing operating instructions therefor, which are transmitted to the control circuitry of the network controller when the utility appliance is initialized, whereby the network controller controls the utility appliance according to the operating instructions received therefrom.

Yet another aspect of the present invention is a system for distributing utilities in a modular furniture unit of the type in which complementary furniture units are juxtaposed in a preselected configuration to form at least one workstation. A signal conductor is positioned in the furniture unit, and extends generally between opposite sides thereof. A coupler is positioned in the furniture unit, and is connected with the signal conductor at a location within the furniture unit. A utility appliance network is positioned within the furniture unit, and is coupled to the signal conductor through the coupler. At least one port is physically positioned on the furniture unit, and is operably connected with the utility appliance network, whereby the port is coupled to the signal conductor through the utility appliance network to facilitate the distribution of utilities to the workstation.

The principal objects of the present invention are to provide an efficient and effective system to distribute utilities in modular furniture arrangements and the like. Each furniture unit can be prewired with a signal conductor and a signaler connected with the signal conductor at a coupler.

The signal conductors in adjacent furniture units are interconnected by quick-disconnect connectors, so as to form a communications network which is attached to a network controller capable of evaluating both the communications network and the furniture units. At least some of the furniture units include a plurality of ports which are capable of servicing a wide variety of utility appliances, such as computers, communication devices, switches, power outlets, data receptacles, etc., to meet the ever-changing needs of even the most advanced knowledge workers. The furniture units and the associated utility appliances preferably include identifiers and/or operating instructions which are communicated to the network controller through the communications network to evaluate and monitor utility distribution to the workstation, as well as control the same, such as by power shedding, communication line switching, and the like. The utility distribution system also is preferably capable of monitoring and controlling physical support equipment, such as lighting, HVAC, security, sound, and other similar environmental accommodations. Hence, the furniture units not only have built-in utility capabilities, but the distribution system for the same is able to determine the location of each particular furniture unit in the system, monitor its utility usage, and then control the same, all at a relatively low cost, and readily adaptable fashion, which will function effectively, regardless of where the individual furniture unit is positioned or configured in the system.

These and other advantages of the invention will be further understood and appreciated by those skilled in the art by reference to the following written specification, claims and appended drawings.

BRIEF DESCRIPTION OF THE DRAWINGS

FIG. 2 is a front elevational view of two panels, which are furniture units included in the furniture arrangement according to FIG. 1, and including a utility distribution system according to the present invention;

FIG. 3 is a perspective view of a communication module used in the utility distribution system for the furniture arrangement according to FIG. 1;

FIG. 4 is a top plan view of a utility distribution system in the furniture arrangement according to FIG. 1;

FIG. 25 is a circuit schematic in block diagram form of the outlet according to FIG. 22;

DETAILED DESCRIPTION OF THE PREFERRED EMBODIMENTS

For purposes of description herein, the terms "upper," "lower," "right," "left," "rear," "front," "vertical,"

Figure 1:
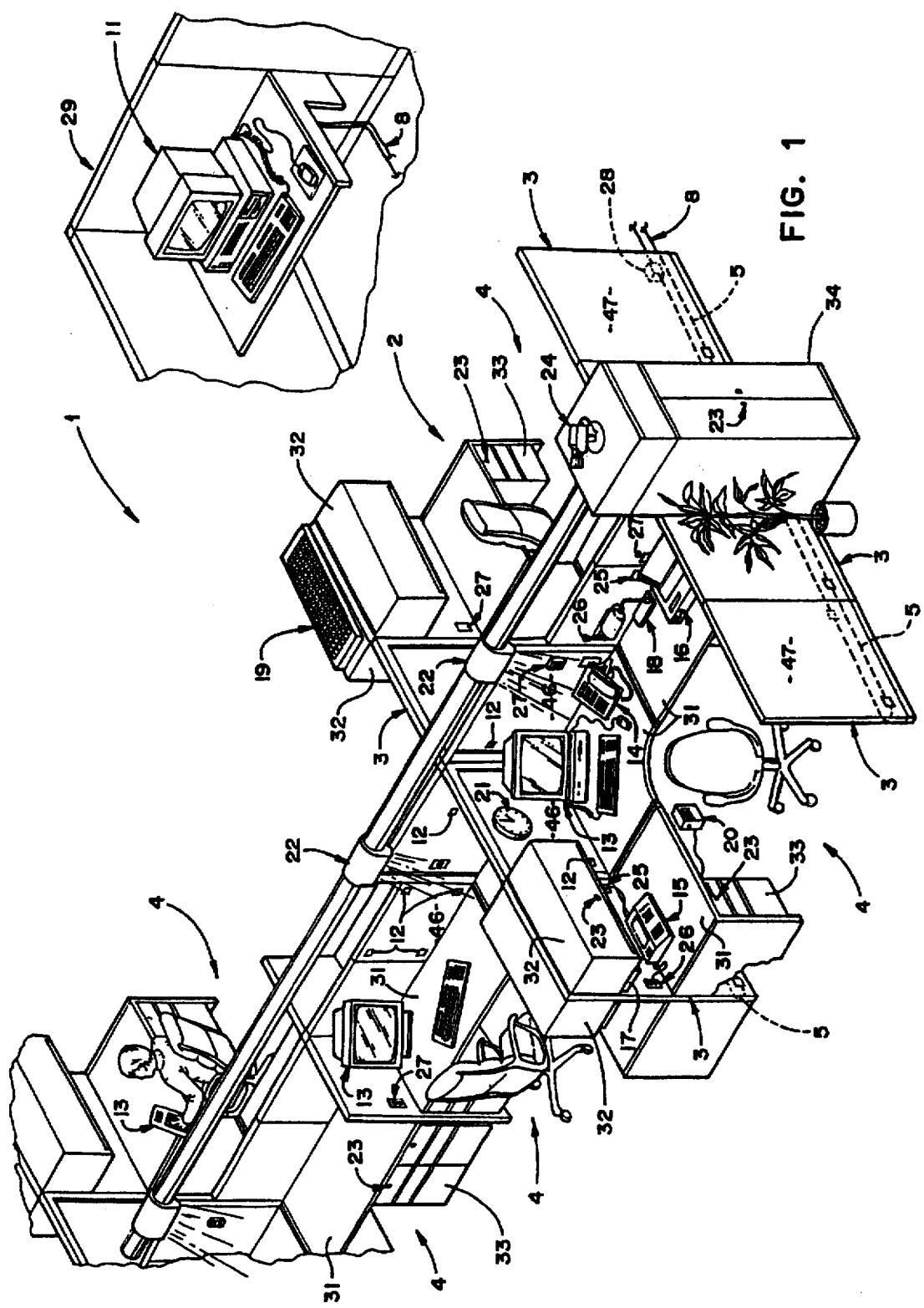
FIG. 1 is a perspective view of a furniture arrangement including a utility distribution system embodying the present invention.

"horizontal," "upstream," "downstream" and derivatives thereof shall relate to the invention as viewed by a seated user in one of the workstations shown in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a utility distribution system embodying the present invention, which is particularly adapted for use in conjunction with modular furniture arrangements 2 and the like of the type wherein individual furniture units 3 are juxtaposed to form one or more workstations 4. A signal conductor 5 is positioned in each furniture unit 3, and may extend generally between opposite sides thereof. Quick-disconnect connectors 6 and 7 (FIGS. 2-4) are provided at the opposite ends of each signal conductor 5, and mate with like quick-disconnect connectors 6 and 7 in other similarly equipped furniture units 3 to define a communications network 8 through workstations 4. Each furniture unit 3 also has a signaler 9 physically associated therewith, which is connected with the associated signal conductor 5 at a coupler 10 positioned operably intermediate opposite quick-disconnect connectors 6 and 7. A network controller 11 is operably coupled to communications network 8 to evaluate the communications network and/or the associated furniture units 3. At least some of the furniture units 3 may also be equipped with one or more utility ports 12 (FIG. 2), which are connected with the associated coupler 10, and service utility appliances, such as those illustrated in FIG. 1, including personal computer 13, telephone 14, facsimile machine 15, printer 16, overhead mounted task light 17, freestanding task light 18, ambient light 19, personal heater 20, clock 21, ventilation system 22, electronic lock system 23, security system 24, power outlets 25, data receptacles 26, switches 27, and power-ins 28. Utility appliances 13-28 may be provided with internal memory to store operating instructions for the same, which are transmitted to network controller 11 when the particular utility appliance is initialized.

As described in greater detail below, network controller 11 (FIG. 1) is capable of interfacing with the various ports 12 in furniture system 2, so as to achieve nearly limitless flexibility in monitoring and controlling utility appliances 13-28 in a manner that can be easily rearranged and/or reconfigured without requiring any rewiring whatsoever. For instance, one of the switches 27 can be programmed to control one or all task lights 17 and 18 located in a particular workstation 4. If the user later decides to change this arrangement, so that switch 27 controls all ambient lights 19 in the furniture group 2, network controller 11 is simply reprogrammed to achieve this new arrangement, without necessitating any rewiring or physical relocation of any of the utility appliances 13-28. Similarly, network controller 11 might be programmed to operate lock system 23 by local actuation at each workstation 4 during regular office hours, and then be controlled from a remote central control station 29 (FIG. 1) during off hours to achieve improved security with fewer personnel. Ports 12 and utility appliances 13-28 can be programmed on a workstation-by-workstation basis to be controlled from a particular area, and/or by a specific person, such as a project director, and then reprogrammed as required when personnel and/or workstations 4 are reassigned. The immense flexibility of utility distribution system 1 is particularly beneficial when individual furniture units 3 are removed or replaced, or when entire furniture groups 2 are reconfigured, since the monitoring and control of all utility appliances 13-28 in any given communications network 8 can be readily achieved by simply reprogramming network controller 11. Preferably, network controller 11 also has system monitoring and control capabilities, so as to efficiently and effectively distribute utilities among the various workstations 4, such as by power shedding, communication line switching, and the like. In this manner, critical equipment can remain operational during temporary power and/or communication disruptions, thereby avoiding those significant business losses that would otherwise result.

The illustrated modular furniture arrangement 2 (FIG. 1) includes a portable partition system, wherein the furniture units 3 comprise a plurality of individual partition panels, which are interconnected in a side-by-side fashion to form multiple workstations 4. Partition panels 3 are adapted to mount thereon a plurality of conventional hang-on furniture articles, such as the illustrated worksurfaces 31, binder bins 32, etc., and are integrated with complementary pedestals 33, and wardrobes or closets 34.

It is to be understood that the present utility distribution system 1 can be used in conjunction with a wide variety of different furniture arrangements, including the panel based system illustrated in FIG. 1. For example, utility distribution system 1 can be used in conjunction with freestanding furniture units, such as those disclosed in commonly assigned U.S. Pat. No. 5,092,253 entitled MODULAR FURNITURE, as well as the common and personal furniture systems disclosed in copending commonly assigned U.S. patent application Ser. No. 819,396, entitled DYNAMIC WORKSPACE MODULE, now U.S. Pat. No. 5,282,341 and Ser. No. 774,563, entitled FURNITURE SYSTEM, now U.S. Pat. No. 5,511,348 as well as other similar furniture arrangements. Hence, the term "furniture unit" or the like, as used herein, is intended to encompass all types of furniture articles used in furniture systems, freestanding arrangements, and the like, as well as their equivalents.

Figure 5:
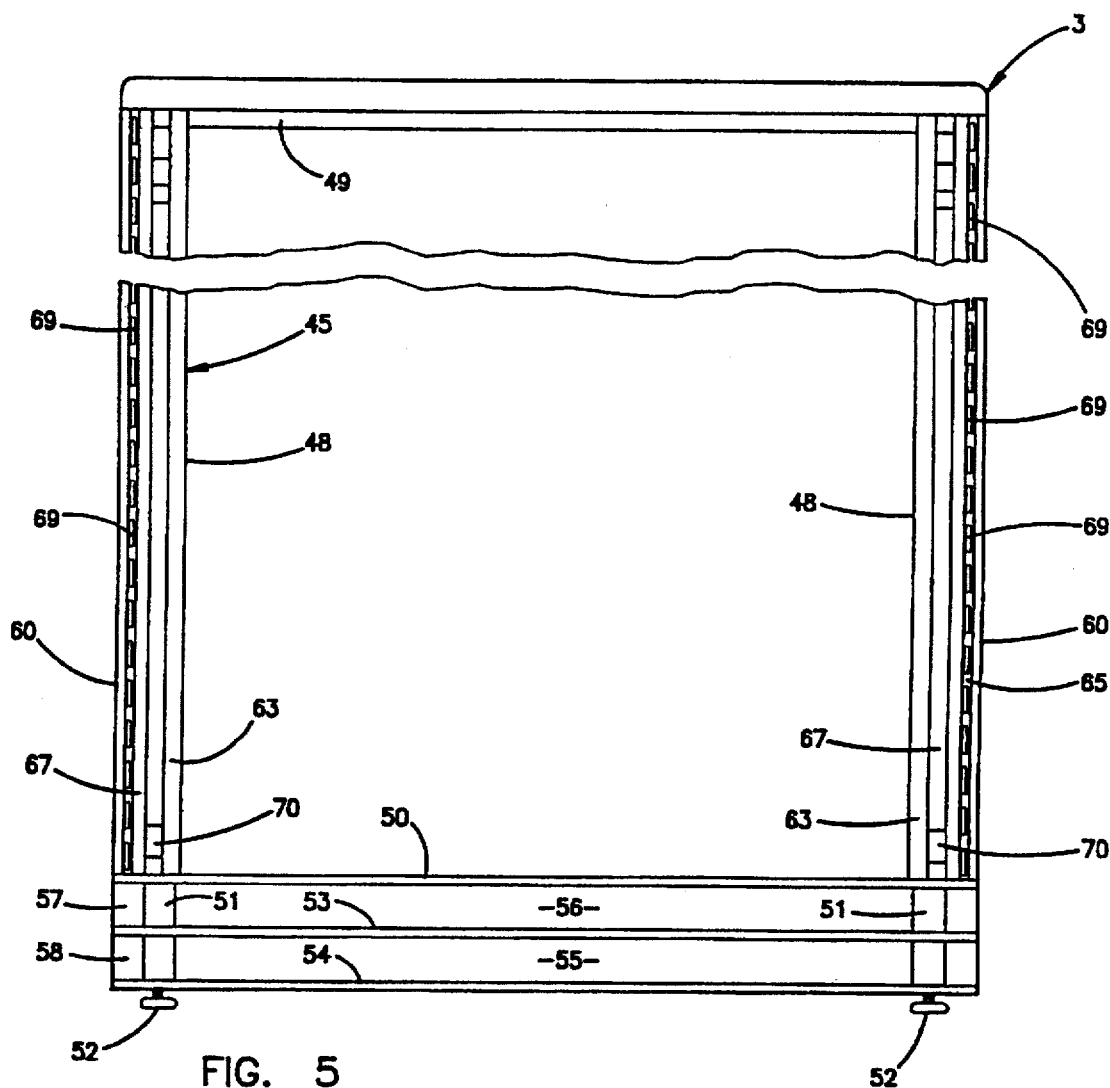
FIG. 5 is a front elevational view of a panel according to FIG. 2 with the panel face cover removed.
Figure 6:
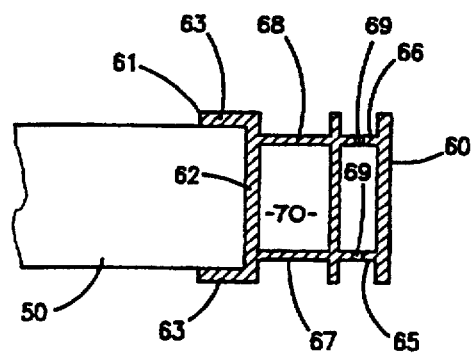
FIG. 6 is a top plan view of a column of the panel according to FIG. 5.

The illustrated partition panel 3 (FIG. 2) is specially configured to accommodate utility distribution system 1, and includes a marginal frame 45, with two removable cover panels 46 and 47 enclosing the opposite sides or faces thereof. As best illustrated in FIGS. 5 and 6, panel frame 45 includes a pair of vertical uprights 48 rigidly interconnected at their opposite ends by top and bottom cross members 49 and 50, respectively. A pair of feet 51 depend from bottom cross member 50, and include vertically adjustable glides 52 at their lower ends to facilitate leveling partition panel 3. Two plates 53 and 54 extend between opposite panel feet 51, and are attached thereto in a vertically spaced apart fashion to define a pair of back-to-back power raceways 55 and a pair of back-to-back cable raceways 56, which are vertically separated by center plate 53. Removable cover plates 57 and 58 are detachably mounted on the opposite sides of raceways 55 and 56 to selectively enclose the same.

The vertical uprights 48 (FIGS. 5 and 6) of panel frame 45 are substantially identical in construction, wherein each includes a channel-shaped lateral cross-sectional configuration, comprising a flat outer web 60, and a U-shaped inner channel 61, having a central web 62 and opposite side flanges 63. An intermediate web 64 is positioned between webs 60 and 62, and is integrally connected therewith by flange members 65-68. The outer flange members 65 and 66 include a series of vertical slots 69 shaped to receive therein brackets for hang-on furniture articles, such as worksurfaces 31 and binder bins 32. Webs 62 and 64, in conjunction with flanges 67 and 68 define a vertical raceway 70 which communicates with power raceway 55 to route power conduits therethrough.

In the example shown in FIG. 2, cover panels 46 and 47 each have an upholstered construction, and are detachably connected with the opposite sides or faces of panel frame 45 to enclose the same. The illustrated cover panel 46 is provided with a plurality of ports 12 mounted thereon from which various utilities can be tapped in the fashion discussed below, whereas the illustrated cover panel 47 does not have any ports, and is simply aesthetic in nature. As will be appreciated by those skilled in the art, the present invention also contemplates the use of additional types of cover panels (not shown), which may be arranged differently to facilitate the efficient and effective distribution of utilities to workstations 4.

In general, communications network 8 (FIG. 1) includes at least one signal conductor 5 associated with furniture arrangement 2 to effect communication through furniture arrangement 2, and to communicate with ports 12 on those panel faces 46 including ports. To implement such communication, the communications network 8 illustrated herein includes a furniture arrangement network 36 (FIG. 2) which is associated with the furniture arrangement 2, and a utility appliance network 37 which is associated with ports 12. More particularly, the furniture arrangement network 36 includes at least one signal conductor 5 extending along the furniture arrangement 2. The utility appliance network 37 includes at least one signal conductor connected to at least one port 12. However, as used herein, "communications network" includes any signal conductor configuration associated with a furniture unit.

The cover panel 46 illustrated on the left-hand side of FIG. 2 includes eight individual ports 12 connected to utility appliance network 37, which is in turn connected to the furniture arrangement network 36 at coupler 10. As previously noted, ports 12 may be arranged to provide service taps at the selected workstations 4 for a wide variety of different utilities, such as electrical power, communication, data, security, fiber optic transmissions, and possibly even HVAC, conditioned water, and other similar resources. Partition panels 3 can be either factory equipped, or even retro-fitted with those particular utility ports 12 which are desired, and in the specific configuration that will best serve the associated workstation 4.

In the illustrated example, and with reference to FIG. 1, each port 12 is configured so that it can be connected with either a power outlet 25, a data receptacle 26, a switch 27, or a power-in 28. In this configuration, the utility appliances 13-24 are connected to the communications network 8 indirectly through power outlets 25 and data receptacles 26. However, it is to be understood that utility appliances 13-24 can also be connected directly to ports 12. Preferably, each of the power outlets 25, data receptacles 26, switches 27 and power-ins 28 has a memory capability to store operating instructions therefor, which are transmitted to network controller 11 when the utility appliance is initialized, such that network controller 11 controls the utility appliances according to these programmed operating instructions. Utility appliances 13-24 may also have memory capability to store operating instructions, which are transmitted to network controller 11 in a manner similar to power outlets 25, data receptacles 26, switches 27 and power-ins 28. In the panel 3 illustrated on the left-hand side of FIG. 2, those ports 12 located at the opposite corners of panel 3 are empty, the two ports 12 located immediately above the worksurface 31 have power outlets 25 connected therewith, and the two ports 12 positioned immediately below worksurface 31 have data receptacles 26 connected therewith.

With reference to FIG. 3, the illustrated signal conductor 5, quick-disconnect connectors 6 and 7, signaler 9 and coupler 10 are all incorporated into a one-piece assembly, which is designated herein as communication module 75, shaped to be received within the cable raceway 56 (FIG. 5) of partition panel 3. It is to be understood that communications module 75 might also be shaped to be positioned on a furniture unit 3 outside of raceway 55. Communication module 75 includes six signal conductors 5 (FIG. 3) which extend along the length of cable raceway 56, and have a connector block 76 mounted at one end, and a male quick-disconnect connector 7 mounted at the opposite end. The illustrated connector block 76 includes at least one female quick-disconnect connector 6 positioned in the end wall thereof, which is shaped to receive one of the male connectors 7 therein. Connector block 76 also includes a female quick-disconnect connector 77 in the top wall thereof for connection with ports 12, as described below. Signaler 9 and coupler 10 are also integrally positioned within connector block 76. The illustrated signaler 9 comprises a toggle switch, which may be shifted between on and off positions for purposes to be described in greater detail hereinafter. As described in greater detail below, toggle switches 9 are manipulated in a specific pattern to help the network controller 11 determine the location of a particular communication module 75 within furniture arrangement 2 when the network controller 11 communicates with bridge module 75 upon initialization. This initial communication is done with the communication module looking upstream. As used herein, the terms "downstream" and "upstream" are directions determined relative to the connectors 6 and 7 in communication module 75. Hence, "downstream" refers to the direction from female connector 6 to male connector 7, whereas "upstream" refers to the direction from male connector 7 to female connector 6. In the interconnected arrangement shown in FIG. 4, "upstream" is the clockwise direction and "downstream" is the counterclockwise direction.

In the embodiment illustrated in FIGS. 2-4, each partition panel 3 includes a pair of communication modules 75 positioned on opposite sides thereof within back-to-back cable raceways 56. Each communication module 75 is physically associated with the adjacent side or face of partition panel 3, with switch 9 protruding therefrom. When partition panels 3 are positioned side-by-side, as shown in FIG. 2, the male quick-disconnect connector 7 associated with communication module 75 is inserted into the female quick-disconnect connector 6 in the communication module 75 of the next adjacent panel 3. All communication modules 75 in a particular furniture group or cluster 2 are similarly interconnected, so as to form the furniture arrangement network 36, which is in the shape of a loop, as shown in FIG. 4.

Each of the furniture units 2 may have two or more sections, which are designated herein as "portions," equipped with separate communication modules 75. For example, each of the illustrated panels 3 has two opposite sides or faces, each of which has a communication module 75 associated therewith. Normally, the opposite faces of panels 3 will be associated with a different one of the various workstations 4. Hence, each of the illustrated panel faces 46 and 47 (FIG. 2) is a separate portion of furniture unit 3, and has a respective associated communication module 75. The ported panel faces 46 include a module 75A which communicates with the ports 12 thereon through a respective utility appliance network 37. The portless panel faces 46 will also have a communication module 75B associated therewith. Preferably, the communication modules 75A, 75B have a signaler 9 which is connected to a coupler 10, and has a memory capability, wherein an identifier code is programmed therein that is specific to the particular panel face. Hence, when a partition panel 3 is installed in a furniture system 2, the panel 3 can be interrogated by network controller 11 to determine all pertinent specifics of the panel 3, including utility capabilities, and their particular configuration on each panel face.

Although the furniture portions have been described above with respect to panel faces 46 and 47 (FIG. 2), it will be recognized that furniture portions may take other forms. Other examples of a furniture portion may include one work section of a desk having multiple work sections, one drawer section of a multiple drawer cabinet or file, or any other section of a furniture unit 3 that may be associated with different workstations 4. Accordingly, the term "furniture portion," as used herein, is intended to encompass all of these types of furniture unit sections as well as their equivalents.

Network controller 11 (FIG. 4), may be located local to or remote from furniture group 2, and is connected with the furniture arrangement network 36. The furniture arrangement network 36 is in the form of a loop, so as to permit evaluation of the various partition panels 3 in the furniture system 2, as well as any and all utility appliances 13–28 (FIG. 1) connected with the same. As described in greater detail hereinbelow, evaluation of the furniture arrangement 2, or communications network 8, includes: locating workstations 4 using signalers 9; locating couplers 10; locating utility appliances 13–28; monitoring communication modules 75 (FIG. 3); monitoring utility appliances 13–28 (FIG. 1); monitoring power usage at receptacles in power outlets 25; identifying types of utility appliances 13–28; identifying communication modules 75; automatic configuration of communication modules 75; automatic configuration of communication links between utility appliances 13–28; and automatic binding of utility appliances 13–28. Accordingly, as used herein, the term "evaulate" (or "evaluation") will include all of these processes for determining one or more of the various characteristics of a furniture arrangement 2 or a communications network 8, and identifying fault locations, or their equivalents.

As also described in greater detail below, the illustrated switches 9 constitute one form of device which permits network controller 11 to positionally associate each face of panel 3 with one of the various workstations 4 created in furniture group 2. For example, after furniture group 2 has been assembled in the fashion illustrated in FIG. 4, beginning with the upstream end of furniture arrangement network loop 36, the first switch 9 in each workstation 4 is switched on, while the remaining switches in the same workstation 4 are switched off. Network controller 11 includes an evaluation routine, which determines the status of each switch 9, and then positionally associates each face of panel 3 with its associated workstation 4, as they are disposed sequentially about configured furniture arrangement network 36. As a result, any given furniture group 2 can be readily reconfigured, by adding or removing partition panels 3, rearranging the same, or the like, and network controller 11 will be able to automatically determine the new location of each panel 3 within the furniture system.

In operation, utility appliances 13–28 (FIG. 1) are plugged into panel ports 12 at their desired locations. The utility distribution system 1 is initialized, and the operating instructions for each of the utility appliances incorporated into communications network 8 are communicated to network controller 11. Additionally, information is communicated to network controller 11 from the communication modules 75 associated with each portion of furniture units 3. In this fashion, network controller 11 not only learns where each partition panel 3 is in the furniture group 2, but it also learns the identity of each of the utility appliances 13–28 mounted thereon, and its associated operating instructions. Network controller 11 can thereby monitor the flow of power, signals, and other utilities to each port 12 on each face of each partition panel 3 in furniture arrangement 2, and can also control the same, if necessary, by power shedding, communication line switching, or the like. For example, in the event of an electrical power disruption, network controller 11 can shed power to all non-critical utility appliances, such as personal heater 20, task lamp 18, etc., yet continue to supply power to all necessary utility appliances, such as emergency lighting, computer terminals 13, communication devices 14, etc. Furthermore, network controller 11 permits manipulation of utility appliances 13–28 on a system wide basis, such as by rerouting telephone calls to different locations, turning on and off lights 18–20, resetting clocks 21, locking and unlocking security system 24, and the like. Hence, partition panels 3 not only have built-in utility distribution capabilities, but the distribution system 1 for the same is able to determine the location of each particular partition panel 3 in the system 2, monitor its utility usage, and then control the same, all in a readily adaptable fashion, which will function effectively, regardless of where the individual partition panel 3 is positioned or configured in the furniture arrangement 2.

Figure 7:
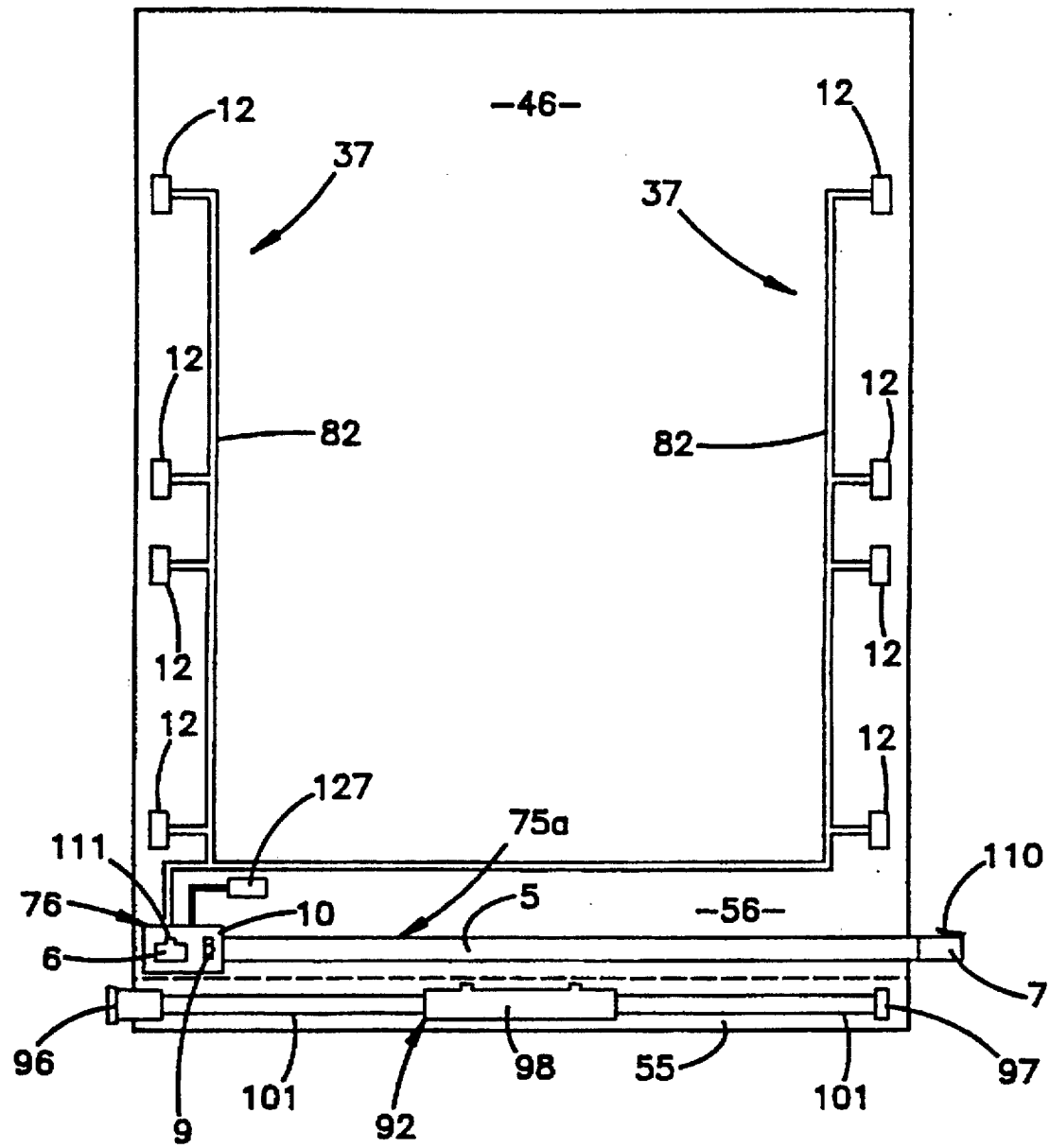
FIG. 7 is a front elevational view of the panel face according to FIG. 5 with a utility appliance network.
Figure 8:
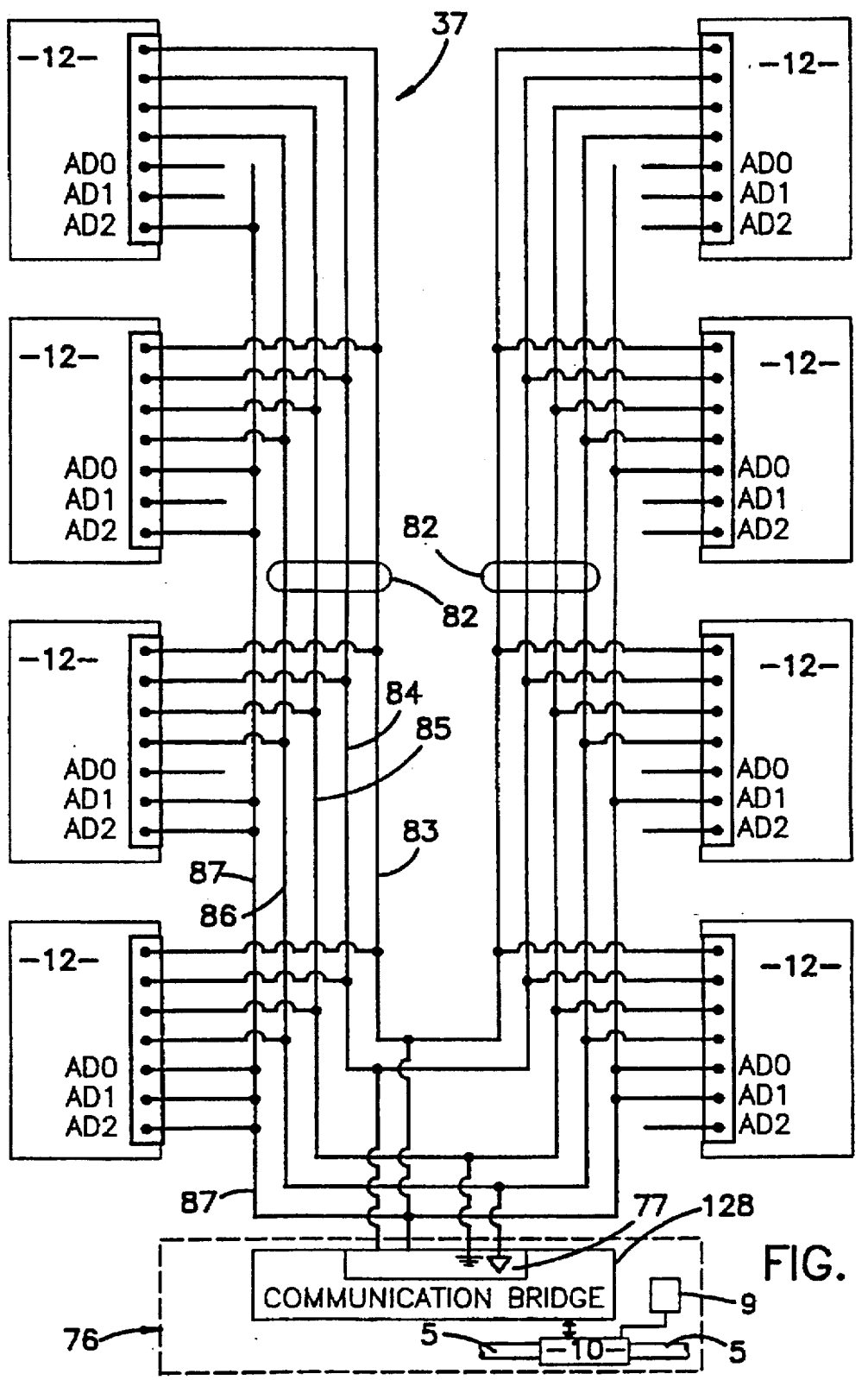
FIG. 8 is a circuit schematic of the utility appliance network according to FIG. 7.

With reference to FIGS. 7 and 8, a utility appliance network 37 is provided to establish a communication path between the ports 12 on cover panel 46 and an associated bridge module 75A. Bridge module 75A is a communication module 75 which includes a communication bridge 128 (FIG. 8) connected to coupler 10. Utility appliance network 37 includes data/power conductors 82 connected to all of the ports 12 and to the communication bridge 128. The data/power conductors 82 include two signal conductors 83 and 84 (FIG. 8) which transmit communication signals bi-directionally between ports 12 and the communication bridge 128 of bridge module 75A. Conductors 85 and 86 carry DC power from communication bridge 128 to ports 12. Utility appliance network 37 includes an address conductor 87 selectively connected uniquely to each of ports 12 on the panel face 46. Conductor 87 is connected to a logic level which is, for example, circuit ground. The three address pins AD0–AD2 of the eight ports 12 are connected to conductor 87, such that each address on a panel face 46 has a unique 3-bit value. The addresses AD0–AD2 range from 000 to 011 from bottom to top on the right side of FIG. 8, and range from 100 to 111 from bottom to top on the left side of FIG. 8. Thus, each port 12 associated with each panel face 46 has a unique address which identifies its location thereon. Conductors 83, 84, 85, 86 and 87 are preferably terminated at a male RJ-11 type connector adapted to be engaged in connector 77 of communication module 75 (FIG. 3).

Figure 8A:
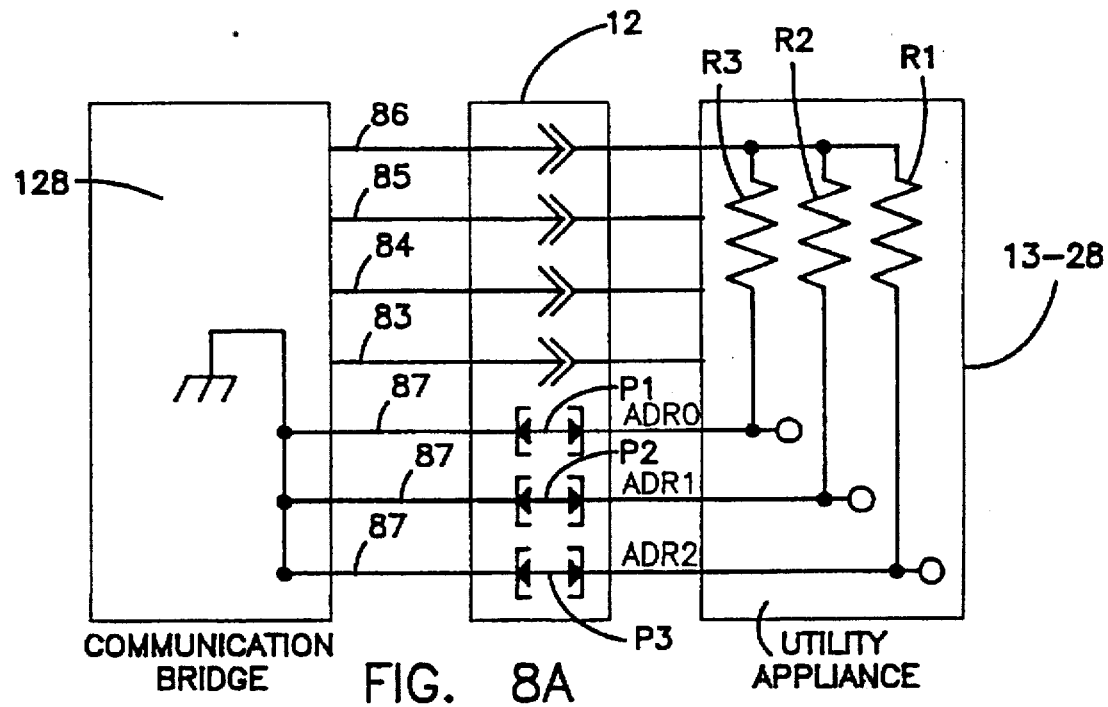
FIG. 8A is a partial circuit schematic of the utility appliance network.

An address connector will now be described with reference to FIG. 8A. This embodiment of the address bus includes pull-up resistors R1, R2 and R3 in each of the utility appliances 13–27 connected to conductor 86 having the utility appliance power supply +V (e.g., 5 volts). The pull-up resistors R1–R3 are selectively connected to conductors 87 by pins P1–P3 connected between communication bridge 128 and address terminals AD0–AD2 of port 12. Conductors 87 are coupled to ground in communication bridge 128. The presence or absence of pins P1–P3 determines the utility appliance address. Those address terminals in each port 12 connected to conductor 87 by pins P1–P3 will be pulled to ground, whereas each address terminal not connected to conductor 87 will be pulled to a high logic level by its respective pull-up resistor R1–R3. In the port 12 illustrated in FIG. 8A, the address is 000. Although pins P1–P3 are illustrated in FIG. 8A, it will be recognized that conductor 87 can be selectively hard-wired to resistors R1–R3 through the address terminals AD0–AD2.

Figure 8B:
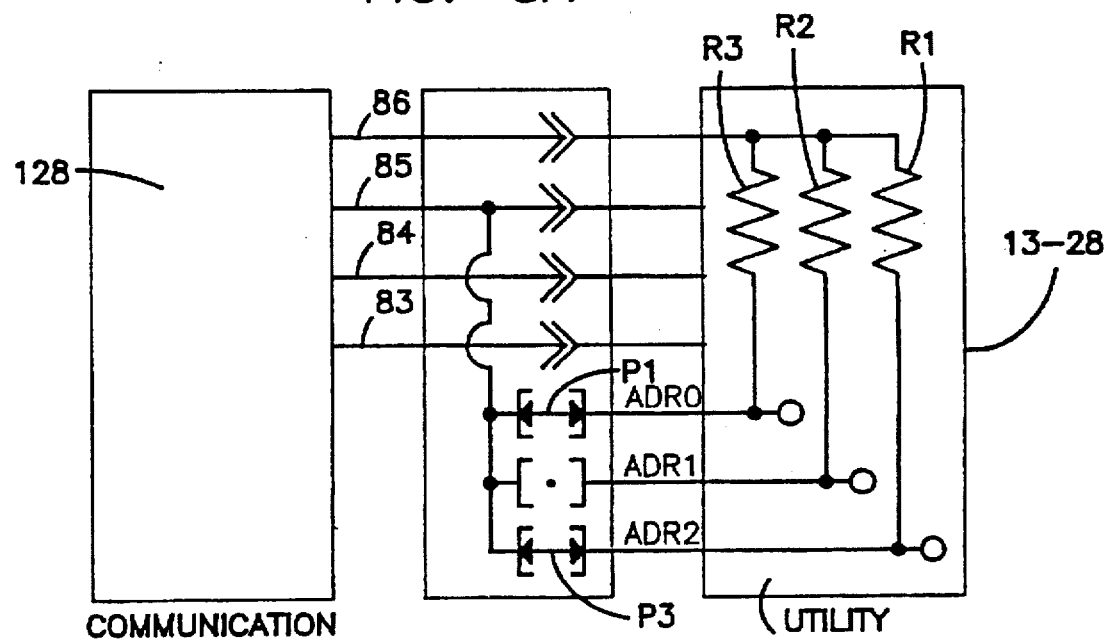
FIG. 8B is a partial circuit schematic of an alternate embodiment of the utility appliance network.

The presently preferred embodiment of the address circuit is illustrated in FIG. 8B. In this embodiment, only conductors 83–86 extend between communication bridge 128 and the utility appliances 13–28. Pins P1–P3 are selectively inserted between address terminals AD0–AD2 and ground potential conductor 85, such that address terminals AD0–AD2 are connected to respective ones of pull-up resistors R1–R3. Those address terminals connected to ground by connection of a pin P1–P3 will be pulled low, whereas terminals without a pin will be pulled up by their respective pull-up resistor. Thus, the utility appliances connected to port 12 illustrated in FIG. 8B has the address 010. This embodiment is preferred because it uses only four conductors for the utility appliance network 37.

As mentioned briefly above in the illustrated example, six signal conductors 5 are provided in each communication module 75 (FIGS. 2 and 3) to extend along the length of cable raceway 56. Utility appliance network 37 (FIGS. 7 and 8) includes signal conductors 83 and 84, which extend between communication bridge 128 of bridge module 75A and each of the ports 12. Each of the illustrated signal conductors 83 and 84 includes a suitable conventional electrical conductor, such as a wire having a copper core and electrical insulation enclosing the copper. These signal conductors 83 and 84 may be provided in a ribbon cable or as a bundle of individual wires.

It will be appreciated that although the signal conductors 83 and 84 in the illustrated embodiments are wires, the signal conductors could be any means to effect a communication path between two points. For example, an optical fiber, a coaxial cable, or the like, could be utilized. Hence, the term "signal conductor," as used herein, encompasses any such device, and their equivalents.

With reference again to the bridge module 75 shown in FIG. 3, the opposite ends of the signal conductors 5 are terminated at quick-disconnect connectors 6 and 7. The illustrated male quick-disconnect connector 7 is a conventional RJ-11 male connector which includes at least six pins. The illustrated female connector 6 is a conventional female RJ-11 connector, having the same number of pins as male connector 7. Although female connector 6 is illustrated mounted in coupler block 76, it will be recognized that the female connector could be remote from connector block 76 and connected to block 76 by signal conductors 5. As will also be recognized by those skilled in the art, male connector 7 includes a resilient tongue 110, which is received in a keyway 111 of female connector 6, and releasably locks connector 7 in female connector 6 in a conventional manner. In general, tongue 110 is biased into keyway 111 when male connector 7 is inserted into female connector 6, and tongue 110 is manually depressed inwardly to remove the male connector from the connector 6.

Those of ordinary skill in the art will recognize that although the illustrated quick-disconnect connectors 6 and 7 are RJ-11 type connectors, they may be implemented by any suitable non-fixed type of conventional connector. For example, detachable male and female fiber optic or coaxial connectors may be used. Examples of other suitable detachable connectors include BNC connectors, D-type connectors, CPC connectors and panel mount connectors. Accordingly, the term "quick-disconnect connectors," as used herein, includes all such readily detachable connectors and their equivalents, which allow at least two signal conductors 5 to be interconnected without hard wiring.

Figure 9:
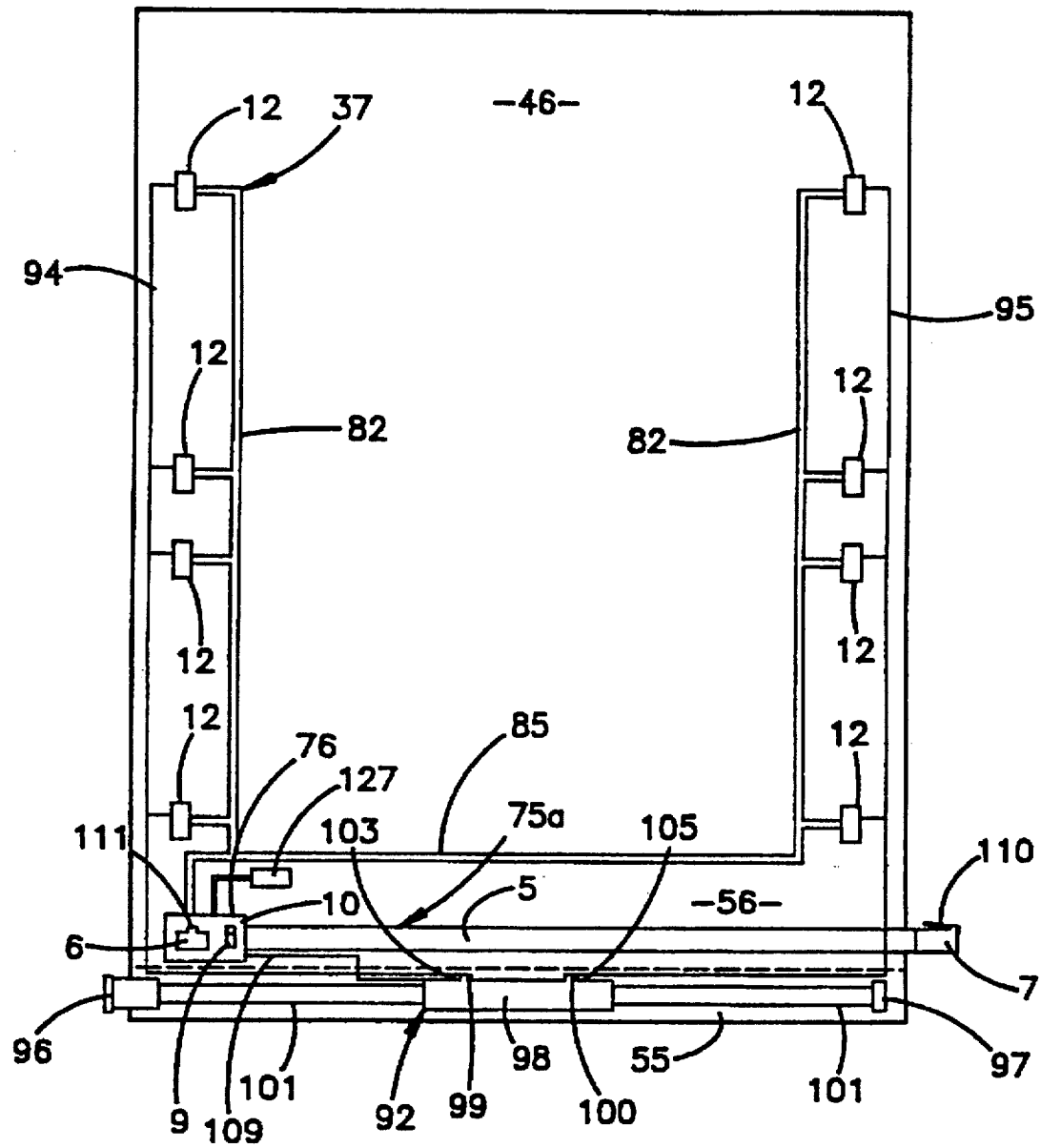
FIG. 9 is a front elevational view of the panel according to FIG. 7 and further including power harnesses.
Figure 10:
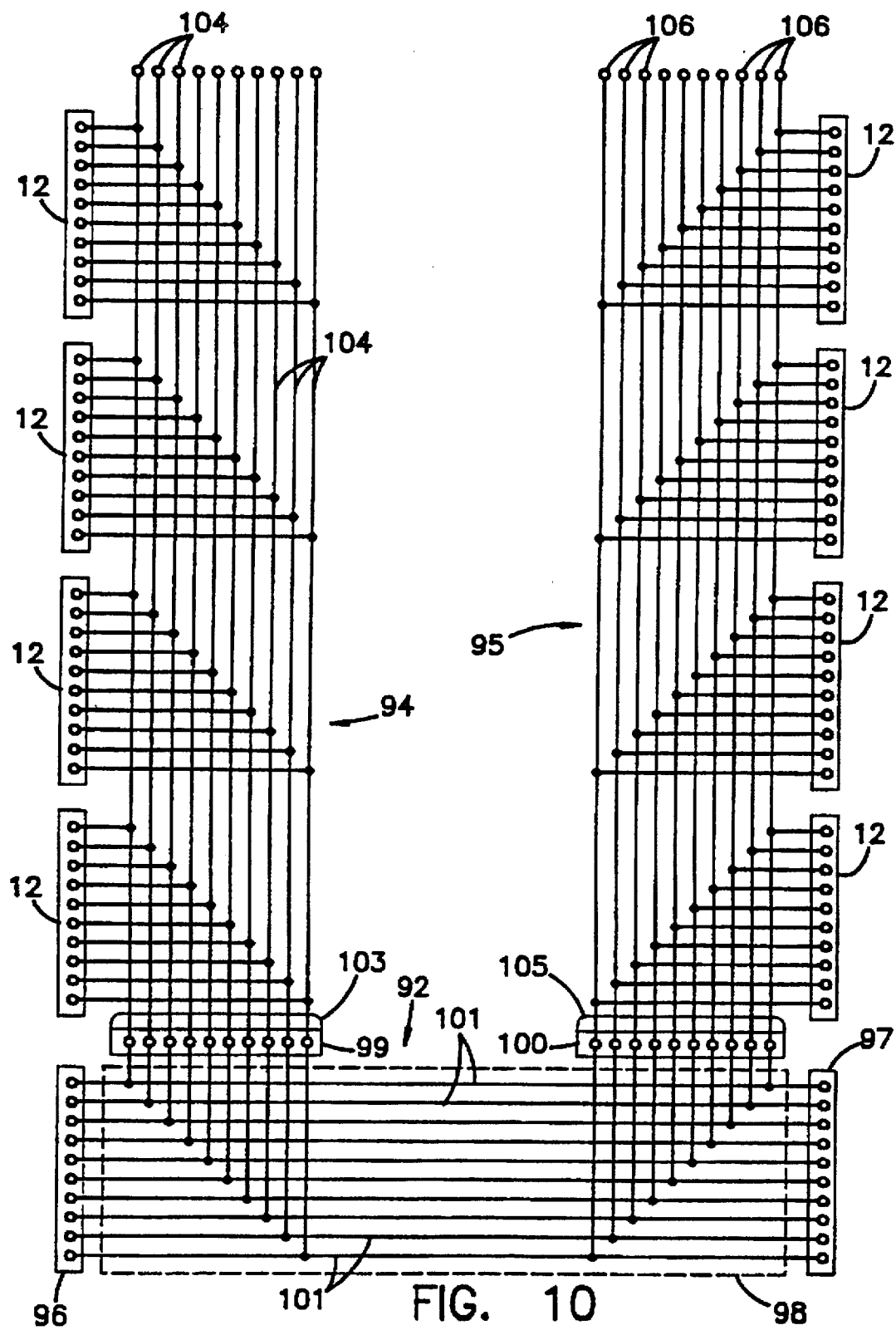
FIG. 10 is a circuit schematic of the power distribution circuit according to FIG. 9.

With reference to FIG. 9, the ports 12 on cover panel or face 46 are also connected to a powerway 92 by harnesses 94 and 95. Powerway 92 may be a conventional type of powerway, having quick-disconnect connectors 96 and 97 on opposite ends thereof. Connectors 96 and 97 are interconnected by power conductors 101 (FIG. 10, only some of which are numbered). Conductors 101 extend through power block 98. Power block 98 includes two power taps 99 and 100 on a top wall thereof through which the power conductors 101 (only some of which are numbered) are accessed. Harness 94 includes a connector 103 which mates with tap 99. Conductors 104 (only some of which are numbered) extend from connector 103 to each of the ports 12 on the left side of panel face 47. Harness 95 similarly includes a connector 105 which mates with connector 100 and signal conductors 106, which extend between ports 12 on the right side and connector 105.

Connector block 76 (FIG. 9) is also connected to powerway 92 by conductors 109. The network bridge receives operating power from the powerway and generates a regulated DC voltage V+ using the AC power received from the powerway.

Figure 11:
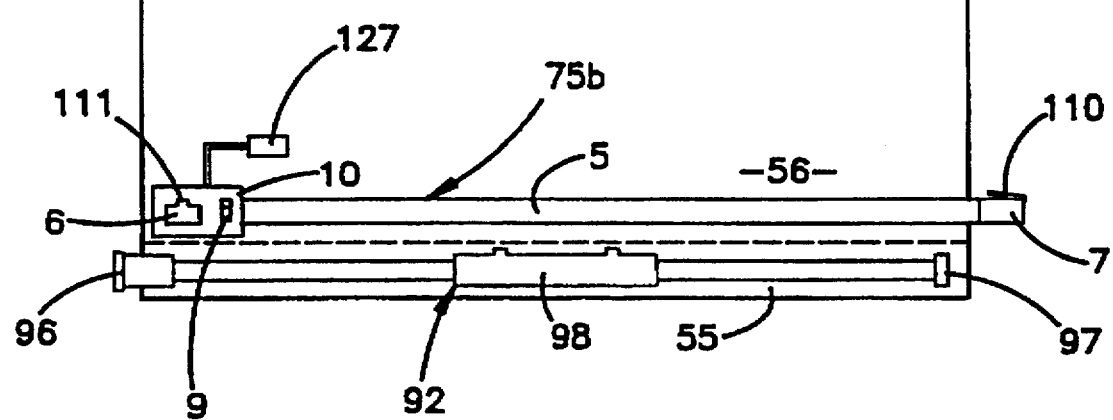
FIG. 11 is a front elevational view of the portless panel face according to FIG. 2.

In the example illustrated in FIG. 11, those cover panels or faces 47 which do not include ports 12 (i.e., "non-ported" or "portless" panel faces) do have a powerway 98 positioned in power raceway 55. These portless cover panels 47 also have an identification module 75B with associated signal conductors 5 and a coupler 10 positioned in cable raceway 56. Connectors 6 and 7 terminate the ends of the signal conductors 5. Identification module 75B also includes a signaler 9, along with a second signaler 127, which are both connected to coupler 10. The non-ported panel face 47 thus includes a signal conductor 5 and a powerway 98, similar to the ported panel faces 46.

Figure 12:
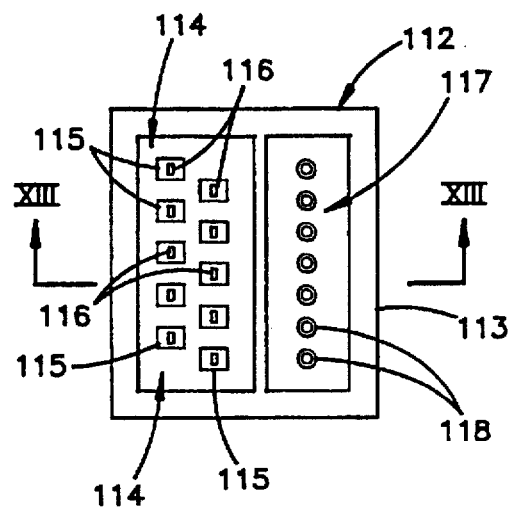
FIG. 12 is a front elevational view of a port in the ported panel face according to FIG. 2.
Figure 13:
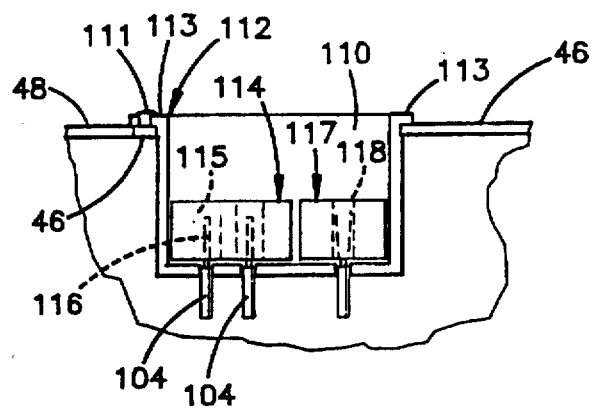
FIG. 13 is a top sectional view taken along plane XIII—XIII in FIG. 12.

As best shown in FIGS. 12 and 13, each of the illustrated ports 12 includes a recessed housing 112, having an outer flange 113 on a face thereof which contacts cover panel face 46 and covers the perimeter of a hole which receives housing 112. Housing 112 may be attached to vertical frame uprights 48 by suitable conventional means, such as welding 111. The illustrated housing 112 includes a rectangular recess 110, which is closed on four sides and the back. A quick-disconnect connector 114 is positioned in housing 112 at the back of recess 110, and includes ten connector ports 115 (only some of which are numbered) housing respective male connectors 116 (only some of which are numbered). Male connectors 116 are connected to a respective conductor 104. A quick-disconnect signal connector 117 is positioned adjacent connector 114 in housing 112. Signal connector 117 includes seven female contacts 118 (only some of which are numbered). Contacts 118 are connected to conductors 83, 84, 85, 86, and are selectively connected to conductor 87 (FIG. 8).

It will be appreciated that although the illustrated ports 12 have a recessed type of housing 112, other configurations could be utilized. For example, a multiple pin connector (not shown) having high power handling capability could be connected on the panel 3 to provide the ports 12. Also, the ports 12 could be provided with only signal conductors and a connector for low power signals (e.g., an RJ-11 type connector) could be used. An alternative to using address conductors would be to provide a memory chip at each port 12 having an address stored therein. Accordingly, the term "port," as used herein, refers to any connector on a furniture unit, such as the cover panel or face 46, which provides access for the utility appliances 13–28 to the communications network 8, and more particularly the utility appliance network 37, and encompasses all the above-described port configurations, as well as their equivalents.

Figure 14:
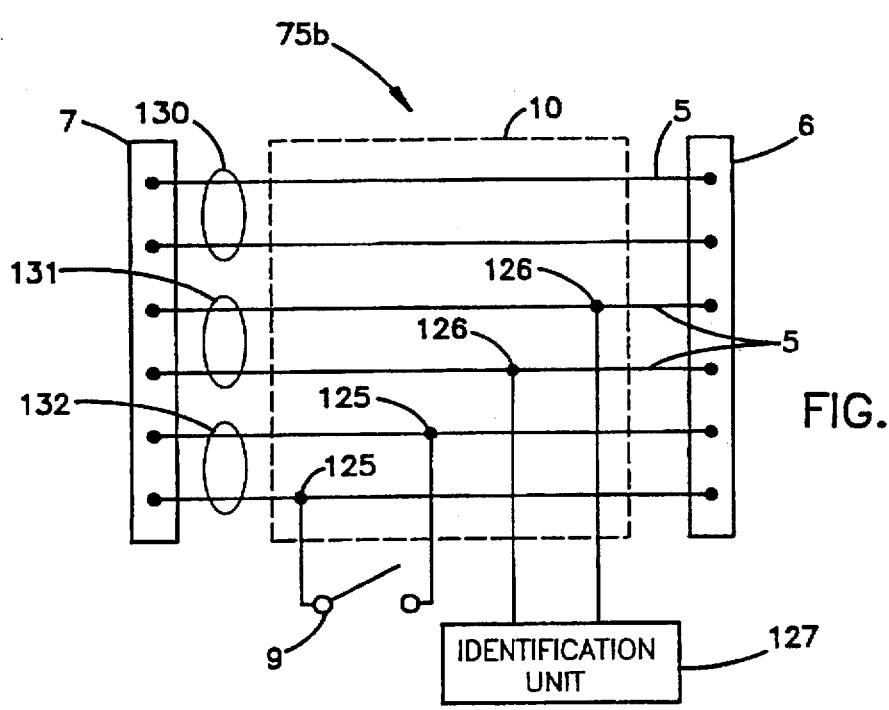
FIG. 14 is a circuit schematic of a module according to FIG. 3 including couplers and signalers forming an identification module in the portless panel face according to FIG. 11.

In the illustrated embodiments, the six signal conductors 5 (FIG. 14) include three signal channels 130, 131 and 132, each having two of the signal conductors 5. Channel 130 is a data channel for communicating information, as described in greater detail hereinbelow. Channel 131 is an identifier channel for transmitting identification information, as is also described in greater detail hereinbelow. Channel 132 is a configuration channel for transmitting information pertaining to the workstations, as described hereinbelow.

The identification module 75B (FIG. 14) associated with the non-ported cover panels 47 includes junctions 125 for connecting signaler 9 to the signal conductors 5 of the workstation identification channel 132. The coupler 10 of module 75B also includes junctions 126 for connecting signaler 127 to signal conductors 5 of the identifier channel 1531. Terminals 125 and 126 may be provided by an electrically conductive means, such as solder electrically connecting identifiers 9 and 127 to wires 5, or an electrically conductive trace deposited on a printed circuit board and connected to signal conductors 5, as well as signalers 9 and 127.

The bridge module 75A (FIG. 15) is associated with the ported panel face 46. Bridge module 75A functions as an interface between the furniture arrangement network 36, comprising interconnected signal conductors 5, and the utility appliance network 37. Bridge module 75A includes a coupler 10 (illustrated in phantom), and a communication bridge 128, which is coupled between signal conductors 5 and signal conductors 83, 84. Coupler 10 includes relay switches 136 and 137, which are connected in series in data channel 130. The switches 136, 137 are controlled by a relay coil 138. Switches 136 and 137 are normally closed, but are connected to an impedance when the switches are open. The impedance is preferably provided by a resistor 140 having an impedance of approximately 102 ohms. This resistor provides a suitable termination impedance for the data channel of furniture arrangement network 36 when switches 136, 137 are open. A transformer 144 is connected between terminals 145 and 146 of communication bridge 128 and data channel 130. Transformer 144 includes a winding 147 connected to terminals 145, 146, and a winding 148 connected to channel 130. Communication bridge 128 is connected to identifier channel 131 by an optical coupler 150 and one of the signal conductors 5. Optical coupler 150 includes a light emitting diode (LED) 151 connected to channel 131. A photodetector 152, implemented using a light responsive transistor, has an emitter and a collector connected to terminals 153, 154 of communication bridge 128. Coupler 10 also includes a conductor 156 connected to configuration channel 132 and to terminal 157, and a conductor 158 connecting one signal conductor of channel 132 to ground potential. A pull-up resistor 160 connects conductor 156 to a five volt power supply. Coupler 10 interrupts circuit 132. Accordingly, two signal conductors 5 are terminated at pins 161 and 162.

As will be apparent to those skilled in the art, although the illustrated coupler 10 of identification module 75B (FIG. 14) includes terminals 125 and 126 and the illustrated coupler 10 of bridge module 75A (FIG. 15) includes transformer 144 and optical coupler 150, other types of couplers could be provided. For example, an optical splitter may be utilized with optical fibers, an impedance bridge could be used to branch from electrical wires, or a repeater could be used to implement branching off of conductors 5. Accordingly, the term "coupler," as used herein, includes all such branching devices, including optical couplers, transformers, junctions, logic circuits, splitters, and their equivalents.

The illustrated identification module 75B (FIG. 14) includes two signalers 9 and 127, respectively. Signaler 9 is a switch which is configured to identify the first panel face of a workstation. Switch 9 is implemented using a commercially available, two position, rocker or toggle type of switch. A first position of the switch indicates that the panel face associated with the switch is the first panel face of a workstation, and a second position indicates that the panel face associated with the switch is not the first panel face of a workstation. Signaler 127 is an identification unit which may be implemented using integrated circuit No. DS 1991, available from Dallas Semiconductor, Inc. In addition to these signalers, bridge module 75A (FIG. 15), as described in greater detail hereinbelow, also includes a communication bridge 128 having a DC power supply, transmitters and receivers (not shown). The communication bridge 128 is thus used for communicating over channels 130, 131 and 132, and utility appliance network conductors 83, 84.

It will be appreciated that other devices for inputting and outputting signals may be utilized in the system. For example, a transducer could be connected to the circuit or optical transmission devices could be connected thereto. Accordingly, the term "signaler," as used herein, encompasses all devices capable of originating or receiving signals, including those described above, and their equivalents.

Figure 16:
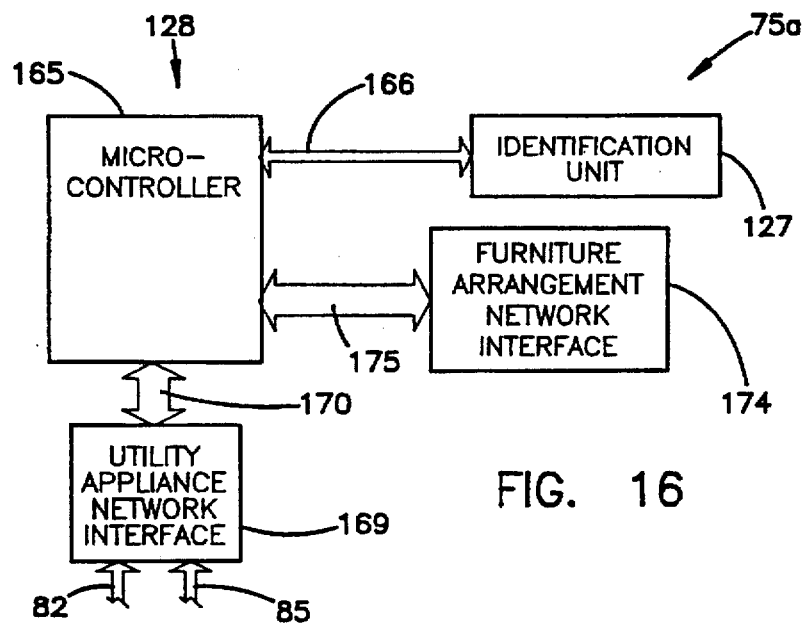
FIG. 16 is a circuit schematic in block diagram form of a bridge module according to FIG. 15.

As best shown in FIG. 16, the illustrated bridge module 75A has a communication bridge 128 that includes a microcontroller 165. Microcontroller 165 may be implemented using any suitable commercially available microprocessor, such as IC No. 80C152, manufactured by Intel Corporation. Microcontroller 165 includes an EPROM and a RAM (not shown). Bridge module 75A also includes a signaler in the form of identification unit 127 connected to microcontroller 165 through a communication bus 166. The identification unit 127, which is similar to identification unit 127 in identification module 75B, includes a unique, 48-bit identification number representing the panel face with which the bridge module 75 is associated. The identification unit 127 may be implemented using a commercially available integrated circuit such as circuit No. DS 2400, available from Dallas Semiconductor, Inc., or any other suitable memory device.

The identification units 127 (FIGS. 7, 9 and 11) as noted above are provided for identification modules 75B and bridge modules 75A, and include a memory device having a unique identification code. These memory devices are interrogated as described in greater detail hereinbelow to identify: the number of panel faces between network controller 11 and the first ported panel face 46; between each subsequent ported panel face up to the last ported panel face; and between the last ported panel face and the network controller 11. In a particularly advantageous embodiment of the present invention, the identification unit 127 may also include a part identification number for the furniture unit 3 in which the identification module 127 is connected. Communication bridge 128 can interrogate the identification modules 127 to learn the identification code and the type of furniture unit 3 in which it is positioned, as well as the identification code and furniture unit type of adjacent portless furniture units 3. The network controller 11 can use this information to produce a centralized inventory of the furniture arrangement 1.

Figure 15:
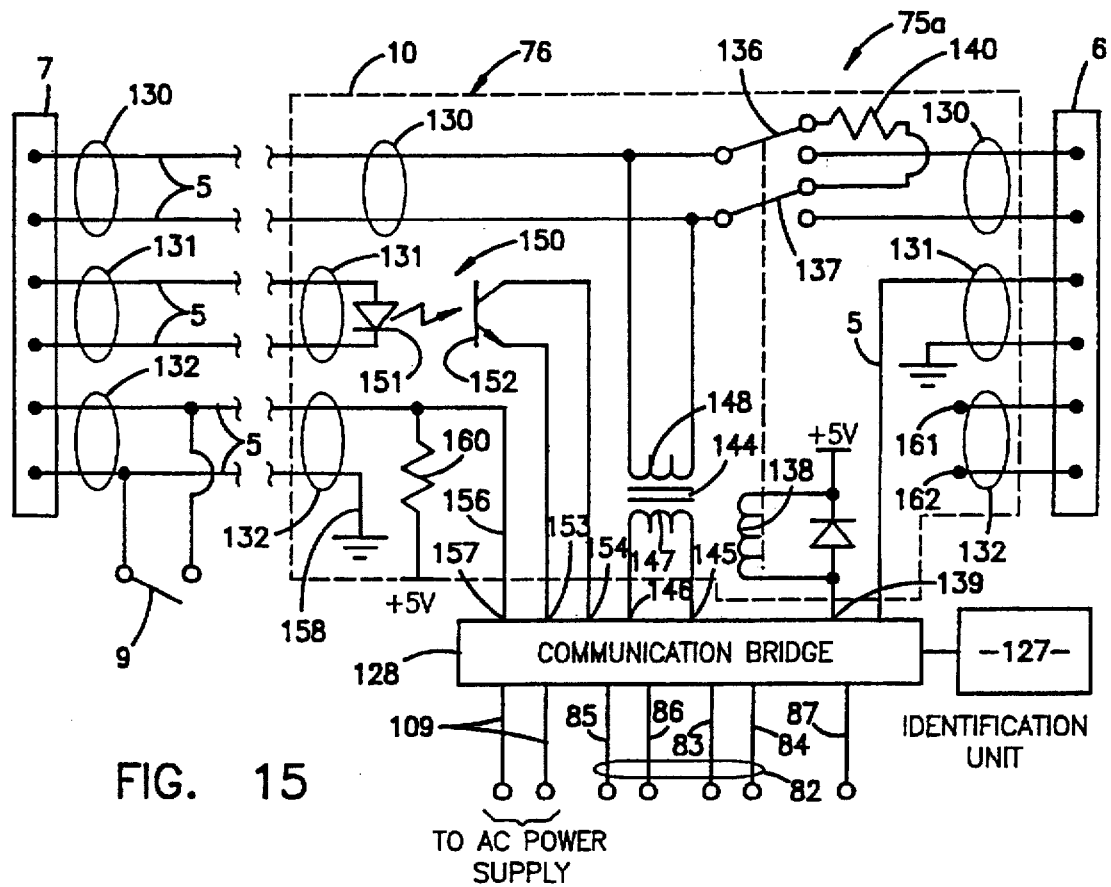
FIG. 15 is a circuit schematic partially in block diagram form of a module according to FIG. 3 including couplers and signalers forming a bridge module for the ported panel face according to FIG. 2.

As also shown in FIGS. 15 and 16, microcontroller 165 is also coupled to a first unit of workstation switch 9 through channel 132. Microcontroller 165 monitors switch 9 upon initialization to determine whether the furniture portion, which is illustrated as a panel face 46, associated with module 75A is the first furniture portion of a workstation, as described in greater detail hereinbelow. The switch 9 may be implemented with any suitable switch, such as a toggle switch. Microcontroller 165 is coupled to utility appliance network conductors 83–87 through a utility appliance network interface 169 and a communication bus 170. The utility appliance network interface 169 may be implemented using any suitable commercially available circuit, such as an RS485 driver/receiver, available from Texas Instruments. The microcontroller 165 is connected to the furniture arrangement network 36, which is made up of interconnected signal conductors 5, through a furniture arrangement network interface 174 and a communication bus 175. Interface 174 includes the components illustrated in FIG. 15 connected between communication bridge 128 and signal conductors 5. Interface 174 also includes commercially available integrated interface components, such as a hex inverter, a relay driver, and an RS485 driver/receiver.

Figure 18:
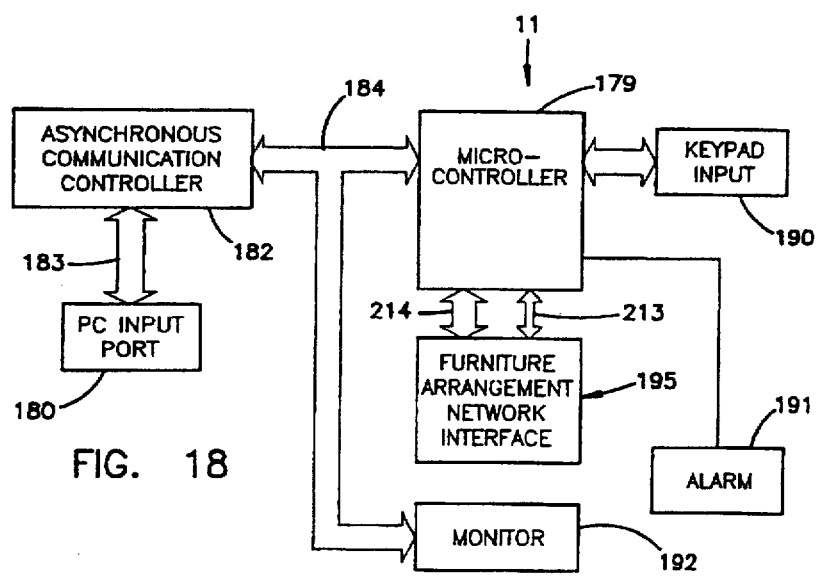
FIG. 18 is a circuit schematic in block diagram form of the network controller according to FIG. 17.

Network controller 11 (FIG. 18) includes a microcontroller 179, which may be implemented using any suitable commercial microprocessor, such as IC No. 80C152 manufactured by Intel Corporation. The microcontroller 179 includes random access memory (RAM) (not shown), read only memory (ROM) (not shown), and nonvolatile RAM (not shown). An optional personal computer (PC) input port 180 is connected to any suitable commercially available asynchronous communication controller (ACC) 182 through communication bus 183. The ACC is connected to a microcontroller 179 via bus 184. The PC input port 180 may be implemented by any suitable connector, such as a nine-position connector, which will mate with the RS-232 port of a PC. A PC connected to microcontroller 179 receives status information use by an operator, and inputs control signals to control the operation of the utility appliances 13–28 in a selected communications network 8, as described in greater detail hereinbelow. The network controller 11 may optionally include a keypad input 190, an alarm 191 and a display 192. Keypad 190 and display 192 may be provided by any suitable conventional keypad and display, such as those utilized for personal computers. The keypad 190 and display 192 are used as an interface with microcontroller 179, and may be provided in addition to a PC. Alarm 191 may be provided by any suitable conventional transducer. The 191 alarm may, for example, provide an audible signal when a maintenance message is generated on display 192.

Figure 17:
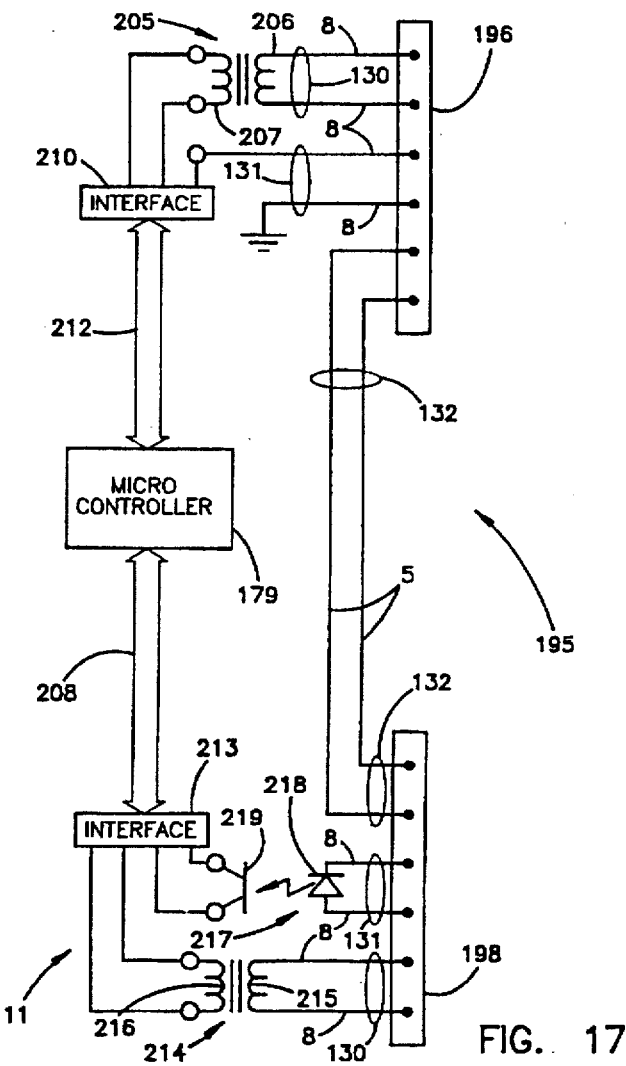
FIG. 17 is a circuit schematic partially in block diagram form of a network controller for the utility distribution system according to FIG. 1.

The microcontroller 179 (FIG. 18) is connected to a network interface 195, which includes a male connector 198 provided by a conventional male RJ-11 six-pin quick-disconnect connector. A female quick-disconnect connector 196 is provided by a conventional female RJ-11 six-pin quick-disconnect connector. Furniture arrangement network 36 is connected to quick-disconnect connectors 196 and 198. As illustrated in FIG. 17, the workstation identification channel 132 is connected through network controller 11, such that the network controller is transparent to this channel. A transformer 205 includes windings 206 and 207, wherein winding 206 is connected to data channel 130, and winding 207 is connected to an interface circuit 210. Interface circuit 210 is also connected to one of the signal conductors 5 of identifier channel 131, and interface circuit 210 is connected to microcontroller 179 via communication bus 212.

Microcontroller 179 (FIG. 17) is connected to an interface circuit 213 through a communication bus 208, interface circuit 213 is connected to channel 130 through connector 198 and transformer 214. One winding 215 of transformer 214 is connected to channel 130, and the other winding 216 is connected to interface circuit 213. An optical coupler 217 includes a diode 218 connected to identifier channel 131. A photodetector 219 of optical coupler 217 is connected to interface 213. The interface circuits 213 and 210 comprise suitable, conventional, impedance and protection circuitry for interfacing with microcontroller 179, and may include integrated circuit components, such as octal transceivers and RS485 drivers.

As will be appreciated, the utility distribution system 1 includes a network controller 11 for controlling each communications network 8 of interconnected signal conductors 5. Thus, a single network controller 11 is provided for each communications network 8. However, the system 1 may include a plurality of communications networks 8, each of which has a respective network controller 11. It is envisioned that all the network controllers 11 be connected in a network, such that a central controller may monitor all the network controllers 11 to control all the communications networks 8.

Although the illustrated network controller 11 includes a microcontroller 179 in the form of a microprocessor and associated interface circuits, it will be appreciated that network controller 11 could be implemented using any commercial microprocessor based device, such as a personal computer. Thus, the term "network controller," as used herein, includes all such devices capable of controlling communications network 8, and their equivalents.

As described briefly above, the utility appliances 13–28 (FIG. 1) are connected to ports 12, and communicate through utility appliance network 37 (FIG. 2). One type of utility appliance is a switch 27 (FIGS. 19–21), which includes a rectangular housing 235. According to the illustrated embodiment, the housing 235 has two switches 236 and 237 on a front face 238 thereof. Switches 236 and 237 are implemented using a three-position header to control the operation of utility appliances 13–26 and 28 connected in the utility distribution system 1. Each of the switches 236 and 237 has a respective sixteen-position clock face association selector 239, 240 associated therewith, which are also mounted on a front face 238 of housing 235. Selectors 239 and 240 are used to select unit association numbers. As will be described in greater detail hereinbelow, all utility appliances 13–28 within a workstation 4 having the same number (0–9) on their respective association selector are associated. All utility appliances 13–28 connected to a communications network 8, regardless of their workstation 4, and having the same letter (A–F) are associated. The back surface 244 (FIG. 20) of the illustrated housing 235 has an outwardly projecting power block 245, and an adjacent connector 246. Connector 246 includes male contacts 248 for connection with female contacts 118 in port 12 (FIG. 12).

Figure 19:
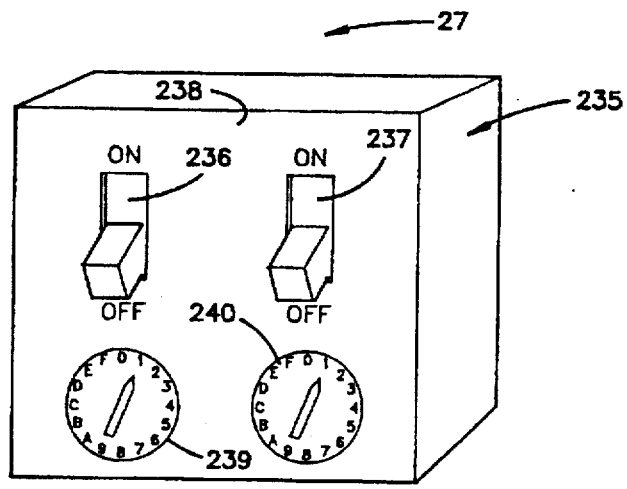
FIG. 19 is a front perspective view of a switch which is one type of utility appliance in the furniture arrangement according to FIG. 1.
Figure 20:
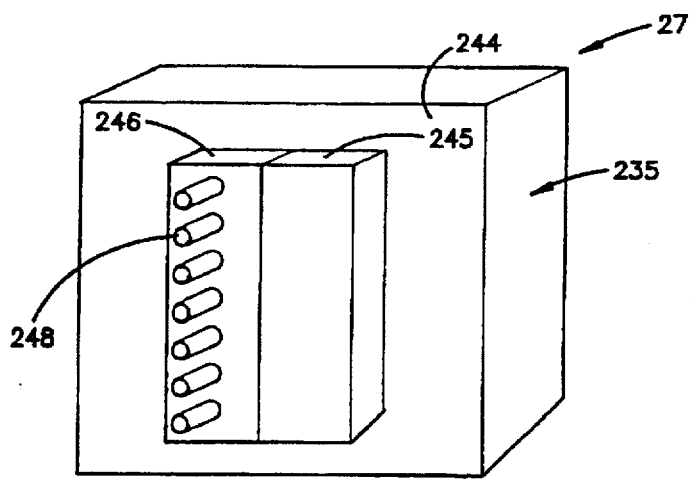
FIG. 20 is a back perspective view of the switch according to FIG. 19.
Figure 21:
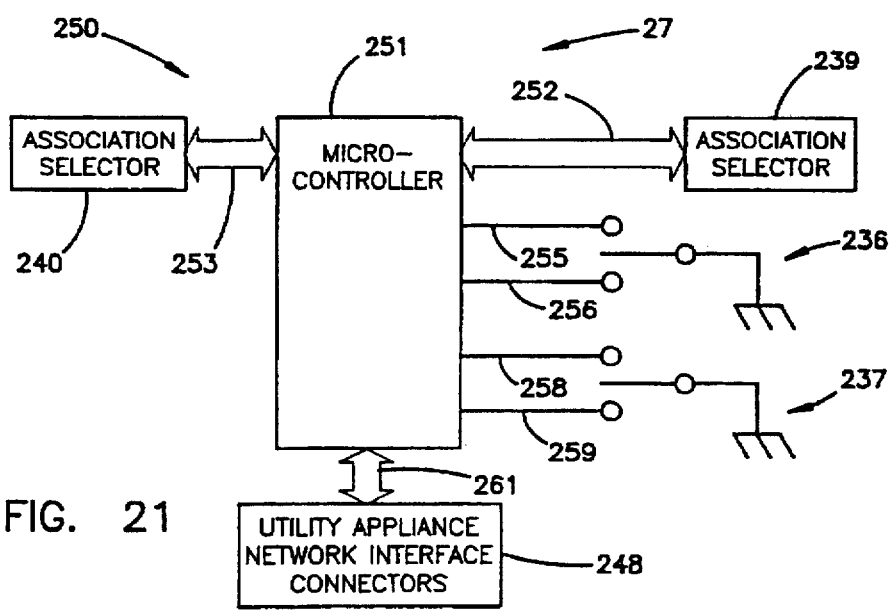
FIG. 21 is a circuit schematic in block diagram form of the switch according to FIG. 19.

Switch 27 includes a circuit 250 (FIG. 21) mounted within housing 235 (FIGS. 19 and 20). Circuit 250 includes a microcontroller 251 (FIG. 21), which may be implemented using any suitable microprocessor, such as a commercially available IC No. 80C31, available from Intel Corporation. The microcontroller 251 includes a RAM (not shown) and EPROM (not shown), which provide memory storage for the microcontroller. Association selectors 239, 240 are connected to microcontroller 251 via communication busses 252, 253, respectively. As described briefly above, selectors 239, 240 may be provided by sixteen-position clock dial selectors, or other suitable switch means. Switch 236 is connected to microcontroller 251 by conductors 255, 256, and switch 237 is connected to microcontroller 251 by conductors 258, 259. Microcontroller 251 is connected to connectors 248 by a bus 261.

Another one of the utility appliances 13–28 which may be utilized with system 1 is power outlet 25 (FIGS. 22–23), which includes a rectangular housing 270 having a front face 271. The illustrated power outlet 25 includes three receptacles 272, 273 and 274. However, it will be recognized that the power outlet 25 may contain any number of receptacles. Indicators 276, 277 and 278 are associated with receptacles 272, 273 and 274, respectively. Each indicator 276–278 emits red, green or yellow light according to the power level of the power source to which its associated receptacle is connected, as described in greater detail hereinbelow. The indicators 276–278 are particularly useful because users will want to plug appliances into a reliable power source. Thus, they will prefer a receptacle with a green indicator to one with yellow indicator, and they will prefer a receptacle with a yellow indicator to one with a red indicator. Users will thus assist in balancing loads on different supplies by selecting the receptacle having the least load. An association selector 280, 281 and 182 is associated with each receptacle 272, 273, and 274, respectively. Selectors 280, 281 and 282 may be provided by a sixteen-position clock face selector or other suitable switch means. These selectors are used to bind receptacles 272–274, as described in greater detail hereinbelow. Indicators 276–278, receptacles 272–274, and selectors 280–282 are positioned on the front face 271 of housing 270, so that they are readily accessible to a user for manual manipulation.

The back surface 285 (FIG. 23) of power outlet housing 270 has outwardly projecting connectors 286 and 287 positioned adjacent one another. Connector 286 includes female contacts 288 (only some of which are numbered) in protective silos 288' for connection with contacts 116 (FIG. 12). Connector 287 includes outwardly projecting male contacts 289 (FIG. 23, only some of which are numbered) for connection with contacts 118 in port 12 (FIG. 12).

Figure 22:
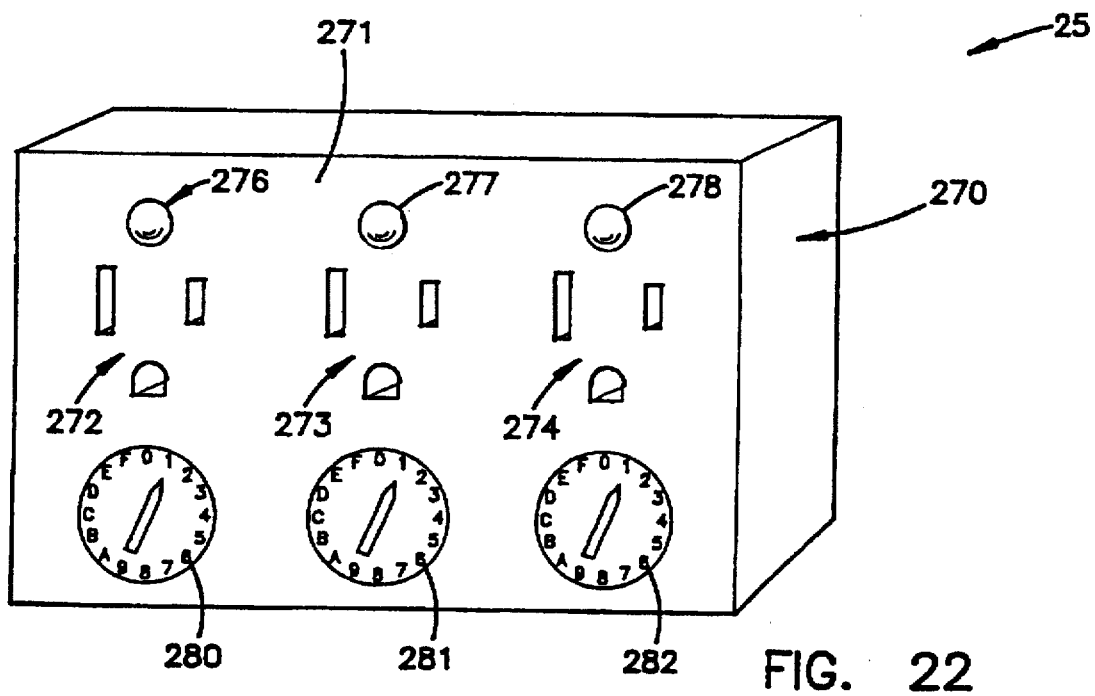
FIG. 22 is a front perspective view of a triplex power outlet which is one type of utility appliance in the furniture arrangement according to FIG. 1.
Figure 23:
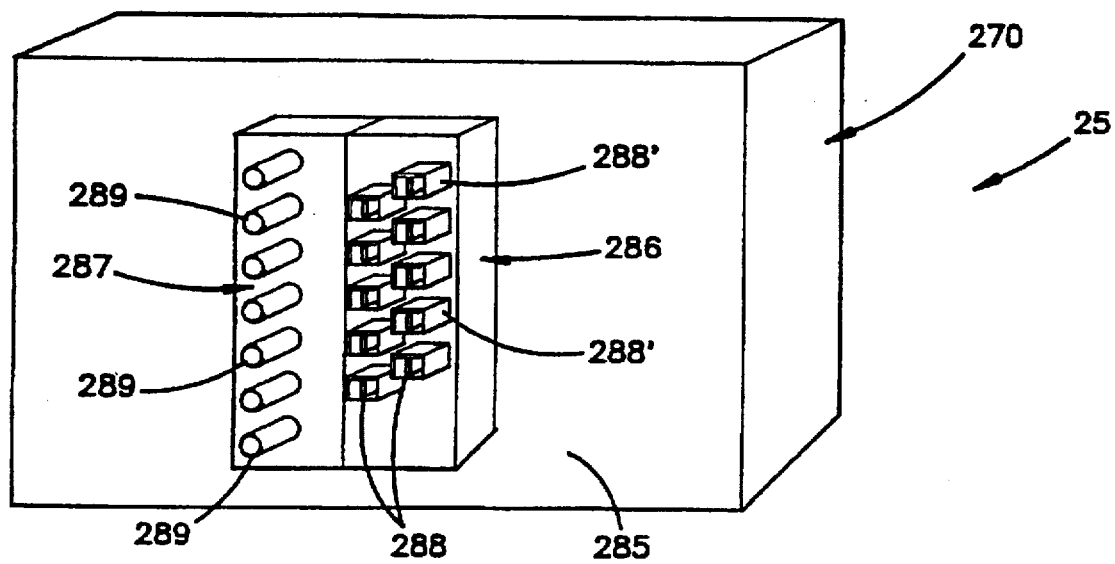
FIG. 23 is a back perspective view of the power outlet according to FIG. 22.

As shown in FIG. 22, receptacles, 272–274 each include three conventional contacts for receipt of a conventional plug of the type used for typewriters, clocks, radios, computers, printers, televisions, and the like. It will be appreciated that receptacles 272–274 may be provided by any suitable, conventional power receptacle, such as a two contact receptacle.

Figure 24A:
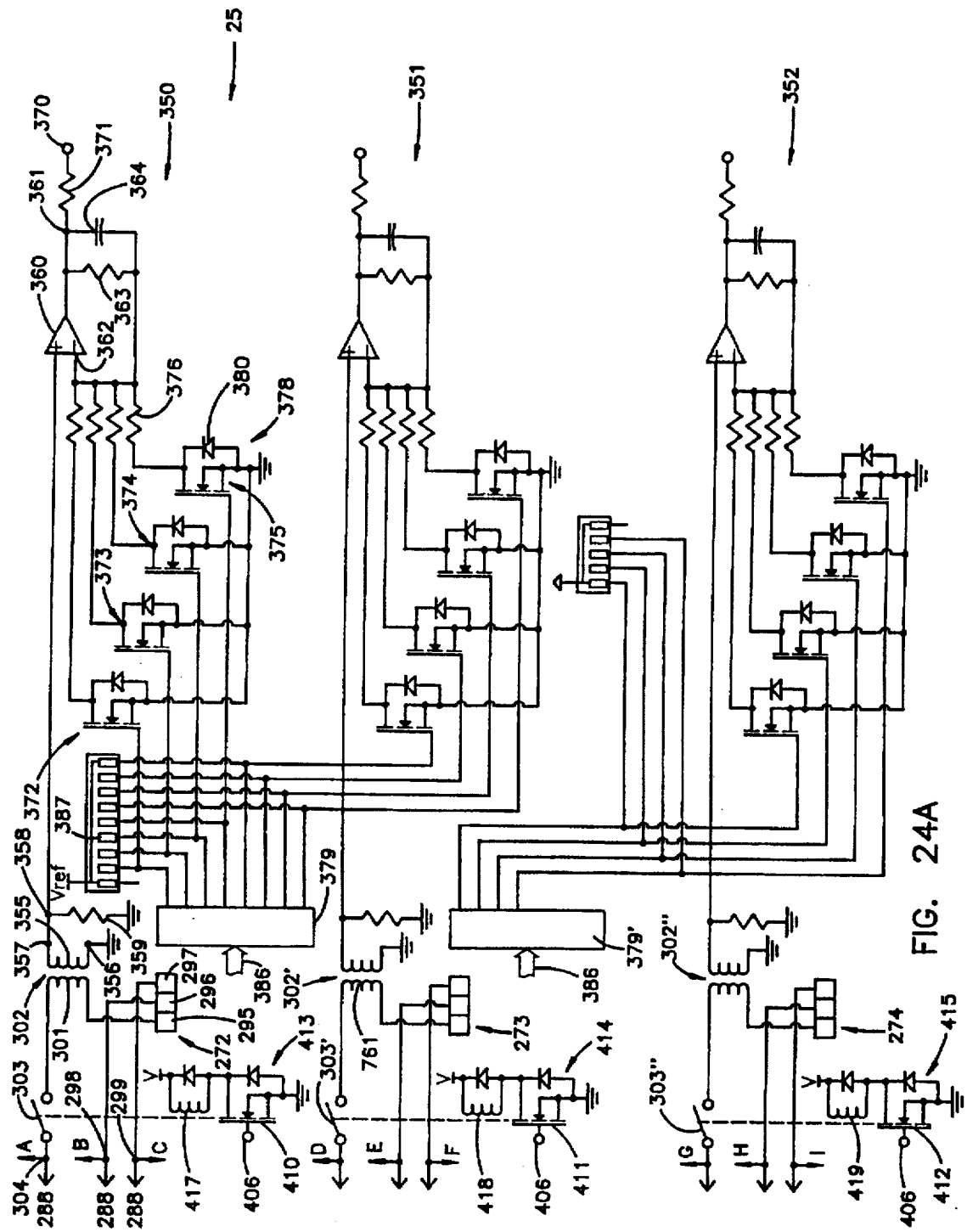
FIGS. 24A and 24B are a circuit schematic partially in block diagram form of the power outlet according to FIG. 22.

With reference initially to FIG. 24A, the circuit in housing 270 will now be described. The power outlet 25 includes an identical circuit for each receptacle therein. Accordingly, only the circuit for receptacle 272 is described in greater detail herein. Receptacle 272 includes contacts 295, 296 and 297. Contacts 296 and 297 are connected to junctions 298 and 299, respectively. Junctions 298 and 299 are, in turn, connected to the neutral supply and safety ground of a power supply circuit through two contacts 288. Contact 295 is connected to a coil 301 of a transformer 302. Coil 301 is connected in series with a switch 303, which is connected to a junction 304. Junction 304 is connected with a live conductor of the power supply circuit through a contact 288. It will be appreciated that any two or more of the first, second and third receptacles 272, 273 and 274 may be attached to the power supply circuit of a single power source. Alternatively, each of the receptacles 272, 273, 274 may be connected to a power supply circuit of a different, respective, power source.

Figure 24B:
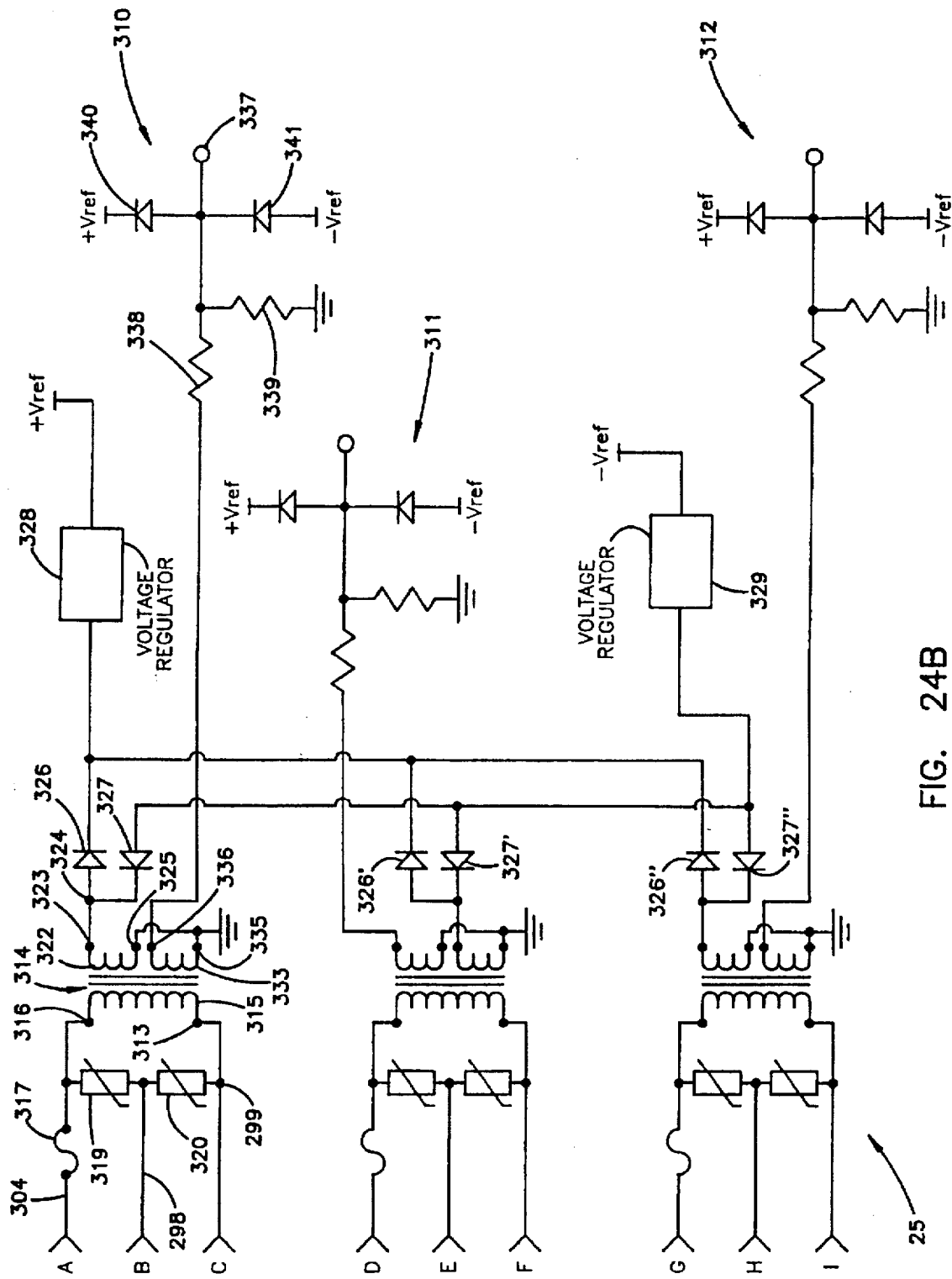

Power outlet 25 includes three voltage detectors 310 (FIG. 24B), 311 and 312 connected to receptacles 272–274, respectively. Voltage detectors 310–312 are identical, and accordingly, only voltage detector 310 is described in greater detail hereinbelow. Voltage detector 310 includes a transformer 314 having a first winding 315. Winding 315 has a terminal 316 connected through a fuse 317 to a junction 304, and a terminal 318 connected to a junction 299. A first overvoltage protection element 319 is connected between terminal 316 and an associated junction 298. A second overvoltage protection element 320 is connected between a terminal 299 and an associated junction 298. The overvoltage protection elements may be provided by any suitable conventional protection components, such as a 140-volt Metal Oxide Varister Transformer 314 (FIG. 24B) also has a secondary winding 322 with a terminal 323 connected to an output junction 324. Secondary winding 322 also has a terminal 325 connected to ground. Junction 324 is connected to the anode of a diode 326, and a cathode of a diode 327. The cathode of diode 326 is connected to voltage regulator 328. The anode of diode 327 is connected to a voltage regulator 329. Regulators 328 and 329 are conventional, and supply a positive output voltage and a negative output voltage, respectively. Each of the receptacles 272–271 associated with power outlet 25 includes a respective diode 326, 326'; 326" and diode 327, 327'; 327", which insures that the power supply circuit having a source with the largest magnitude of those connected to receptacles 272–274, supplies power to the regulators 328 and 329. The secondary winding 333 of transformer 314 has a terminal 335 connected to ground. A terminal 336 of winding 333 is connected to a terminal 337 through a resistor 338. A resistor 339 is connected between terminal 337 and ground. A diode 340 is connected between terminal 337 and +VREF. A diode 341 is connected between terminal 337 and −VREF. Diodes 340 and 341 insure that the voltage at terminal 337 is within the desired range of +VREF and −VREF.

Power outlet 25 also includes three current sensors 350, 351 and 352 (FIG. 24A). Each of the current sensors 350–352 is identical, and accordingly, only current sensor 350 is described in greater detail hereinbelow. Current sensor 350 includes a secondary winding 355 of transformer 302, with a terminal 356 connected to ground, and a terminal 357 connected to a junction 358. A resistor 359 is connected between junction 358 and ground. A non-inverting input of an amplifier 360 is connected to junction 358. The output 361 and inverting input 362 of amplifier 360 are connected by a resistor 363 and a capacitor 364, which are connected in parallel. The output 361 of amplifier 360 is also connected to a current sensor output 370 through a resistor 371. Four circuits 372, 373, 374 and 375 are connected in parallel between the inverting input of amplifier 360 and ground potential. These circuits are identical, and accordingly, only circuit 375 is described in greater detail hereinbelow. Circuit 375 includes a resistor 376 and a MOSFET element 378. The MOSFET element is an N-channel device having a source connected to ground potential, a drain connected to a respective resistor 376, and a gate connected to an interface circuit 379 to receive a control signal. A diode 380 is connected across each MOSFET element in a conventional manner to provide protection therefor.

The interface circuit 379 (FIG. 25) is connected to a microcontroller 385 through a communication bus 386. Interface circuit 379 has a respective output connected to the control input of each circuit 372–375 (FIG. 24A). Each control input is also connected to a respective pull-up resistor 387, only some of which are numbered. The interface circuit 379 selectively places circuits 372–375 in a conductive state to vary the net resistance of these circuits, which adjusts the gain of amplifier 360.

The microcontroller 385 (FIG. 25) associated with power outlet 25 may be implemented using any suitable conventional microprocessor, such as commercially available IC No. 80C31, available from Intel Corporation. The microcontroller 385 includes RAM and EPROM memory devices (not shown), and is connected to an interface circuit 388 through communication bus 389. Interface circuit 388 includes an A/D converter which converts analog voltage level and current level signals to digital representations thereof. The digital output signals are input to microcontroller 385. Microcontroller 385 is also connected to a visual indicator interface circuit 395 through a data bus 396. The visual indicator interface circuit 395 is connected to visual indicators 397–399, each of which preferably includes a red LED and a green LED. These LEDs are illuminated to implement indicators 276–278, respectively. Interface circuit 395 receives control signals from the microcontroller 385 and energizes the visual indicators 397–399 to emit red, green or yellow light by controlling current pulses input to the visual indicators. The visual indicators 397–399 are individually controlled to generate a red signal if the power sources for the receptacles 272–274 of power outlet 25 are overloaded, a green signal if the power sources have ample capacity to support an increased load, and a yellow signal if the power sources are near a maximum capacity.

Microcontroller 385 (FIG. 25) is coupled to connector 287 through a data bus 288. Connector 287 connects to the address conductor 87 and the signal conductors 83, 84 when the power outlet 25 is connected to a port 12. The microcontroller 385 is connected to a switch interface circuit 400 through a data bus 401. The association selectors 280–282 are connected to interface circuit 400. The association selectors for receptacles 272–274 are used to bind utility appliances 13–28, as is described in greater detail hereinbelow. The selected positions of the association selectors 280–282 are input to the microcontroller 385 From interface 400.

The microcontroller 385 (FIG. 25) is also connected to contacts 406 through a data bus 407 and an interface circuit 408. Contacts 406 are connected to a respective one of gates 410–412 (FIG. 24A) of MOSFET elements 413–415. The drain of each of the MOSFET elements 413–415 is connected to an associated one of three relay coils 417–419, respectively. Each of the MOSFET elements 413–415 is selectively energized to allow current to flow through its associated relay, and thus open switches 303, 303' and 303" associated therewith. When switches 303, 303' and 303" are open, receptacles 272, 273 and 274, respectively, are disconnected from their associated power source. When relays 417–419 are not energized, switches 303, 303' and 303" are closed, such that the receptacles 272–274 are connected to their associated power source.

The power outlet 25 (FIG. 25) may optionally include a TRIAC dimmer 425, which is connected to microcontroller 385 through a data bus 426. The dimmer 425 may be implemented using any suitable commercially available TRIAC dimmer. TRIAC dimmer 425 is responsive to signals from the microcontroller 385 to increase and decrease the power output to a respective power outlet 25.

Figure 26:
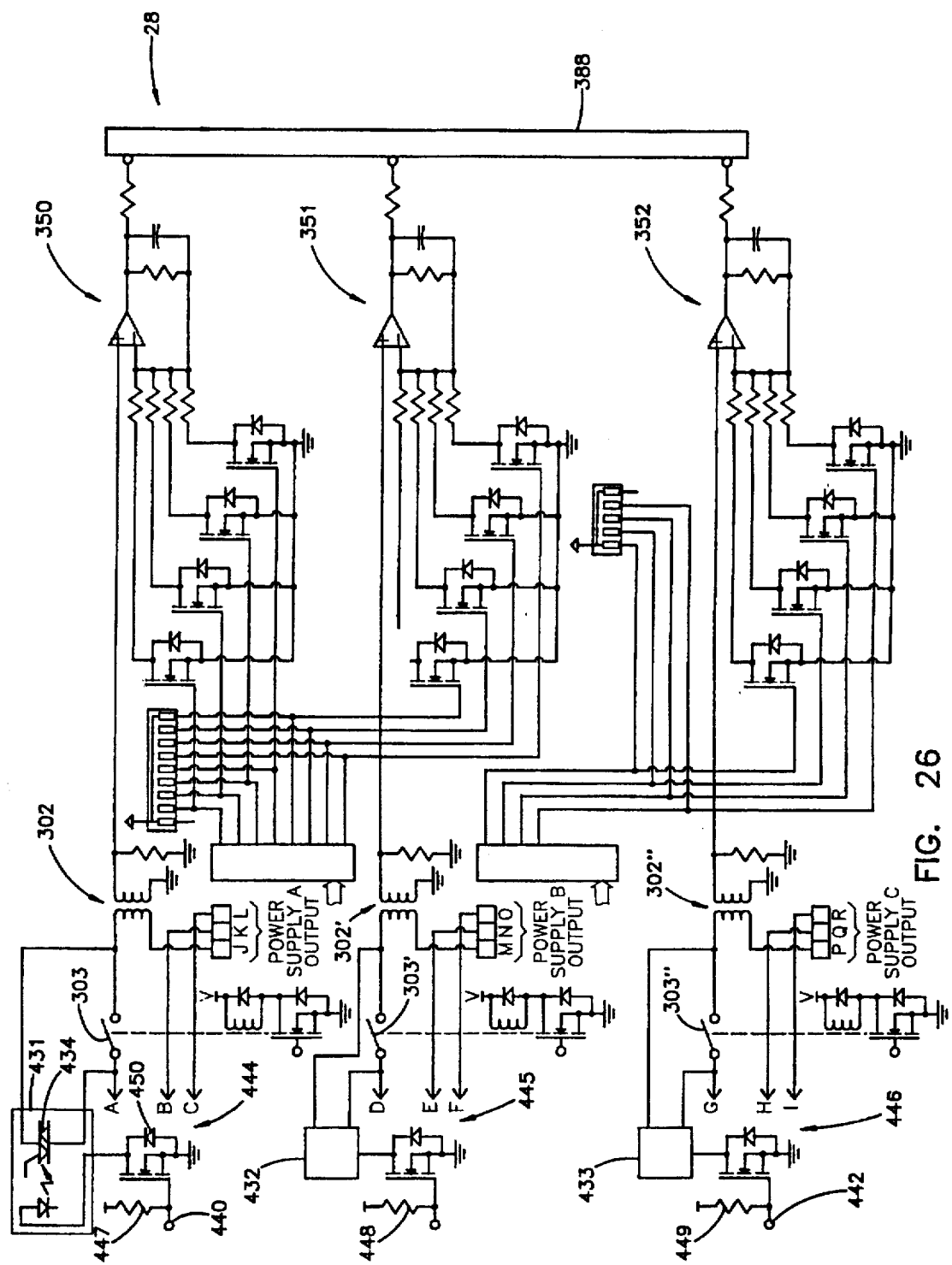
FIG. 26 is a circuit schematic partially in block diagram form of part of a power-in in the furniture arrangement according to FIG. 1.
Figure 27:
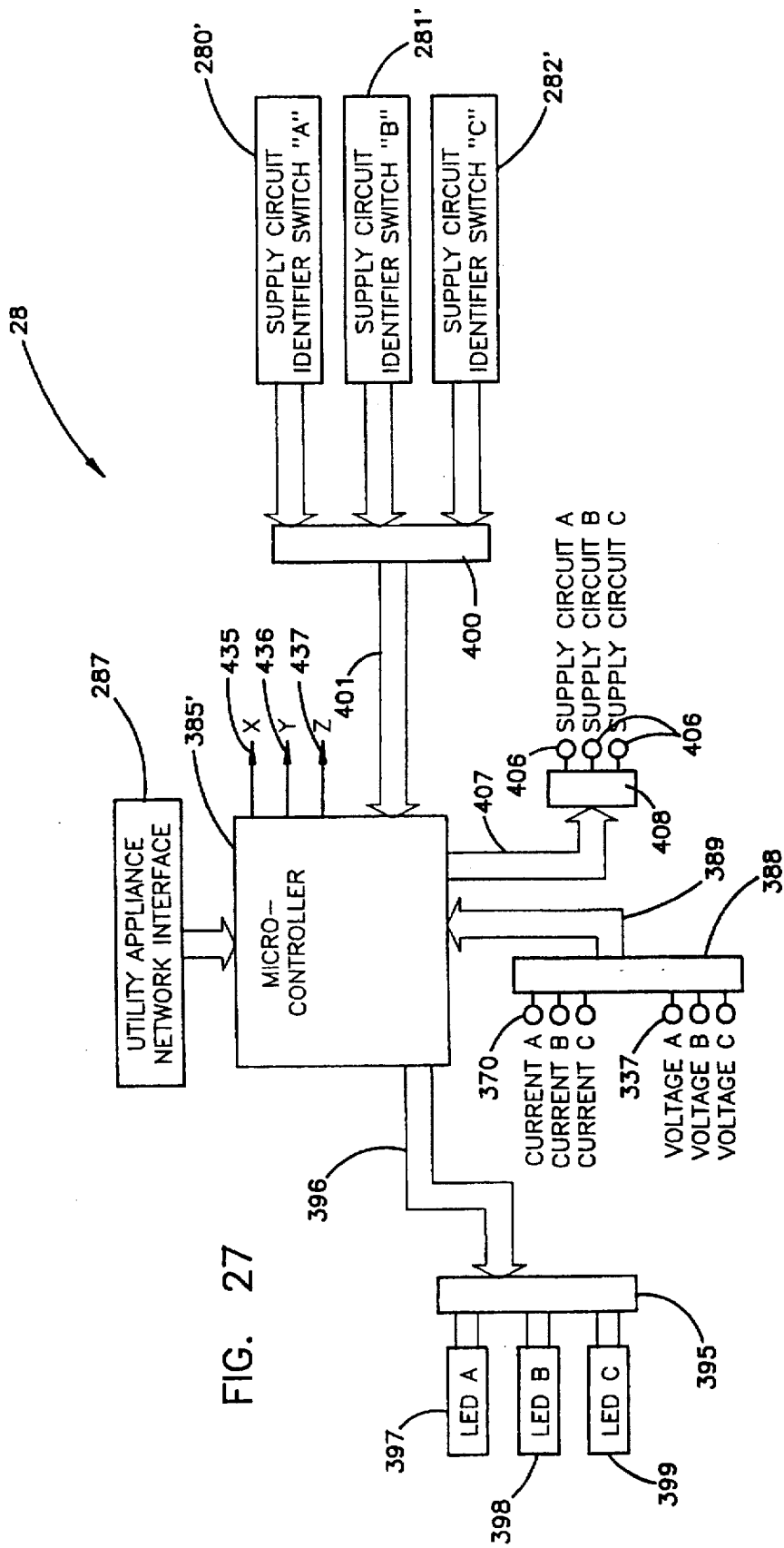
FIG. 27 is a circuit schematic in block diagram form of the power-in according to FIG. 26.

In addition to the utility appliances 13–27, a power-in 28 (FIG. 26) may be included in the utility disribution system. Power supplied to the modular furniture arrangement 2 is supplied through one or more power-ins 28. Power-in 28 is substantially similar to power outlet 25 and, accordingly, only those differences between power-in 28 and power outlet 25 are described in greater detail hereinbelow. Initially, it is noted that although the power-in 28 preferably does not include receptacles or association selectors, receptacles with respective association selectors may be provided in power-in 28. Each power-in 28 includes, by way of example, three identical power supply circuits. One, two, or more than three power supply circuits could be provided. Each power supply circuit source (e.g., 1, 2, 3) is identified using power source identification 280'–282' (FIG. 27). A first power supply circuit source is connected to terminals A, B and C (FIG. 26). A second power supply circuit source is connected to terminals D, E and F. A third power supply circuit source is connected to terminals G, H and I. Terminals B and C are directly connected to terminals k and l, respectively. Terminal A is connected to terminal j through a switch 303 which is identical to switch 303, in power outlet 25. Output terminals j, k and l are power-in outputs for the first power supply source. The power supplied to communications network 8 from the first power source is output at terminals j, k and l. Terminals D, E and F are similarly connected to output terminals m, n, o and input terminals G, H, I are similarly connected to output terminals p, q, r. The power-in 28 includes three clipping switches 431, 432 and 433 connected in parallel with "on-off" switches 303, 303' and 303," which are described above with respect to the power outlet 25. The "on-off" switches 303, 303' and 303" are used to turn off the power supplied throughout communications network 8 by disconnecting the output supply terminals j, m, p from the input terminals A, D, G, respectively. The clipping switches 431–433 are implemented using any suitable commercially available optically isolated switch, and are preferably implemented using optically isolated TRIACs. A microcontroller 385' (FIG. 27) includes three outputs 435, 436 and 437. Outputs 435–437 are connected to gates 440–442 (FIG. 26) of MOSFET elements 444–446, respectively. The gates 440–442 are also connected to pull-up resisters 447–449, respectively. MOSFET elements 444–446 are connected between the control input of a respective clipping switch 431–433 and ground potential. A diode 450 is connected to the source and drain of each of the MOSFET elements 444–446 for protection. The microcontroller 385' is thus programmed to control the relay switches 303, 303', and 303," so as to turn the power supply circuits on and off for the entire communications network, and the clipping switches 431–433, so as to effect a clip of approximately half of a cycle of power (but from a point of zero current to a point of zero voltage in order to avoid surges due to reactance in the circuit) as supplied by the power supply circuit.

It will be appreciated that those utility appliances which may be connected to the ports 12 of the furniture unit 3 include many other devices in addition to the switches 27, power outlets 25 and power-ins 28, described in detail herein, including utility appliances 12–24 and 26 relating to communication ports, telephone ports, thermostats, ventilation system controllers, security components and electronic locks and the like, as well as utility appliances which have not yet been developed, but will become available sometime in the future. Thus, the term "utility appliance," as used herein, includes any such device, component, or appliance which can communicate directly or indirectly with the network controller 11, and may be connected to the ports, or otherwise connected with the utility distribution system 1 and is directly or indirectly involved in the distribution of a utility to support the worker at workstations 4.

One aspect of the present invention, as discussed briefly above, is the ability of network controller 11 to automatically bind utility appliances 13–28. Binding is the logical association of various compatible appliances 13–28 within a furniture arrangement 2 (FIG. 1). By way of example, if a given furniture arrangement contains a plurality of power outlets 25 and switches 27, the binding process establishes which switches 236, 237 of utility appliance switches 27 control which receptacles 272–274 in power outlets 25. The method of binding receptacles in power outlets 25 and switches of utility appliance switch 27 described above uses association selectors 239, 240 in FIG. 19 and association selectors 280–282 in FIG. 22 on these utility appliances. The number, or letter, selected using selectors 239, 240 and 280–282 are communicated to the network controller 11 (FIG. 1) from the utility appliances 25, 27 upon initialization. During operation, when switch 236 changes state, utility appliance switch 27 communicates a state change condition to the network controller 11. The network controller 11 communicates an on or off signal to all the utility appliances 25 having a receptacle 272–274 which are bound to switch 236 by having the same selector number or letter.

Another method of binding will be described with reference to FIG. 1. This method uses network controller 11 or a personal computer 13. The personal computer 13 may be utilized as a personal controller connected to the network controller 11 through communications network 8 to control the utility appliances 13–28 within a workstation 4. Such a personal controller is thus a utility appliance, including a keyboard and monitor. Preferably the personal controller is subservient to the network controller 11. It is envisioned that the personal controller and/or network controller include a monitor which graphically displays the location of ports 12, the utility appliances connected to the ports, and their bindings in a workstation 4, or across the entire utility distribution system 1. The operator can change the bindings by entry of a personal identification number, and then entry of new bindings, using the keyboard or a mouse. In the case of the network controller 11, the facilities manager of the building would preferably have an exclusive ID which permits him/her to change bindings throughout the network.

In the case of a furniture arrangement 2 having multiple workstations 4, an automatic binding template may be created. The template can be set up by the facilities manager. The utility appliances 13–28 in each of the workstations 4 are automatically bound in a predetermined manner according to the template when they are plugged into a port 12. However, the binding could be altered using the network controller 11 or the personal controller implemented using personal computer 13.

With reference to FIG. 1, binding is accomplished internally in the following manner. The network controller 11 keeps a binding list. The list is created responsive to a binding command created when a utility appliance, such as switch 27, is initialized. The position address (AD0–AD2) of the utility appliance, such as switch 27, together with its association selector settings are used to derive a vocabulary representing the binding. A bind command binds all of utility appliances 13–26 and 28 to switches 236, 237 of utility appliance switch 27 by placing these utility appliances on the binding list for switches 236, 237 of utility appliance switch 27. Thereafter, an input parameter, such as a change of state of switches 236, 237 will cause all utility appliances 13–26, 28 on the binding list for switches 236, 237 to change state.

It will be recognized that the above binding methods only contemplate the presently preferred embodiments of the invention. Hence, it will be appreciated that binding could be accomplished using a variety of different procedures. Accordingly, the term "binding," as used herein, encompasses all of these methods of logically associating two or more utility appliances that are functionally compatible (e.g., using a selector, a template, or a binding list) and their equivalents.

Figure 28A:
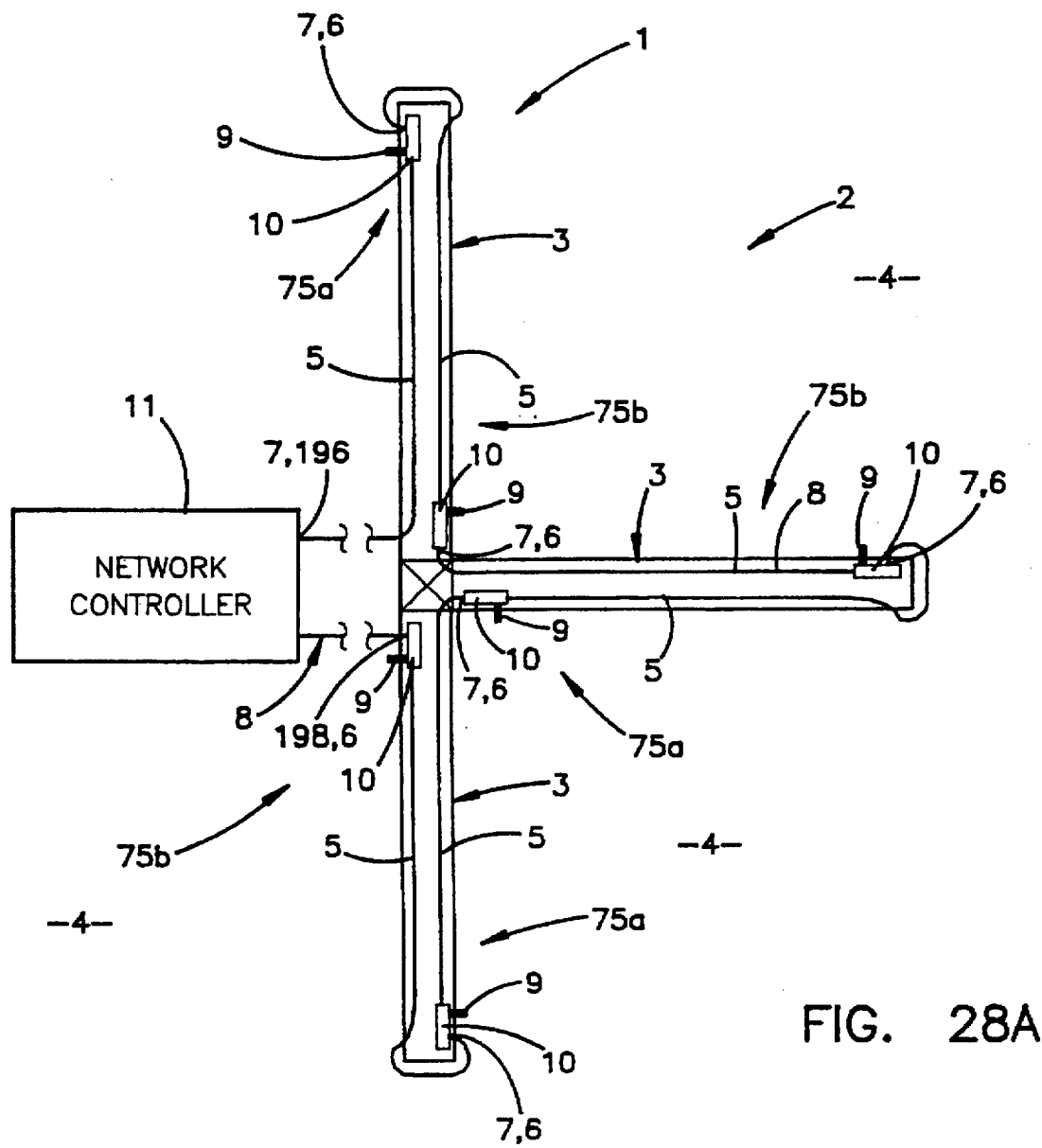
FIG. 28A is a top elevational view of a three-panel furniture arrangement including a utility distribution system according to the invention.
Figure 28B:
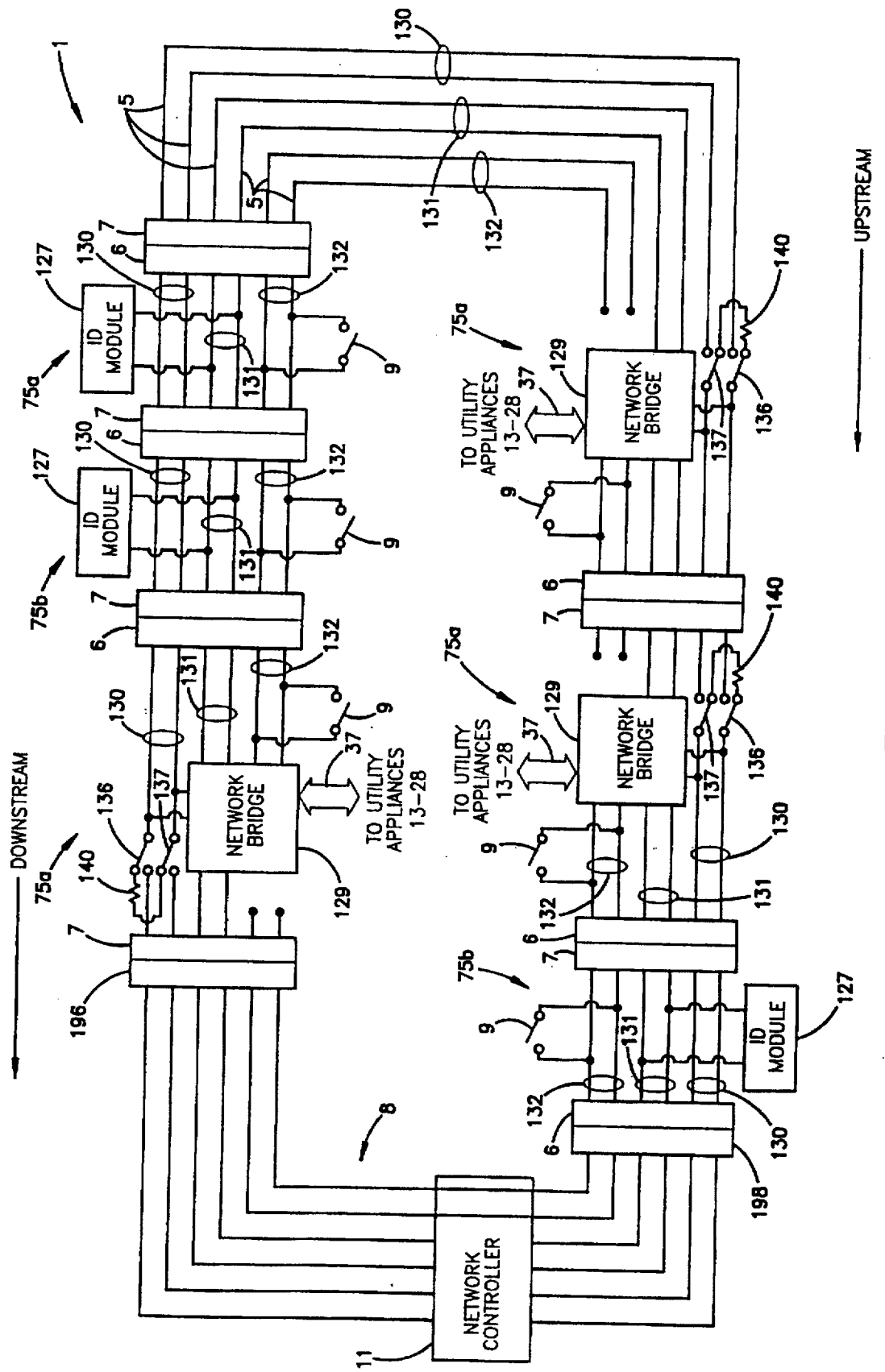
FIG. 28B is a circuit schematic of a utility distribution system for the furniture arrangement according to FIG. 28A.

Communications network 8 will now be described with reference to an illustrative, three panel furniture arrangement, which is shown schematically in FIGS. 28A and 28B. As described above, when partition panels 3 are positioned side-by-side, the male quick-disconnect connector 7 associated with each signal conductor 5 is inserted into the female quick-disconnect connector 6 of the next adjacent signal conductor 5. All signal conductors 5 in a particular furniture group 2 are similarly interconnected, so as to form the furniture arrangement network 36 configured in the form of a loop. Female connectors 196 (FIG. 28B) and male connector 198 of network controller 11 are connected to the last male connector 7 and the upstream female connector 6, respectively, to complete the furniture arrangement network 36.

In a similar manner, quick-disconnect connectors 96 and 97 (FIG. 9) associated with adjacent powerways 98 are joined to form a continuous power supply, which extend from power-ins 28 (FIG. 1) through the furniture arrangement 2 along with communications network 36, which is configured in a loop. Wire harnesses 94 (FIG. 9) are connected to the powerways 98 in each of the panels 3 having ports 12 located thereon. The utility appliance network 37 on each of the ported cover panels or faces 46 is plugged into connector 77 (FIG. 3) of bridge module 75A. The utility distribution system 1 associated with panels 3 (FIG. 2) is thus quickly assembled to provide both power and communication capability to the various ports 12.

The installer must position the first portion of workstation switches 9 (FIG. 28A), such that they identify whether the associated cover panel is the first cover panel of a workstation 4, or a continuation of a workstation 4. Those cover panels, or panel faces, which are the first portion of a workstation 4 have their associated switches 9 placed in the "on" position, and those panel faces which are not the first portion of a workstation 4 are placed in the "off" position.

Utility appliances 13–28, such as power outlets 25, switches 27, and power-ins 28 are connected to ports 12 on the cover panels or faces 46 of the panels 3 (FIG. 1). The association selectors 239, 240 (FIG. 19) or 280, 281, 282 (FIG. 22) are set to a position 1–9 or A–F to bind switches 236, 237, utility appliance switch 27 and receptacles 272–274 in power outlets 25, as described in greater detail hereinbelow. In general, it is envisioned that positions 0–9 will only associate utility appliances 13–28 in the same workstation 4, whereas positions A–F will associate utility appliances 138 network wide. For example, all utility appliances 13–28 (FIG. 1) in a workstation 4 having the same selector number (1–9) are associated. All utility appliances 13–27 in furniture arrangement 2 having the same selector letter (A–F) are associated.

If desired, a PC is connected to port 180 (FIG. 18) of the network controller 11. However, the PC is not necessary to communicate with the network controller 11 if keyboard 190 and display 192 are provided.

In general the use of a network controller 11 (FIG. 1), which communicates with bridge modules 75A, which in turn communicate with the utility appliances 13–28 and identification modules 75B, provides a number of significant advantages. The bridge modules 75A interface between the furniture arrangement network 36 and all the utility appliances 13–28 on a single ported panel face 46. This allows the furniture arrangement network 36 to have a loop, and eliminates branching in the network which would otherwise introduce noise into communications network 8 and severely limit the number of utility appliances 13–28 that could be connected to the network controller 11. Another advantage is that only a single component in each panel face 46 requires the external drive circuitry necessary to communicate over furniture arrangement network 36. In the limited confines of the utility appliance network 37, low cost drive circuits may be utilized for the utility appliances 13–28. An additional cost savings is provided by the low voltage DC power which is carried over conductors, 85 and 86 (FIG. 8). The small power requirements allow a low cost power supply (not shown) in bridge module 75A, and coupled to powerway 92, to fulfill the power requirements of two panel faces 46 on a furniture unit 3.

OPERATION

In general, the illustrated network controller 11 is assigned the following tasks:

1. Transmitting a periodic message;
2. Receiving operating instructions from utility appliances 13–28 connected in the communications network 8;
3. Receiving utility appliance operating parameters;
4. Transmitting utility appliance instructions responsive to device parameters and stored instructions;
5. Identifying utility appliances 13–28 in the communications network 8;
6. Identifying the location of utility appliances 13–28 in the utility appliance network 37;
7. Identifying furniture units 3 in the network 8;
8. Identifying the location of bridge modules 75A in the furniture arrangement network 36;
9. Storing bindings; and
10. Reinitializing the system when a reset is required.

The illustrated bridge module 75A is assigned the following tasks:

1. Monitoring the periodic messages on the furniture arrangement network 37;
2. Receiving operating instructions from utility appliances 13–28 on an associated ported panel face 46, and communicating the same to the network controller 11;
3. Receiving utility appliance parameters from utility appliances 13–28 and communicating the same to the network controller 11;
4. Receiving instructions from the network controller 11, and relaying the same to utility appliances 13–28;
5. Receiving location information from utility appliances 13–28, and communicating same to the network controller 11;
6. Identifying the relative location of the bridge module 75A, and communicating same to the network controller 11;
7. Identifying identification modules 75B associated with nonported panel faces 47, and communicating the same to network controller 11; and
8. Identifying beginning of workstations 4, and communicating workstation information to the network controller 11.

The illustrated utility appliance switch 27 has the following tasks:

1. Identify the location of the switch 27, and communicate the same to bridge module 75A;
2. Download operating instructions to the bridge module 75A upon initialization;
3. Transmit association selector positions 239, 240 for each switch of the utility appliance switch 27 to the bridge module 75A; and
4. Transmit switch control signals to bridge module 75A.

The illustrated power outlet 25 is assigned the following tasks:

1. Identify the location of the power outlet 25 on a ported panel face 46, and communicate the same to bridge module 75A;
2. Download operating instructions to bridge module 75A upon initialization;
3. Transmit the positions of the association selectors 280–282 for each receptacle 272–274 on power outlet 25 to the bridge module 75A;
4. Transmit voltage, current and power levels for each receptacle 272–274 to bridge module 75A;
5. Receive and implement an instruction to turn one or more of the receptacles 272–274 on and off;
6. Provide a visually perceptible indication of the power draw on the power circuit to which each receptacle 272–274 on power outlet 25 is connected;
7. Provide dimmer control for each receptacle 272–274 on power outlet 25; and
8. Provide a response to a circuit identification signal transmitted from power-in 28.

The power-in 28 is assigned the following tasks:

1. Identify the location of the power-in 28 on a ported panel face 46, and communicate the same to bridge module 75A;
2. Download operating instructions to bridge module 75A upon initialization;
3. Provide a visually perceptible indication of the power draw on each power circuit therethrough;
4. Transmit a signal from the power-in 28 to the receptacles 272–274 of the power outlets 25 having a common power source;
5. Selectively turn on and off the power supply circuits for the furniture arrangement; and
6. Transmit voltage, current and power levels for each circuit controlled by it.

A general description of the operation of the illustrated utility distribution system 1 will now be made with reference to FIGS. 28A and 28B. A more detailed description of the utility distribution system 1 follows this general description.

During normal operation, a network controller 11 (FIG. 28B) transmits a periodic message, referred to herein as the "heartbeat," every 50 msecs. Bridge modules 75A accept these heartbeats. If one of the bridge modules 75A does not detect a heartbeat for 500 msecs., the bridge module is reset. The network controller 11 resets when any one of the bridge modules 75A resets, as described herein below. A utility appliance 13–28 will also reset when the bridge module 75A to which it is connected through a utility appliance network 37 resets. Thus, when the network controller 11 suspends transmission of the heartbeat, every bridge module 75A, and thus every utility appliance 13–28 in the communications network 8 coupled to the network controller 11, resets.

During normal operation, utility appliances 13–28 (FIG. 28B) transmit state information to network controller 11. The network controller 11 is responsive to state information to transmit control information to utility appliances 13–28. The network controller 11 and utility appliances 13–28 communicate with one another through bridge modules 75A. The programs that derive the control information from the state information are loaded into the network controller 11 from the utility appliances 13–28 during initialization, as described in greater detail hereinbelow.

The network controller 11 (FIG. 1) has the ability to automatically determine the location of utility appliances 13–28 on a furniture unit 4. This is done by identifying the location of utility appliances 13–28 on a furniture unit portion, such as panel face 46. The location of utility appliances on the furniture unit 3 is determined from address information AD0–AD2 (FIGS. 8, 8A, 8B) available at ports 12 on the furniture units 3. The locating of utility appliances 13–28 is also facilitated by the ability to evaluate furniture units 3 using communication modules 75 (FIG. 4), as described in greater detail hereinbelow.

Utility appliances 13–28 (FIG. 1) are also associated with one another using the network controller 11, as described in greater detail hereinbelow. For example, in the embodiment described herein, each utility appliance 25 (FIG. 22) includes association selectors 280–282, and each utility appliance 27 (FIG. 19) includes association selectors 239, 240. The network controller 11 (FIG. 1) associates all utility appliances 13–28 that are within a workstation 4, and have their association switch set at the same one of positions 0–9. The network controller 11 also associates all utility appliances 13–28 within the furniture system 2 having their association switch at the same one of positions A–F. Where a control utility appliance, such as a switch 236, 237, in utility appliance switch 27 and a controlled utility appliance, such as a receptacle 272, 274 in power outlet 25, are associated and functionally compatible, they are bound, and changing the state of the control utility appliance (e.g., flipping the switch 236, 237) will result in a change in the state of the associated controlled utility appliance (e.g., turning on or off the power supply to a receptacle 272–274).

An important characteristic of the utility distribution system 1 (FIG. 1) described herein is that communication between utility appliances 13–28 and network controller 11 utilizes a request procedure. When the state of a utility appliance 13–28 changes, the utility appliance attempts to establish a virtual circuit with the network controller 11. A virtual circuit is a connection, through communications modules 75 and between a utility appliance and the network controller, which permits communication therebetween. Only when the network controller 11 is ready to process the state information does it accept the virtual circuit. The utility appliances 13–28 will then send the eluent state information to the network controller 11. Thus, the state information that is sent to the network controller 11 is always the most up to date information available. Similarly, when the network controller 11 program determines that some control information should be sent to one of the utility appliances 13–28, it first attempts to establish a virtual circuit with the utility appliance. Only when this virtual circuit is established does the network controller 11 program actually develop the control message that is to be sent to the utility appliances 13–28. Thus, the utility appliances 13–28 are always commanded to perform actions consistent with the most recently detected state of the communications network 8. This avoids having either state or control information enqueued, waiting to be processed.

The utility appliance networks 37 (FIG. 9) are designed as polled networks. Each bridge module 75A creates a poll list based on addresses AD0–AD2. Bridge module 75A polls each utility appliance 13–28 connected to a port 12 in its associated utility appliance network 37, and on its poll list, in address (AD0–AD2) order sequence. Periodically, the bridge module 75A acts to determine if any new utility appliances 13–28 have been added by connection to a port 12 in the utility appliance network 37. If new utility appliances 13–28 are detected, the poll list is updated to include the new utility appliance. Once a utility appliance 13–28 has been added to the poll list, the added utility appliance must respond to each poll (or one of its retries). If a utility appliance 13–28 fails to acknowledge a poll message (or any of its retries), the bridge module 75A will reset and restart operation with an empty poll list. If a utility appliance 13–28 having responded to a configuration message, and thereby having placed itself on the poll list, thereafter receives another configuration message, the utility appliance will reset. Thus a failure (or removal) of any configured utility appliance 13–28 will cause the bridge module 75A to reset, and the reset of the bridge module 75A will cause all configured utility appliances on that utility appliance network 80 to reset when an attempt is made to reconfigure them.

The network controller 11 (FIG. 28A) resets the utility distribution system 1 upon initialization of the communications network 8, a failure in the communications network 8, a change in the utility distribution system 1, or a power down. A failure in the communications network 8 will be detected when an activity sensor at the female connector 196 ("end of loop") of the network controller 11 does not detect network activity when a signal is transmitted on the furniture arrangement network 36 or when the network controller 11 makes repeated transmission without receiving an acknowledgement. Whenever the network controller 11 resets, the network controller initiates a reset sequence to determine the relative location of utility appliances 13–28 and communication modules 75 in the system. The first action taken by network controller 11 upon reset is to suspend the heartbeat for about four seconds. This will insure that all bridge modules 75A (FIG. 28B) in network 8 are reset, and will also result in utility appliances 13–28 connected to bridge modules 75A resetting as described hereinbelow.

The network controller 11 (FIG. 28B) and bridge modules 75A each initiate a sequence on the identifier channel 131 to determine the number of downstream identification modules 75B between it and a next sequential bridge module 75A or controller 11. The bridge modules 75A also check the status of the configuration channel 132 to determine if any upstream first-portion-in-workstation switches 9, associated with it or a connected upstream identification module 75B, is closed, so as to ascertain if they are a first bridge module 75A in a workstation. Bridge modules 75A will also attempt to reconstruct the utility appliances 13–28 attached to the utility appliance network 37 associated therewith as described briefly above, and in greater detail hereinbelow.

The utility appliances 13–28 upon being reset, attempt to establish a connection, which shall be referred to herein as a virtual circuit, connection with the network controller 11, for the purpose of sending their control programs to the network controller 11. In the preferred embodiment, the control programs are written in a dialect of the, FORTH program language, which is an interpreted language, but any suitable programming language could be utilized, including a compiled language.

After reset, the data channel 130 (FIG. 28B) of the furniture arrangement network 36 is broken into respective segments by relay switches 136, 137 associated with each bridge module 75A. One bridge module 75A, and any number of sequential identification modules 75B, are included in each segment. After suspending the heartbeat for approximately four seconds, the network controller 11 re-enables the heartbeat, but disables any reset that might be caused by a network activity sensor on the female connector 196 failing to detect network activity. The network controller 11 then sends a configuration message addressed to any unconfigured bridge module 75A on the furniture arrangement network 36. At this stage, the data channel 130 of the furniture arrangement network 36 is segmented, so that there is only one unconfigured bridge module 75A on the furniture arrangement network that will receive this message. The message includes information that this unconfigured bridge module 75A is bridge module number one. Bridge module number one then closes its relay switches 136, 137, reconnecting the data channel of the furniture arrangement network 36 to the next segment. Bridge module number one also determines the number of identification modules 75B associated therewith, and responds to the configuration message with the number of identification modules 75B determined and the status of the first-portion-in-workstation channel 131.

Upon receiving this configuration response message from bridge number one, the network controller 11 then sends a configuration message addressed to any bridge module 75A on the furniture arrangement network 36. This message indicates that the unconfigured bridge module 75A is network bridge number two. At this stage, bridge module number one has joined the network controller segment with the next segment, so that there are two bridge modules 75A on the furniture arrangement network 36. Network bridge number one is already configured, so it does not respond to the new configuration message. The second network bridge module 75A is the only unconfigured bridge module 75A on the data channel, so it responds to the configuration message by closing its relay switches 136, 137, reconnecting the data channel of the next downstream segment, and responds to the network controller 11 with a configuration response message. The configuration response message includes the number of identification modules 75B that are associated with the second bridge module (between it and the next bridge module 75A or controller 11), and the status of the first-portion-in workstation switches 9 on channel 132. The network controller 11, upon receiving this configuration response message, will send a new configuration message identifying the next unconfigured bridge module 75A as bridge module number three. The procedure continues in a similar fashion as that described above with respect to bridge modules number one and two, until all bridge modules 75A on the furniture arrangement network 37 are configured.

After the network controller 11 has received the configuration response message from the last bridge module 75A, the network controller 11 sends a final configuration message addressed to any unconfigured bridge modules on the furniture arrangement network 36. Since all bridge modules 75A have been configured, the message will not generate any configuration response message. The software associated with network controller 11 then checks whether the configuration message has generated any activity at the female connector 196 of the network controller. Normally, this will be the case, since all bridge modules 75A on the data channel 130 of the furniture arrangement network 36 will now form a single complete loop frown the male connector 198 to the female connector 196 of the network controller 11. The network controller 11 then rearms the activity sensor on the female connector 196, so that any failure to detect activity while sending a message will cause a reset of the network controller 11, as described hereinbelow.

If activity is not detected at the female connector 196 when the final configuration message is sent, network controller 11 identifies a fault condition, and assumes that there is some problem either with one of the bridge modules 75A or with the conductivity of the furniture arrangement network 36. Since network controller 11 has ascertained the total number of bridge modules 75A up to the fault in the initialization procedure, as well as the total number of modules 75B coupled to the counted bridge modules 75A, and since each of these bridge modules 75A and identification modules 75B corresponds to a furniture portion (e.g., a panel face), the network controller 11 can present, as diagnostic information, the sequential order number of the furniture component that is the most likely location of the fault.

Once this configuration of furniture arrangement network 36 is completed, the network controller 11 begins accepting virtual circuits between utility appliances 13–28 (FIG. 1) and the network controller, and loading and initializing control programs from them. Once all the control programs have been loaded and initialized, and all the bridge modules 75A have been configured, the system start-up phase is complete.

It is noted that communication between bridge module 75A (FIG. 28B) and network controller 11 is coordinated according to the ability of the network controller 11 to process information. This is accomplished by a sender (one of bridge module 75A or network controller 11) having a request to communicate, but delaying information transmittal until the receiver (the other one of network controller 11 and a bridge module 75A) is ready to receive the message. The ability to receive is communicated by an acknowledgement being communicated to the sender with a non-zero credit. A credit is the amount of information (e.g. number of words) that the receiver will accept from the sender.

Figure 29:
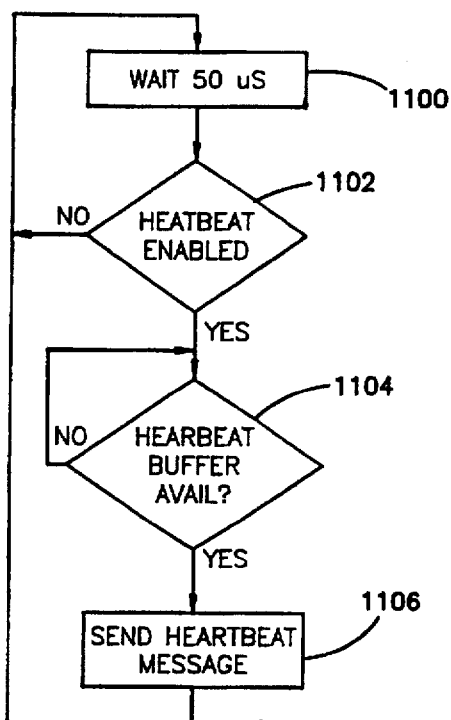
FIGS. 29–38 are flow diagrams for the program in the network controller according to FIGS. 17 and 18.

The operation of utility distribution system 1 will now be described in greater detail, with reference to the flow charts of FIGS. 29–53D. A periodic, or heartbeat, message is transmitted by the network controller 11 (FIG. 18) at predetermined intervals (e.g., every 50 reset.) for monitoring the integrity of tile furniture arrangement network 36. Microcontroller 179 is programmed to wait 50 msec., as indicated in block 1100 (FIG. 29). The program determines whether the heartbeat is enabled in decision block 1102. If the heartbeat is not enabled, the program returns to block 1100 and waits another 50 msec. When the heartbeat is enabled, as determined in block 1102, the program waits for a heartbeat buffer to become available as indicated in block 1104. Microcontroller 179 includes a dedicated memory location for the heartbeat message, and the program must wait for this buffer to become available after a previous transmission, as indicated in block 1104. When the buffer becomes available, the heartbeat is sent by placing the message in the outbound message queue as indicated in block 1106.

Figure 30:
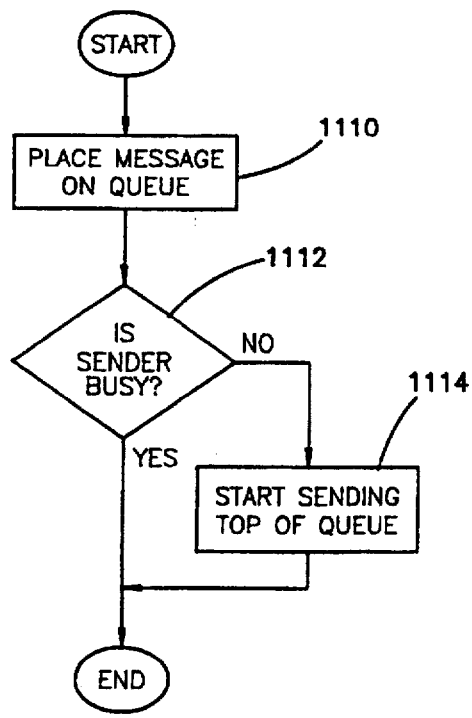

To transmit the heartbeat message, or to transmit any message on communications network 8, a message is loaded into a transmission queue, which is located in the microcontroller memory of the sending mechanism (e.g., a utility appliance 13–28, network controller 11, bridge module 75A, etc.), as indicated in block 1110 (FIG. 30). The program then determines whether the sender is busy, as indicated in decision block 1112. If the sender is busy, the microcontroller 179 does not start the sender, but exits the subroutine. If the sender is idle, the program starts the sender by initiating a sender interrupt (FIG. 31) as indicated in block 1114.

Figure 31:
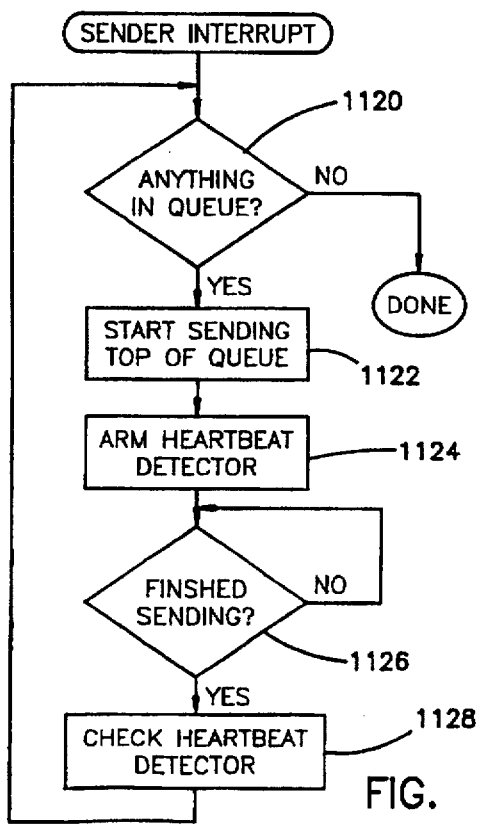

The program is responsive to a sender interrupt to transmit a message stored in the message queue. When a message is to be transmitted by the network controller 11, the microcontroller 179 initially determines whether anything is stored in the internal transmission message queue, as indicated in block 1120 (FIG. 31). If no message is stored in the transmission queue, the microcontroller 179 leaves the sender interrupt subroutine. If a message is stored in the sender message queue, the microcontroller 179 starts sending the message by outputting the signal onto communication bus 130 (FIG. 17) through interface 213, transformer 214 and connector 198, as indicated in block 1122 of FIG. 31. The program then arms a detector connected to female connector 196. The detector monitors interface 210 (FIG. 17) to determine whether a signal is present on channel 130 at the female connector 196, as indicated by block 1124 of FIG. 31. The program then waits for the message to end, as indicated in decision block 1126. When the end of the transmission is detected, the microcontroller 179 checks to determine whether the message was received at the network controller input interface 210 (FIG. 17), as indicated in block 1128. If the message was not received, the microcontroller 179 determines that there is a fault in the line and resets the network controller 11.

Figure 32:
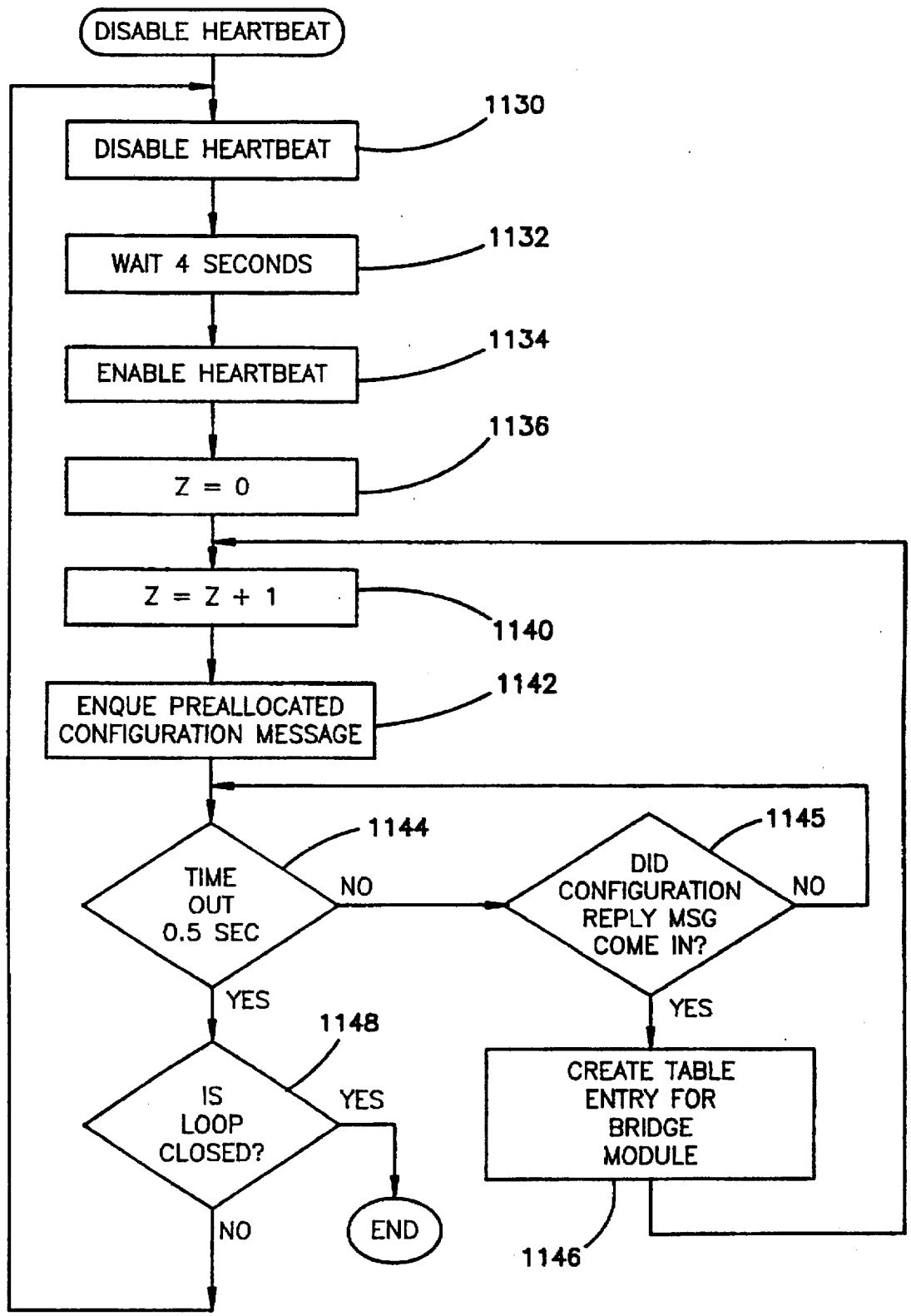

Network controller 11 initializes the utility distribution system 1 when the system is installed, whenever a fault or power loss occurs, causing a reset of network controller 11, or whenever the furniture arrangement 2 is reconfigured. The network controller 11 initializes the system by disabling the heartbeat message as indicated in block 1130 (FIG. 32). The program waits approximately 4 seconds, as indicated in block 1132, which causes a reset of all bridge modules and all utility appliances. Microcontroller 179 enables the heartbeat message as indicated in block 1134. The program then sets a station number variable Z equal to zero as indicated in block 1136. The program increments the station number variable in, as indicated in block 1140. Tile microcontroller then enqueues a preallocated configuration message, "unconfigured station is station number Z" as indicated in block 1142. The program in the microcontroller waits 0.5 second for a reply as indicated in decision blocks 1144 and 1145. If a reply message is received from a bridge module 75A, stating, "station Z is in a configured state," the program creates a table in microcontroller 179 for the bridge module 75A, as indicated in block 1146. The table is used to store information about that panel face 46 associated with bridge module 75A. The program then returns to step 1140, wherein the station number variable Z is incremented. If a reply is not received in the 0.5 second time period, as identified in decision block 1144, the microcontroller 179 determines whether the furniture arrangement network 36 loop is closed, as indicated in block 1148. The loop is closed if the signal detector detects a message at interface 210 (FIG. 17) connected to the female connector 196 of network controller 11. If the loop is closed, identification of the stations on the loop is complete. If the loop is not closed, as determined in decision block 1148 and returns to block 1130 to attempt initialization again.

Fault locations are detected when the network controller 11 fails to initialize the entire furniture arrangement network 36. Optionally, fault locations may also be detected using optical coupler 150 (FIG. 15). The optical coupler 150 is used to detect when a next adjacent upstream bridge module 75A (FIGS. 28A, 28B) (toward female connector 6) is powered down to allow partial operation of the system. When an upstream bridge module 75A is not powered up, the optical coupler 150 will not output any signal, because the upstream bridge module will not poll the identification chapel 131. Because upstream powered down bridge modules 75A are detected automatically, using optical coupler 150, the point of failure is identified to a downstream coupler 10 which is still connected to the network controller 11. The downstream coupler 10 can thus remain operational and communicate the fault information to the network controller 11.

After all the bridge module 75A positions are identified, the network controller 11 enters a wait state. The network controller 11 waits for messages from bridge modules 75A. There are heartbeat messages, acknowledgement messages, data messages and extended data messages, configuration messages, and configuration response messages. These messages are represented by HEARTBEAT, ACK, DATA, XDATA, CONFIG and CONFIG RESPONSE, respectively. Each message has a source ID (sender), a destination ID (receiver), a message type, and a message. Whenever a data or extended data message is transmitted, the destination utility appliance sends a reply. This provides an integrity check, as well as a very reliable communication method.

Figure 33:
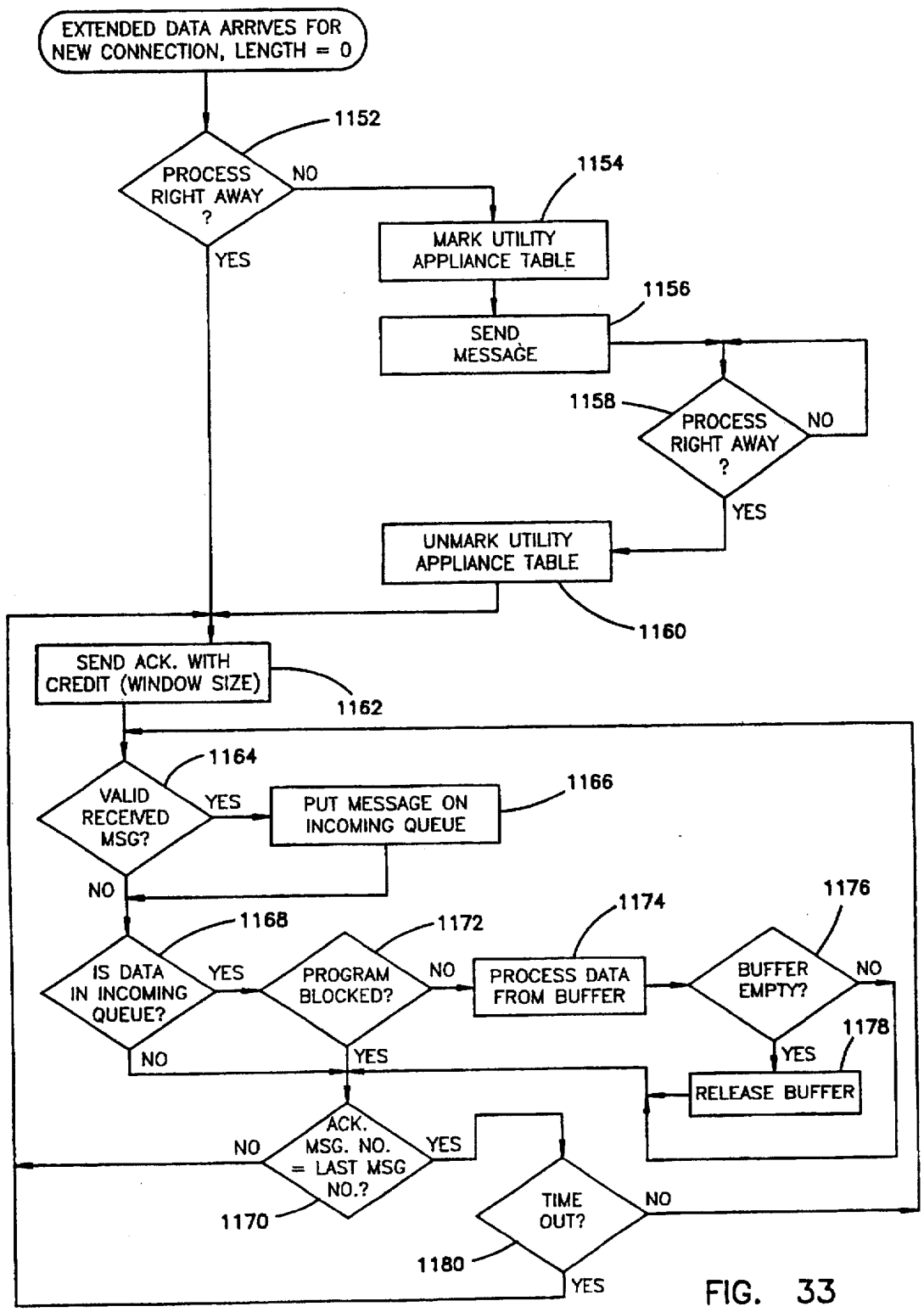

When the network controller 11 receives a message, it determines whether to process the message right away, or if it must wait, as indicated in decision block 1152 (FIG. 33). If it must wait, it marks the utility appliance table with which it is associated, as indicated in block 1154. The program then turns the message into an acknowledgment message with credit equal to zero and sends the acknowledgement message back to the bridge module 75A, as indicated in block 1156, and waits until it can process the message to complete the virtual circuit, as indicated in block 1158. An acknowledgement equal to zero means that the network controller 11 cannot "talk" right now, wait for a full acknowledgement with credit. When the microcontroller 179 can process the message, as determined in block 1158, the program unmarks the utility appliance table as indicated in block 1160. If the program could process the message right away, as determined in block 1152, or after it becomes able to process the message, as determined in block 1158, the program transmits an acknowledgement with credit to the bridge module 75A for transmission to the utility appliances 13–28 as indicated in block 1162. If a valid message is received, as determined in decision block 1164, the program puts the message on the incoming queue, as indicated in block 1166. If valid data is not received, or after a valid message is placed on the incoming queue, the program determines whether data is in the incoming queue, as indicated in block 1168. If data is not in the incoming queue, the microcontroller 179 determines whether the acknowledgment message from the network controller 11 equals the last message received, as indicated in decision block 1170. If the sequence number of the last message does not equal the sequence number of the last acknowledgement message, as determined in block 1170, the microcontroller 179 sends a new acknowledgement with a credit as indicated in block 1162. If the microcontroller 179 determines in block 1168 that data is in the incoming queue, the microcontroller 179 determines whether the program is blocked, as indicated in block 1172. If the program is blocked, the microcontroller 179 proceeds to decision block 1170. If the program is not blocked, the program processes data from the buffer as indicated in block 1174. The program then checks whether the buffer is empty, as indicated in block 1176. If the buffer is not empty, the program goes to block 1170. If the buffer is empty, it is released as indicated in block 1178, and the program proceeds to decision block 1170. The program then checks for a timeout, as indicated in block 1180. If a timeout occurs, the program sends a new acknowledgement. If a timeout is not detected, the program checks for a valid receive message.

Figure 34:
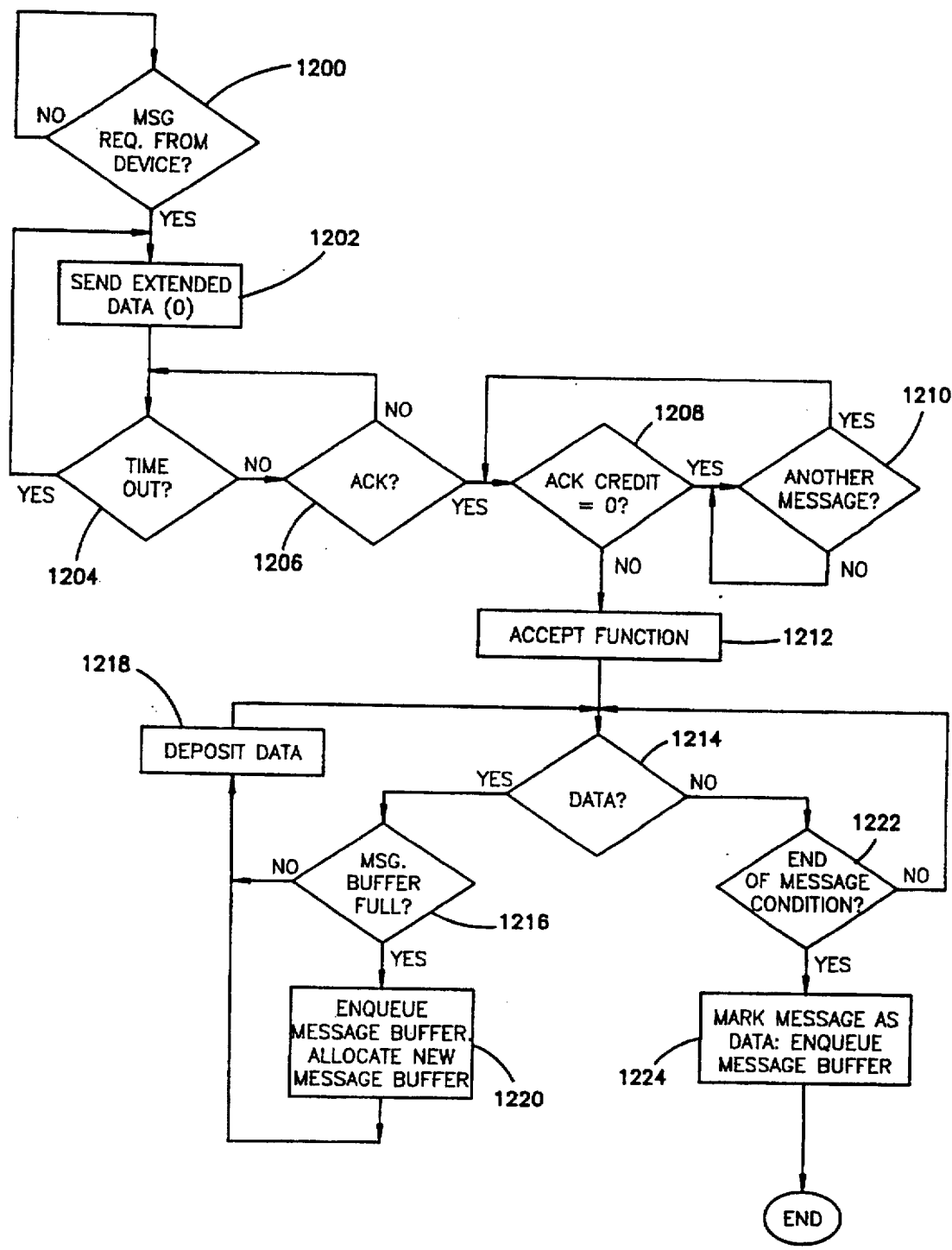
Figure 35:
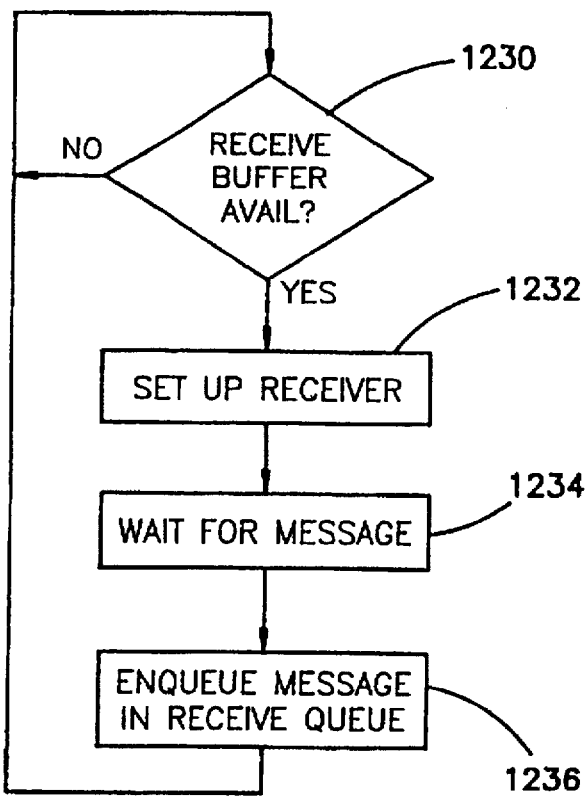
Figure 36:
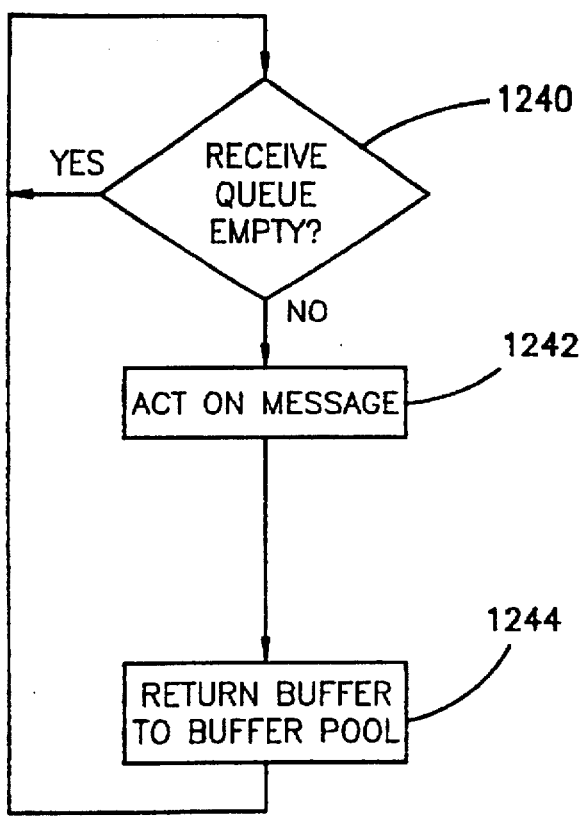
Figure 37:
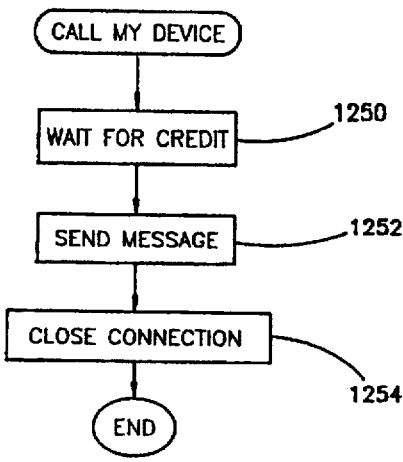

The bridge module 75A awaits messages: as indicated in decision block 1200 of FIG. 34. When a message is received from a utility appliance, the microcontroller 165 sends an extended data message with a zero data length to the network controller, which requests a virtual circuit, as indicated in block 1202. The program in bridge module 75A then awaits an acknowledgement before a timeout, as indicated by decision blocks 1204 and 1206. If the credit in the acknowledgement equals zero, as indicated in block 1208, the program awaits another message as indicated in decision block 1210. When a message is received with a non-zero credit, the program executes the accept function, as indicated in block 1212, causing an indication (non-zero credit) to be sent to the utility appliance so that it may send its data. The program then awaits incoming data in block 1214. When data arrives, the program determines whether the outgoing message buffer is full in block 1216. If the buffer is not full, the data is deposited in the buffer, as indicted in block 1220. When a new buffer is available, data is deposited in the new buffer, as indicated in block 1218. If the message is not a data message, as determined in block 1214, the program determines whether it is the end of a message in block 1222. If it is not the end of a message, the microcontroller 165 returns to decision block 1214. If it is the end of a message, the message is marked as DATA as indicated in block 1224 and the buffer is enqueued for transmission to the network controller 11 subject to flow control. The microcontroller 165 then exits the subroutine.

As indicated above, the bridge module 75A and the network controller 11 communicate over the data channel 130 of Furniture arrangement network 36. To receive a signal, they initially wait for a receive buffer to become available as indicated in block 1230 of FIG. 35. When the receive buffer becomes available, the program sets up the receiver to receive data from the furniture arrangement network 36, as indicated in block 1232. The program then waits for a message as indicated in block 1234. When the message is received, it is placed in the receive queue as indicated in block 1236. The program monitors the receive queue and waits for the queue to have a message therein, as indicated in block 1240 of FIG. 36. When a message is in the receive queue, the program acts on the message as indicated in block 1242, and returns the buffer to the buffer pool as indicated in block 1244.

To send a message on the furniture arrangement network 36, the network controller 11 or bridge module 75A waits for a credit to be received as indicated in block 1250 (i.e., establishing a virtual circuit). When a credit is received, the message is transmitted as indicated in block 1252. The virtual circuit is then closed at block 1254.

Figure 38:
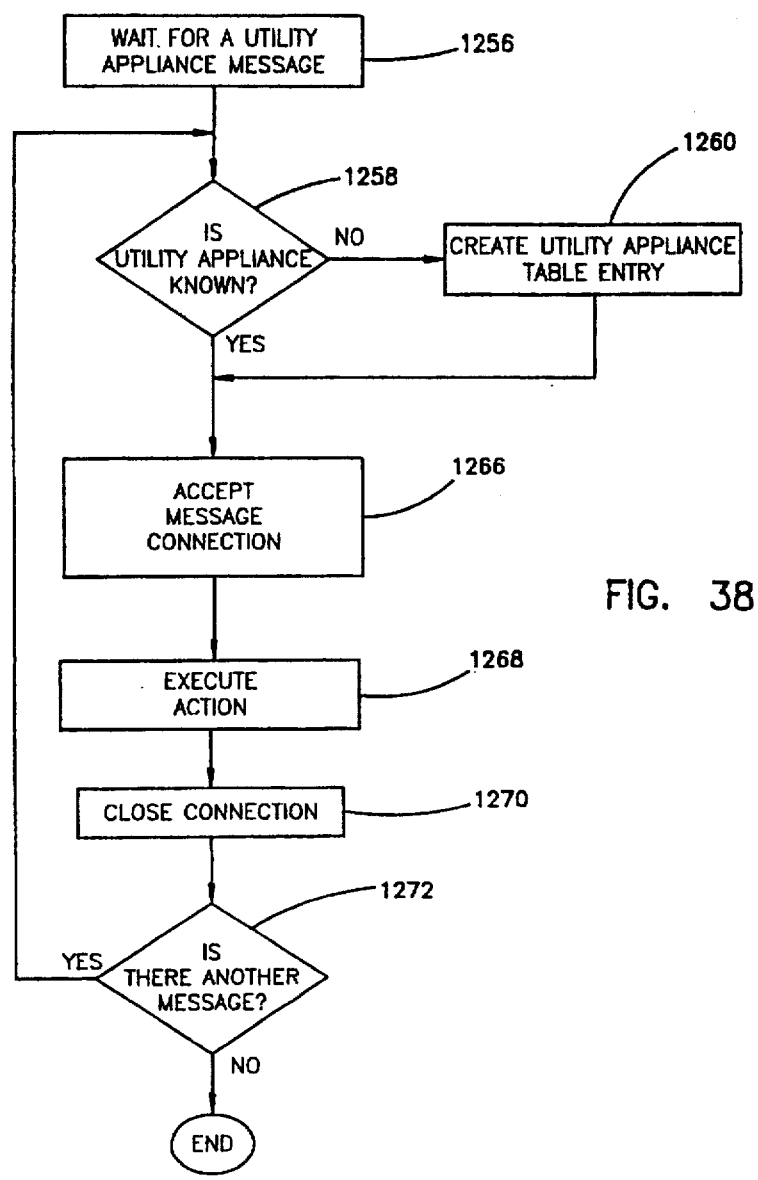

To receive messages, network controller 11 waits for an act on message interrupt as indicated in block 1256 (FIG. 38). When a message is received by the network controller 11, the message will have originated from a utility appliance 13–28. The program in microcontroller 179 determines whether the utility appliance 13–28 which originated the message is identified, as indicated in block 1258. If the utility appliance 13–28 had not been previously identified, the program creates a table entry in block 1260. A utility appliance table entry is allocated for the receipt of program with the instructions for the control of each of utility appliances 13–28 in the furniture arrangement 2. The instructions are an executable program which the network controller 11 receives from each utility appliance 13–28 on the communications network 36. If the utility appliance 13–28 is identified, or after creation of the table entry, the program accepts the message virtual circuit, as indicated in block 1266, and takes action based on the message content, as indicated in block 1268. To take this action, the program utilizes parameters received from the utility appliance 13–28 whose operating instructions are already stored in the utility appliance's table entry in the network controller 11. Alternatively, executing the instructions may entail the network controller 11 receiving the execution program for a utility appliance 13–28 and storing it in the table entry established in block 1260 of the program flow chart. After execution, the virtual circuit is closed as indicated in block 1270. The program then inquires as to whether there is another message, as indicated in block 1272. If there is another message, the program returns to block 1258. If no other message is pending, the program exits the subroutine.

Figure 39:
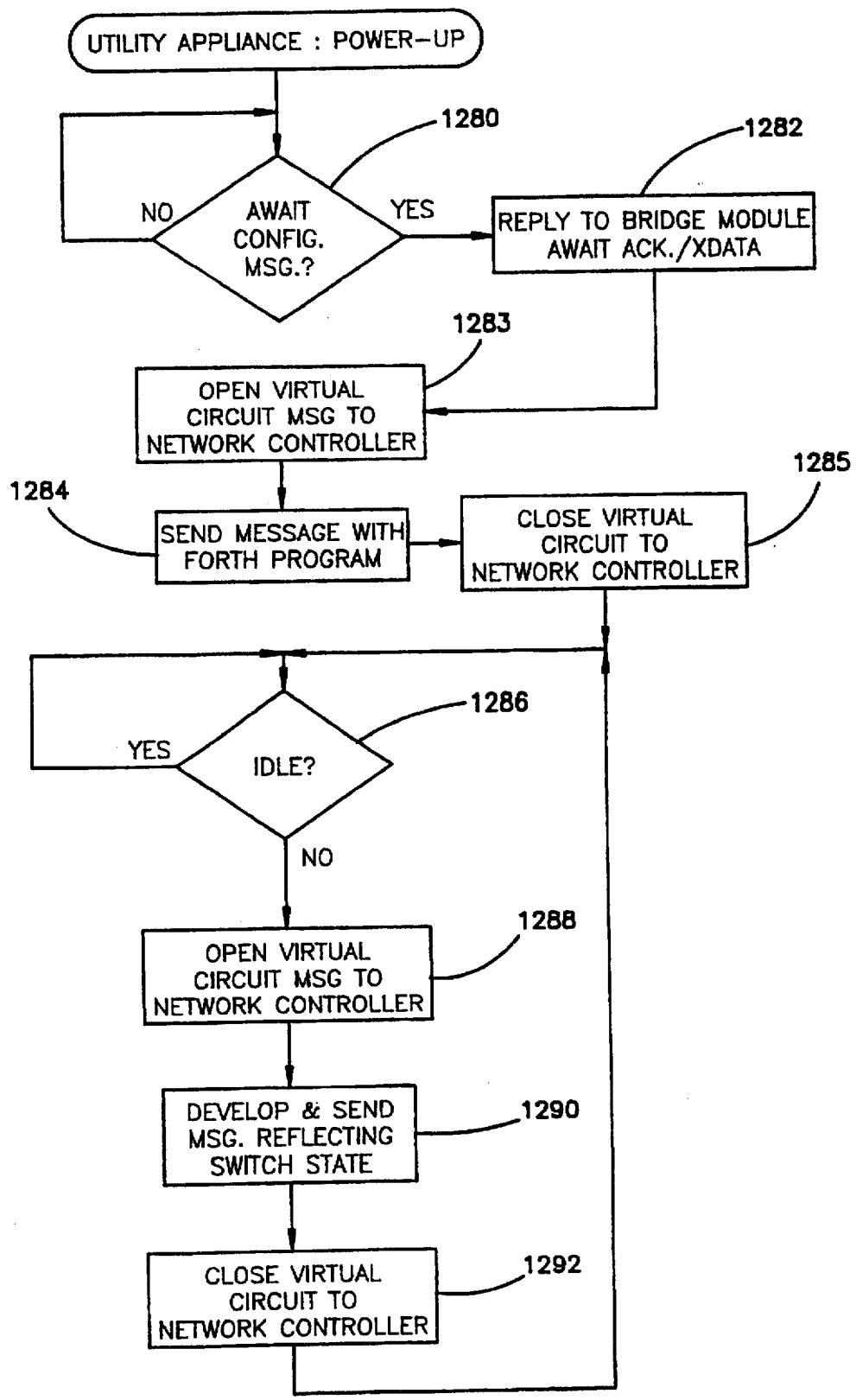
FIG. 39 is a flow diagram of the program in the switch according to FIGS. 19–21.

Upon power-up, the utility appliance 13–28 connected to the utility appliance network 37 waits for a configuration message from the bridge module 75A, as indicated in block 1280 (FIG. 39). When a configuration message is received, in the form of an invitation to talk to the bridge module 75A, the utility appliance 13–28 responds by indicating that it wishes to talk, as shown in block 1282. The utility appliance 13–28 waits for permission to talk, as indicated in block 1282. When permission is granted, a virtual circuit is opened as indicated in block 1285, and the utility appliance 13–28 sends its instruction, or executive, program to the bridge module 75A for communication to network controller 11, as indicated in block 1284. The instruction program is used by the network controller 11 for the utility appliance 13–28. The instruction program establishes how the utility appliance functions, and how the network controller 11 is to respond to control signals from the utility appliance. The utility appliances 13–28 also communicate with the network controller 11, those associations set by the association selectors such as association selectors 239, 240 (FIG. 21) for switches 236, 237, respectively, of switch 27. The virtual circuit is then closed, as indicated in block 1285.

After initialization (steps 1280–1285 which are performed for all of the utility appliances), the utility appliances 13–28 operate according to their respective functions. With continued reference to FIG. 39, for switch 27, the program waits for switch activity, as indicated in decision block 1286, following initialization. When activity is detected (i.e., one of the switches 236 or 237 in switch 27 is moved), the switch 27 requests permission to talk with the network controller 11. This is done by requesting a virtual circuit with the network controller 11, as indicated in block 1288. The message is developed according to the switch state, and the message is transmitted. After the message is transmitted, the virtual circuit is closed, as indicated in block 1292, and the program returns and waits for switch activity in decision block 1286.

The general operation of the power-in 28 will now be described with reference to FIG. 26. A signal transmission on a power supply circuit is effected as follows. Each power supply circuit of power-in 28 includes a clipping switch 434

(e.g., a TRIAC) connected in parallel with a relay switch 303. The power-in 28 transmits a signal oft a power supply circuit when it receives a command to interrupt the current flow through the power supply circuit for approximately one half-cycle. Microcontroller 385' of the power-in opens relay 303 for that source to initiate signaling. It then waits for relay switch 303 to debounce. The current is then carried entirely by clipping switch 434. The trigger current for the clipping switch is then removed and the power-in 28 waits for the line current to cross zero. When the current crosses zero, the clipping switch 434 will turn off avoiding possible voltage spikes. The microcontroller 385' then waits one-quarter cycle and then waits for the voltage to cross zero. When the voltage crosses zero, the microcontroller 385' restores trigger current to the clipping switch. The relay 303 can then be restored. The power outlets 25 with one or more receptacles 272-274 connected to the power source which was interrupted will detect the missing quarter cycle and communicate this information to network controller 11.

The network controller 11 (FIG. 1) can effect signaling over the power supplies when one or more power outlets 25 is added to the communications network 8. The network controller 11 also performs this inquiry after initialization of communications network 8. The network controller 11 will tell each power outlet 25 being interrogated to wait for a signal. The network controller 11 then tells power-in 28 to signal one of its power supply sources. After detecting the clipped signal, the waiting power outlet 25 tells the network controller 11 it has sensed the signal. The network controller 11 will instruct the microcontroller 385' of power-in 28 to clip each source until the power source for each of the receptacles 272-274 (FIG. 22) of power outlet 25 is identified. All power outlets connected to network controller 11 can be instructed to wait for a power supply signal together, or the receptacles 272-274 of power outlets 25 can be individually interrogated.

As indicated in block 1300 (FIG. 40A), upon power-up, the power-in 28 program sets the CONFIG flag to false, the MSG RECEIVED flag to false, and the utility appliance D OPEN PENDING flag to true. The D OPEN PENDING flag indicates that the utility appliance is trying to establish a new virtual circuit with the network controller 11. The D OPEN flag will be set by the lower level routines when the virtual circuit is established (opened). The program waits for the virtual circuit to open, and when D OPEN is true and D CLOSE PENDING is false, indicating that a virtual circuit is open to the network controller 11, the program sends a message to the network controller 11 through the bridge module 75A. The message includes the executive program, written in FORTH in the preferred embodiment, as indicated in block 1304. The program then sets D CLOSE PENDING to true, as indicated in block 1306.

Figure 40A:
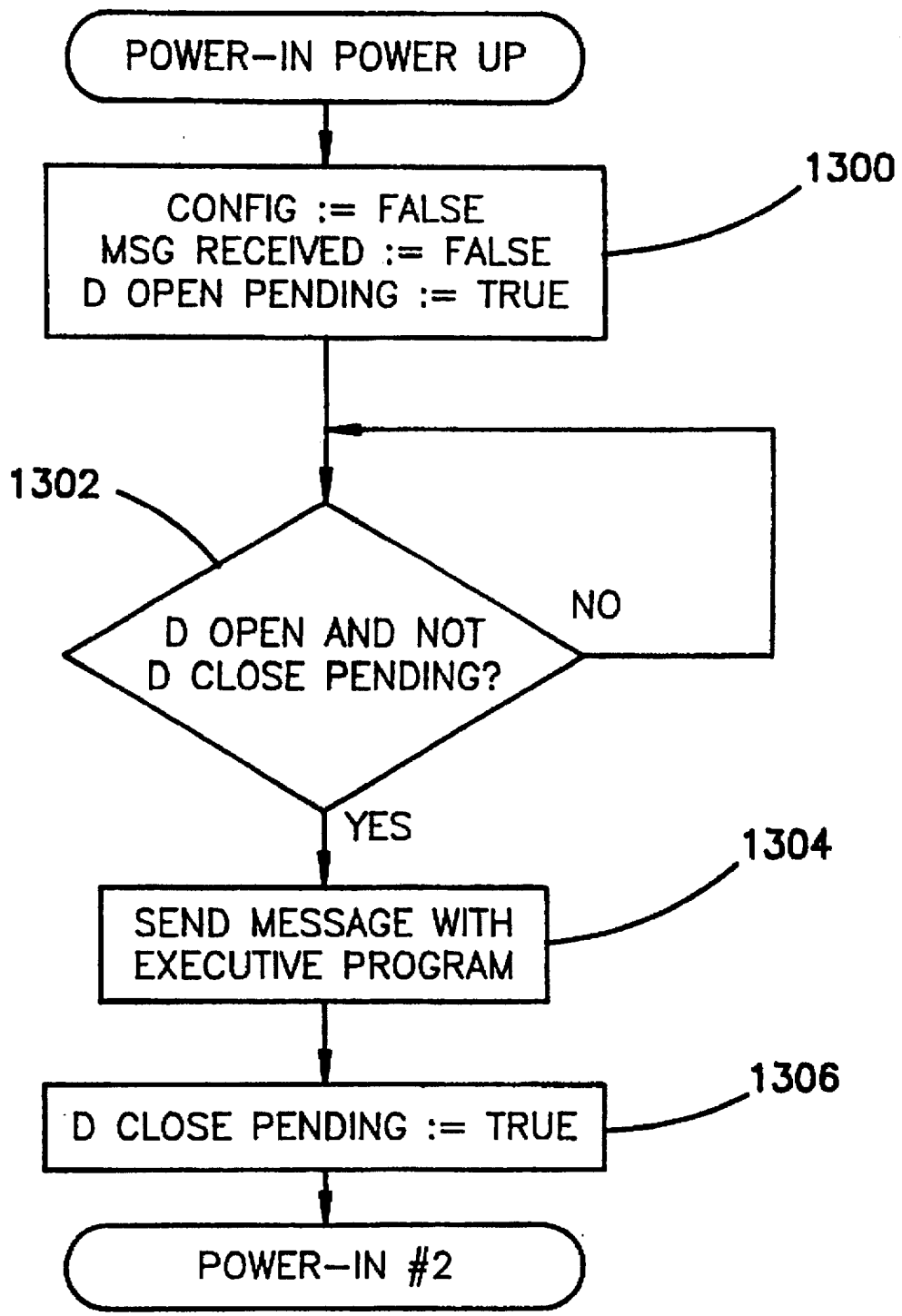
FIGS. 40A, 40B and 40C are flow diagrams of the program in the outlet according to FIGS. 22–25.
Figure 40B:
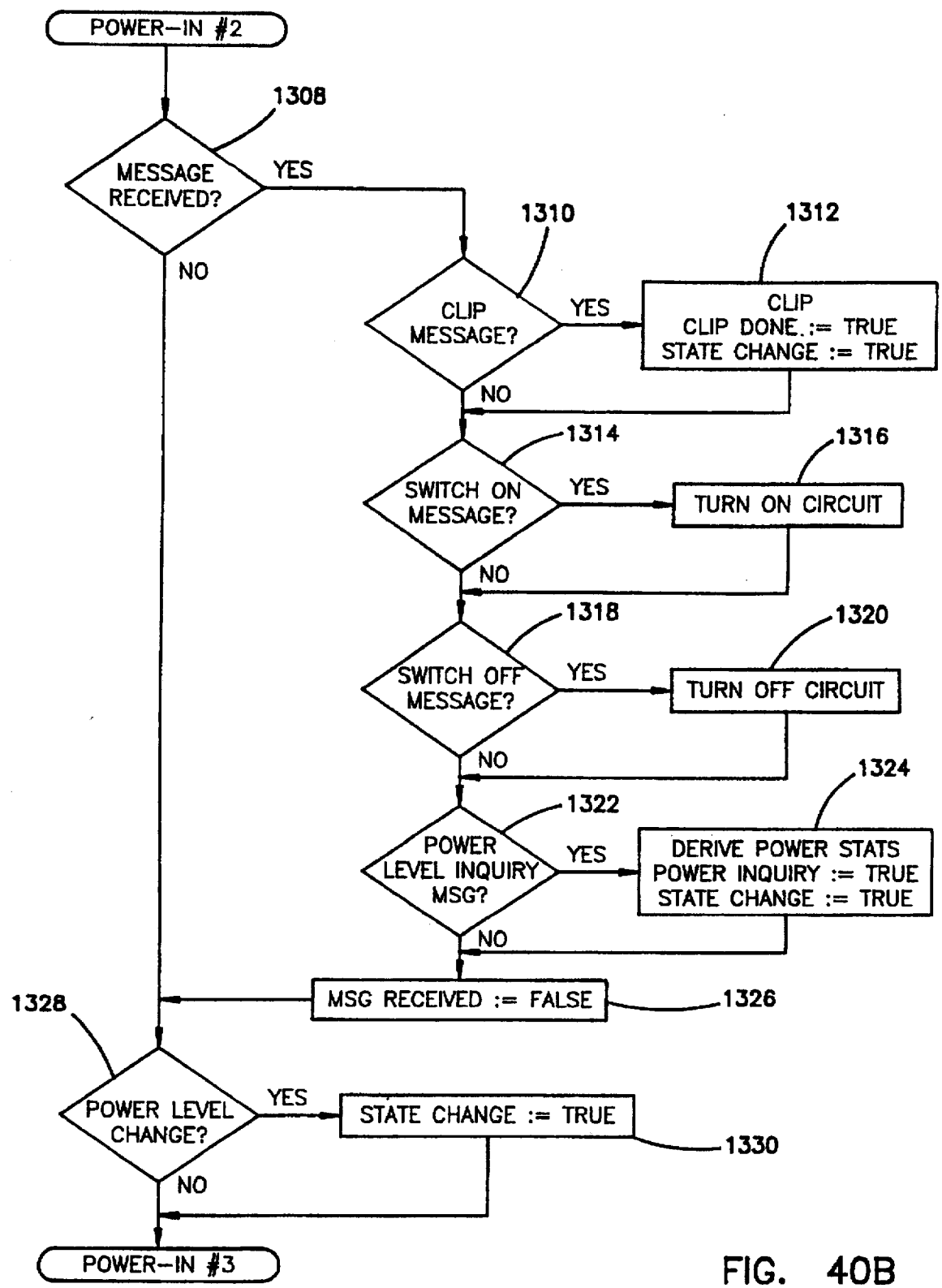

With reference to FIG. 40B, the power-in program 28 then determines whether a message is received in decision block 1308. If a message is received, the program determines if the message is a POWER SOURCE SIGNAL message in block 1310. If it is a POWER SOURCE SIGNAL message, the power supply circuit identified by the POWER SOURCE SIGNAL command is clipped as indicated in block 1312. It will be appreciated that each supply circuit is controlled individually. The CLIP DONE flag is set to true and the STATE CHANGE flag is set to true, as indicated in block 1312. If the message is a "switch on" message, as determined in block 1314, the designated power supply circuit is turned on by closing the appropriate one(s) of switch 303, 303', 303" (i.e., the designated circuit is connected to the power supply) as indicated in block 1316. If the message is a "switch off" command, as determined in block 1318, the program turns the designated power supply circuit, or circuits, off by opening the appropriate one(s) of switches 303, 303', 303" as indicated in block 1320. Turning the power supply "on" or "off" turns all receptacles 272-274 connected to that supply circuit "on" or "off" if the TRIAC switch 431, 432, 433 is open. Thus, the TRIAC switches must be open when switches 303, 303' and 303" are open to turn off the power circuit. If the message is a power level inquiry, the program derives the power status from the voltage and current detectors in the power-in 28 and associated with the power supply circuits, sets the POWER INQUIRY to true, and changes the STATE CHANGE flag to true. The program then sets the MSG RECEIVED flag to false, as indicated in block 1326. The program then determines whether a power level change has occurred, as indicated in decision block 1328. If a power level change has occurred, the STATE CHANGE flag is set to true, as indicated in block 1330.

Figure 40C:
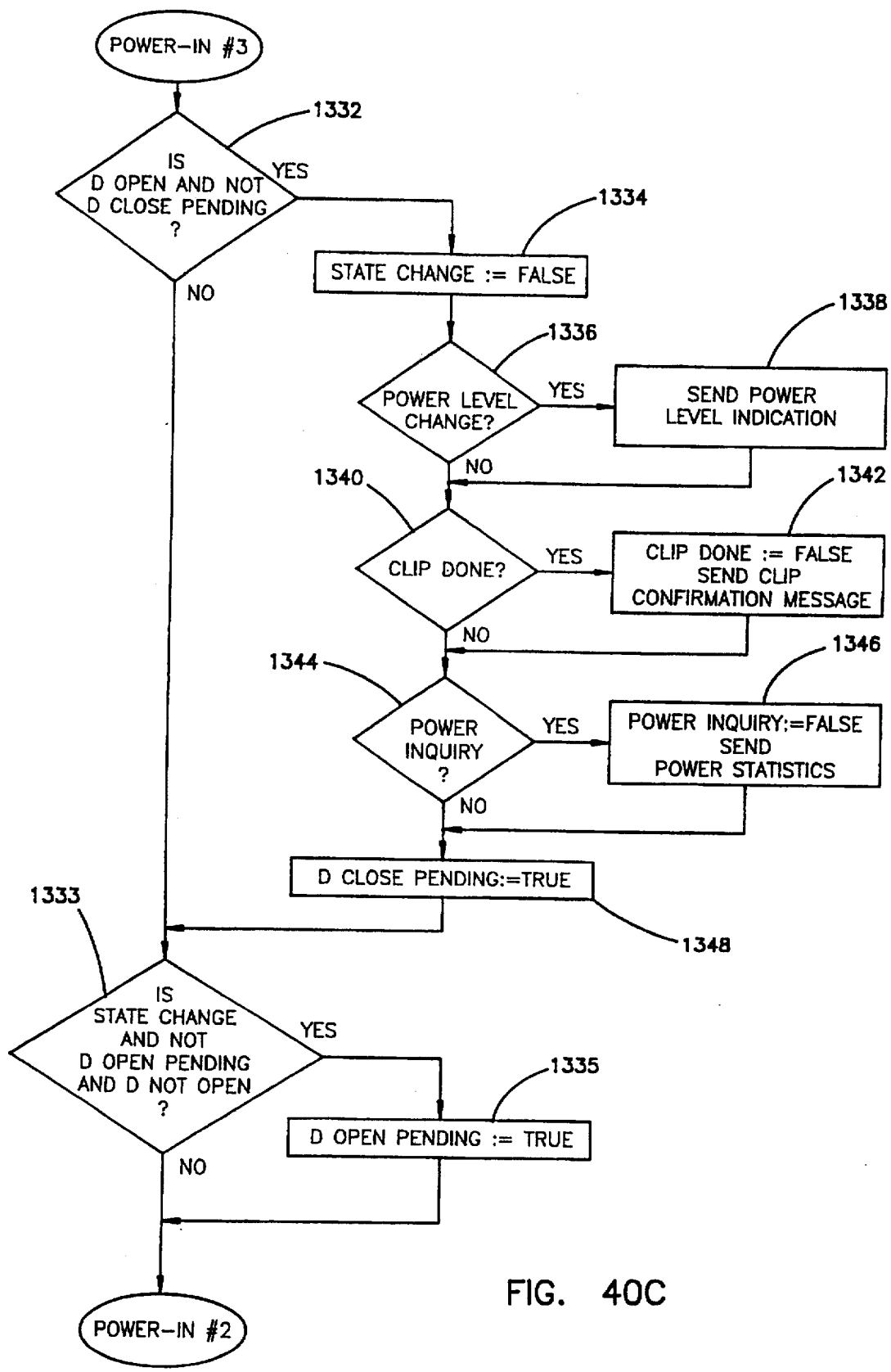

As illustrated in FIG. 40C, the outlet program determines if D OPEN is true and D CLOSE pending is false, indicating a virtual circuit exists in decision block 1332. If the decision in block 1332 is not true, the program determines whether STATE CHANGE is true and both D OPEN PENDING and D OPEN are false, as indicated in block 1333. If the decision in block 1333 is yes, D OPEN PENDING is set to true in block 1335, so that the message may be received the next time through the subroutine loop. If D OPEN is true and D CLOSE PENDING is false, as determined in block 1332, the STATE CHANGE flag is set to false, as indicated in block 1334. If the power level changed, as determined in block 1336, an indication of the power level is sent in this message, as indicated in block 1338. If a power supply circuit identification is completed as determined in decision block 1340, the CHP DONE flag is set to false, and a information message is transmitted to the network controller 11, as indicated in block 1342. If a POWER INQUIRY was made, as indicated in block 1344, the POWER INQUIRY flag is set to false, and the power status information is sent to the network controller, as indicated in block 1346. The D CLOSE PENDING flag is set equal to true in block 1348 to close the virtual circuit to the network controller 11.

Figure 41A:
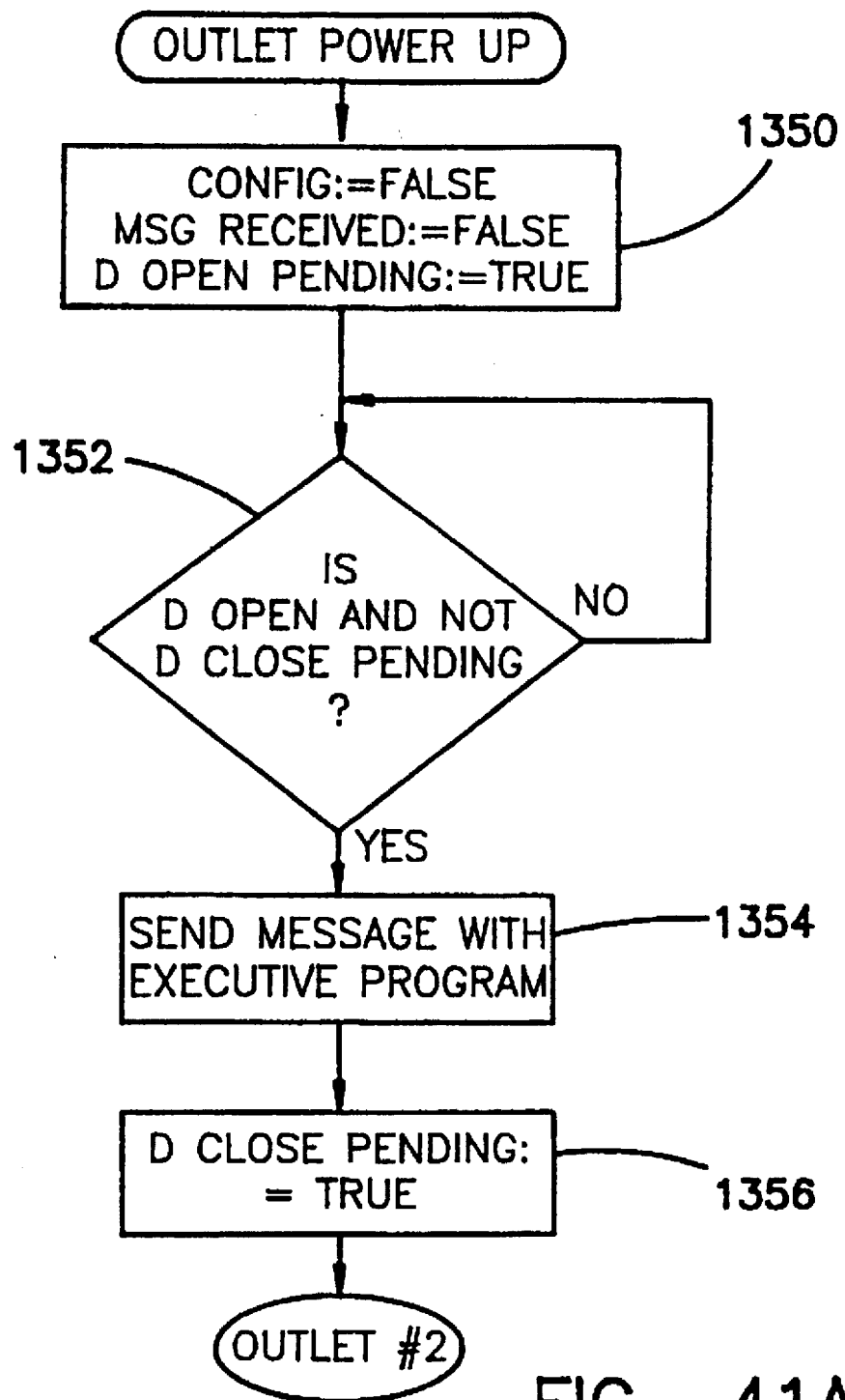
FIGS. 41A, 41B and 41C are flow diagrams of the program of the power-in according to FIGS. 26 and 27.

Upon power-up of the power outlet 25, the CONFIG flag is set to false, the MSG RCV flag is set equal to false, and the D OPEN PENDING flag is set equal to true, as shown in block 1350 of FIG. 41A. The program then waits for D OPEN to be true and D CLOSE PENDING to be false, indicating that a virtual circuit is completed, as indicated in block 1352. The program then sends its executive program, written in FORTH in this embodiment, to the network controller 11 as indicated in block 1354. The D CLOSE PENDING flag is then set to true in block 1356.

Figure 41B:
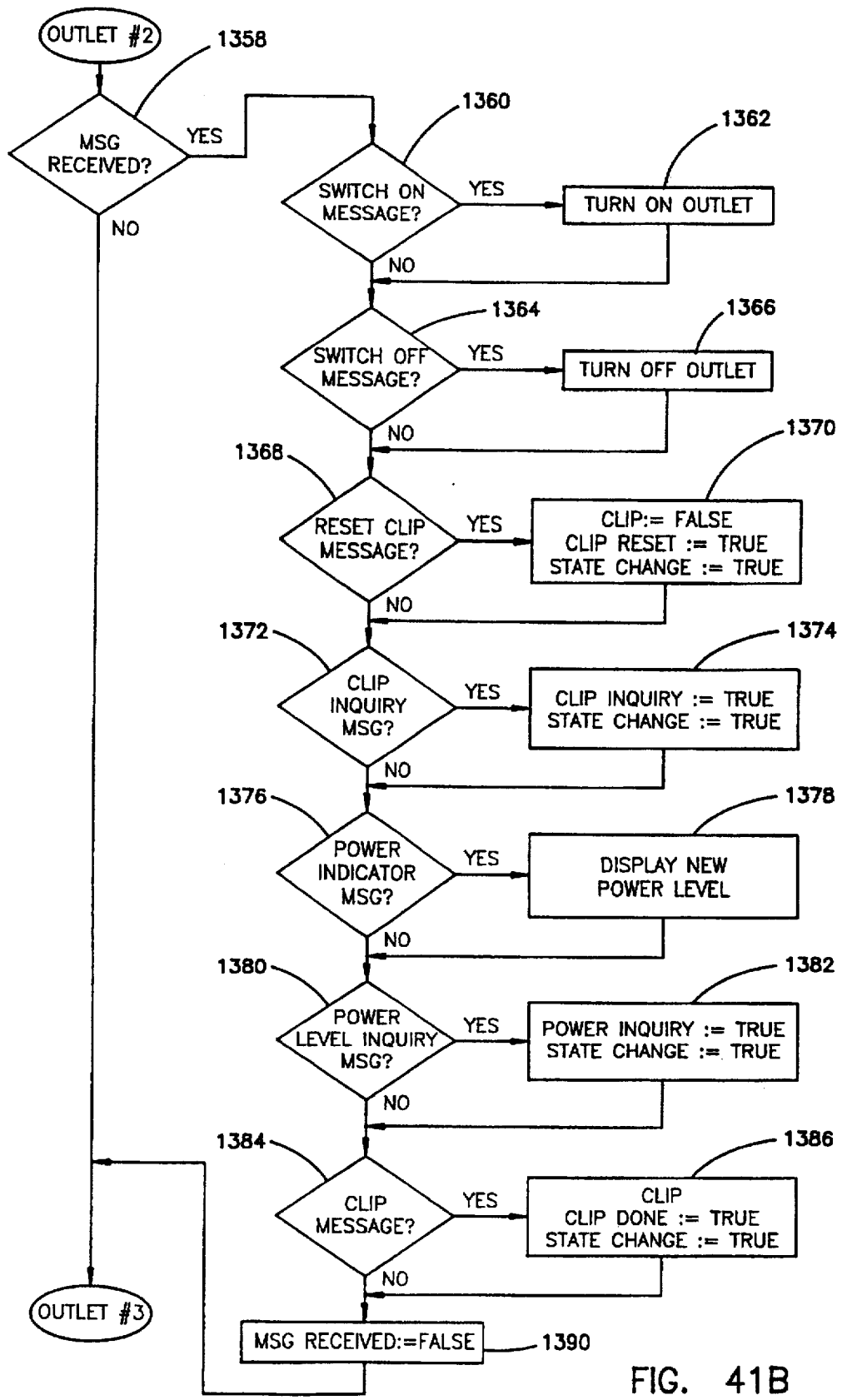

With reference to FIG. 41B, the program next determines whether a message is received, as shown, in decision block 1358. If a message has been received, the program determines what type of message was received. If the message is a "switch on" message, as determined in block 1360, the designated receptacle 272-274 is turned on, as indicated in block 1362. If the message is a "switch off" message, as indicated in block 1364, the program turns the designated receptacle 272-274 off, as indicated in block 1366. If the message is a CLIP RESET message, which is a power source identification status message, as indicated in block 1368, the program sets the CLIP flag equal to false, the CLIP RESET flag equal to true, and the STATE CHANGE equal to true, as indicated in block 1370. A power supply circuit identification message is preceded by a CLIP RESET message to clear the CLIP flag, and insure that the power supply circuit identification results are from a particular power supply circuit signal. If the results of power supply circuit identification inquiry message for one of the receptacles is true, as determined in block 1372, the program sets the CLIP INQUIRY flag equal to true and the STATE CHANGE flag equal to true, as indicated in block 1374. If a power indicator message is received, as indicated in block 1376, the program displays the new power level at its respective associated LED indicator, as indicated in block 1378. If a power level inquiry message is received, as determined in block 1380, the program sets the POWER INQUIRY flag to true, and sets the STATE CHANGE equal to true, as indicated in block 1382. If the message is a power supply circuit identification message, as determined in block 1384, a power supply signal is transmitted by executing a clip, the CLIP DONE flag is set to true, and STATE CHANGE is set to true, as indicated in block 1386. The MSG RECEIVED flag is set to false, as indicated in block 1390.

Figure 41C:
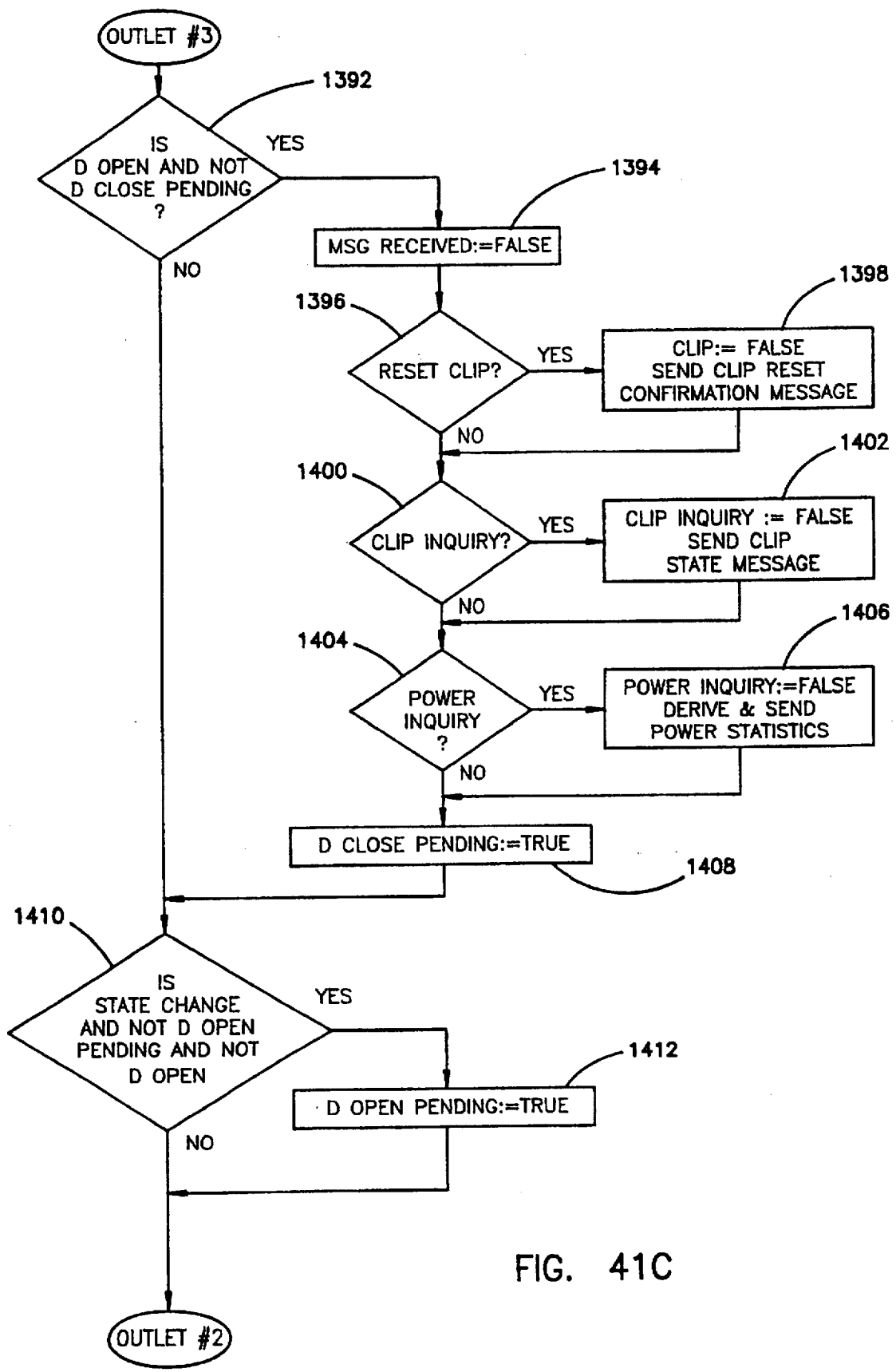

As shown in FIG. 41C, the outlet program then determines whether D OPEN is true and D CLOSE PENDING is false, indicating a virtual circuit exists. If this condition is met, the MSG RECEIVED flag is set to false, as indicated in block 1394. The program then determines whether a CLIP RESET flag is set in block 1396. If a CLIP RESET flag is true, the CLIP flag is set equal to false and a CLIP RESET CONFIRMATION message is transmitted, as indicated in block 1398. If the CLIP INQUIRY flag is set, the program sets the CLIP INQUIRY flag to false and sends the clip state message as indicated in block 1402. If the POWER INQUIRY flag is set, as determined in block 1404, the program sets the POWER INQUIRY flag to false, and derives and sends the power statistics to the network controller 11. The program then sets the D CLOSE PENDING flag equal to true in block 1408. If the decision in block 1392 is NO, the program determines whether STATE CHANGE is true and both D CLOSE PENDING and D OPEN are false in decision block 1410. If they are, the program sets D CLOSE PENDING equal to true in block 1412. The program then returns to block 1358 to respond to the message the next time through this subroutine.

Figure 42:
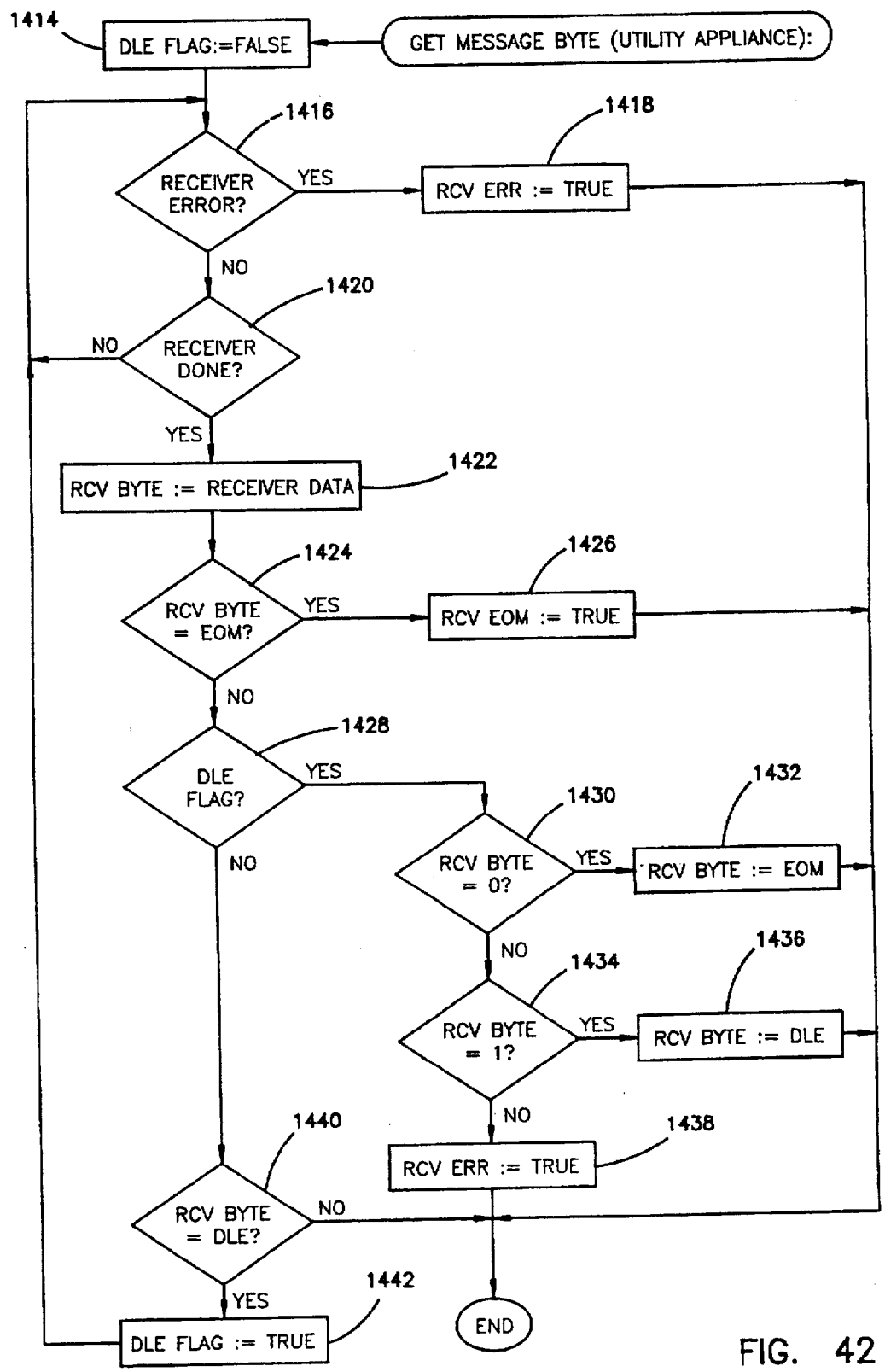
FIGS. 42–46 are flow diagrams of the program in utility appliances according to FIGS. 17–27.
Figure 43:
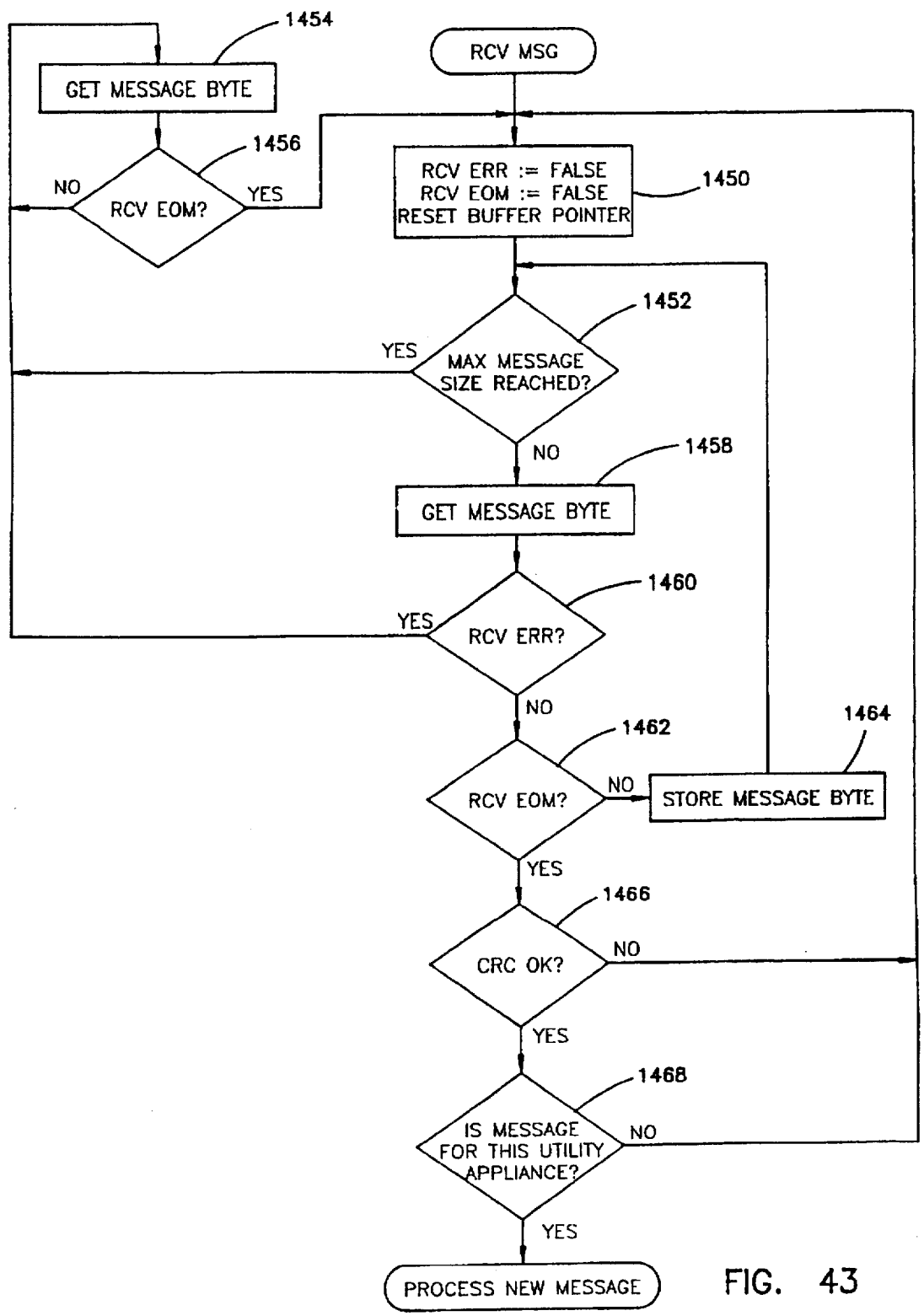
Figure 44:
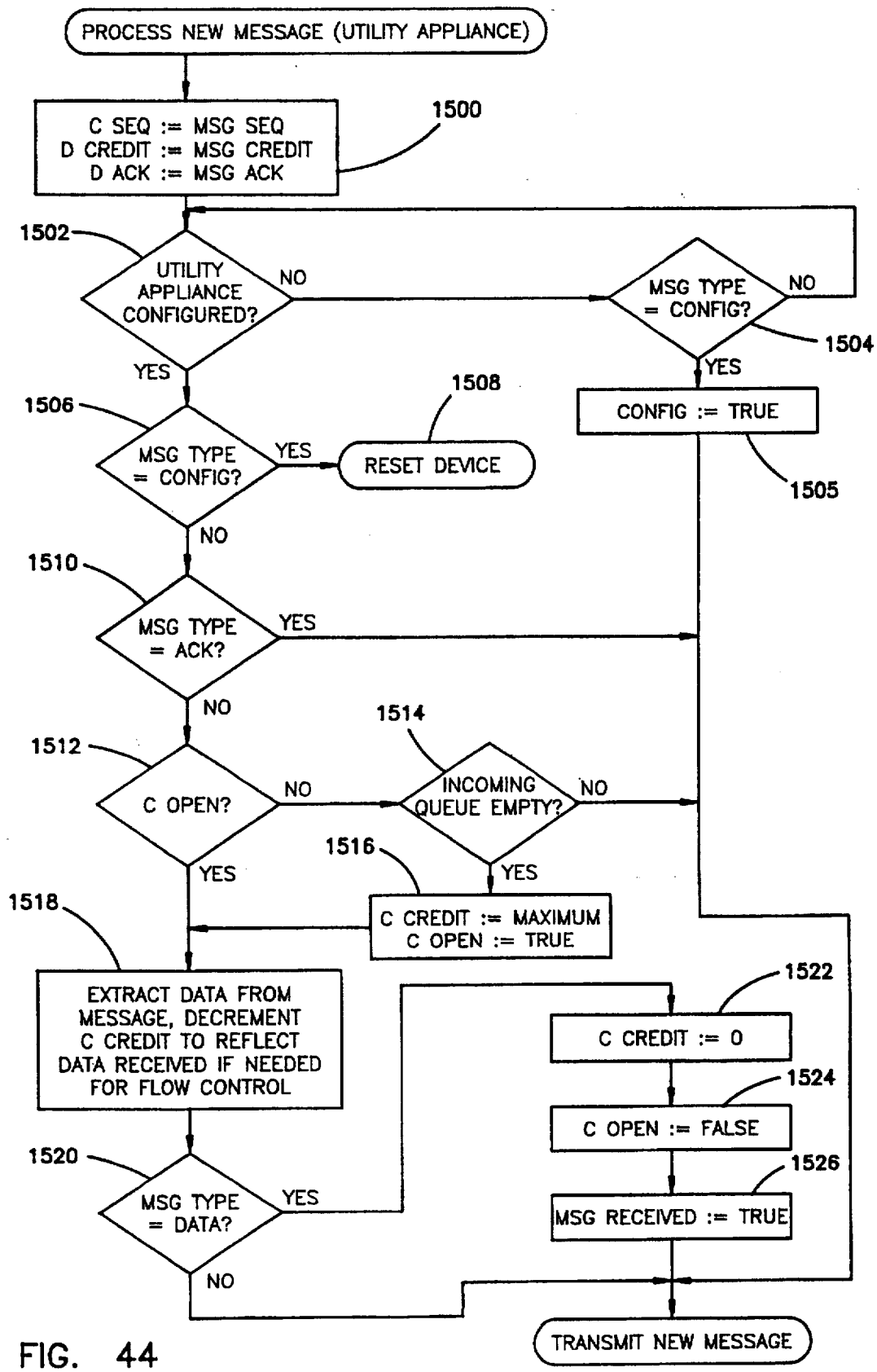

With reference to FIG. 42, messages transmitted over the utility appliance network 37 are detected by the bridge module 75A and the utility appliances 13–28 in the following manner. The messages include a byte with a special value to indicate the END OF MESSAGE (EOM). This value is neither 0 nor 1, and is not sent except to terminate a message. This method allows a program to reset a microcontroller to the beginning of a message very quickly, even in the presence of a great deal of noise, and thus insures that in the presence of noise, the microcontroller will miss only a minimum number of messages. To get a byte from the utility appliance network 37, initially the DLE (Data Link Escape) flag is set to false, to ensure that processing does not begin in the middle of a DLE, as indicated in block 1414. The program then determines whether there is a receiver error as indicated in decision block 1416. A receiver error is detected if a start bit and a stop bit are not spaced by a predetermined, expected amount. If there is a receiver error, the program sets the RCV ERR flag to true, as indicated in block 1418, and exits the subroutine. If a receiver error is not detected, the program determines whether the receiver is done in decision block 1420. If the receiver is not done, i.e., a data character is not present, the program returns to decision block 1416, as indicated by decision block 1420. If a character is present, the character is placed in the receive byte buffer (a buffer passed to the receive message routine described hereinbelow), as indicated in block 1422. The program then determines whether the receive byte is an end of message byte, as indicated in decision block 1424. If the RCV BYTE is an end of message byte, as determined in block 1424, the RCV EOM flag is set to true, and the program exits the subroutine, as indicated in block 1426. If the RCV byte is not EOM (end of message), the program checks to see if the DLE flag is set, as indicated in decision block 1428. When the program determines that the DLE flag is not set, as indicated in block 1428, the microcontroller 165 determines whether the RCV BYTE is a DLE byte as indicated in block 1440. If it is a DLE byte, the DLE flag is set true and the program returns to block 1416 as indicated in block 1442. If the program determines that the DLE flag was set in decision block 1428, the program determines whether the receive byte equals zero, as indicated in block 1430. If the RCV byte equals zero, the sender was trying to send a byte with the reserved EOM value, but could not because that would violate the protocol. Accordingly, EOM is placed in the receive byte to tell the sender that the EOM value was received, as indicated in block 1432. If the RCV byte is a one, as determined in block 1434, then the sender was trying to send the reserved DLE message code, and the RCV byte is set to DLE code, as indicated in block 1436. If the program determines that the receive byte was not equal to one in decision block 1434, the program determines that a receiver error has occurred, as indicated in block 1438.

To receive a new message (FIG. 43), the utility appliances 13–28 set the RCV ERR (receive error) flag to false, the RCV EOM flag to false, and reset the buffer pointer, as indicated in block 1450. The program then determines whether the maximum message size has been reached by the receive data, as indicated in block 1452. If the maximum has been reached, the program gets the message bytes until the RCV EOM flag is set, as indicated in blocks 1454 and 1456. If the maximum message length was not received, as indicated in block 1452, the program attempts to get the next message byte (stored RCV BYTE) using the "get byte" program, as indicated in block 1458. The program then checks for receiver error, as indicated in block 1460. If there is receiver error, the program waits for art end of message, as indicated by blocks 1454 mid 1456. If there is no receiver error, the program checks to see if the RCV EOM flag is set, as indicated in block 1462. If the RCV EOM flag is not set, the message byte is stored as indicated in block 1464. If the RCV EOM flag is set, a cyclic redundancy check is performed using a conventional algorithm, as indicated in block 1466. If the cyclic redundancy check (CRC) byte is not correct, tile program returns to block 1450. If the CRC is okay, the program cheeks the message to determine if it is addressed to the particular utility appliance doing the processing, as indicated in block 1468. If the message is for the particular utility appliance, the program processes the message. If it is not for the particular utility appliance, the program returns to block 1450. As can be appreciated, utility appliances 13–28 are connected to the utility appliance network 37 in parallel, and the program uses block 1468 to insure that a utility appliance 13–28 waits for, and responds to, only its own message, The utility appliance program processes a message after it is received, as shown diagrammatically in FIG. 44. To process the message, the program sets the network controller 11 sequence, C SEQ, equal to the message sequence, the utility appliance CREDIT equal to the message CREDIT, and the utility appliance acknowledge sequence number, D ACK, equal to the message acknowledge sequence number (the acknowledge sequence number contained in the received message), as indicated in block 1500. The program then determines whether the utility appliance 13–28 is configured, as determined in block 1502. If the utility appliance 13–28 is not configured, the program waits for a configuration message, as indicated in block 1504. When the configuration message is received, the CONFIG flag is set to true. If the utility appliance 13–28 is configured, and the message type is CONFIG., the program resets the utility appliance in block 1508. If it is not a configuration message, the program determines whether the message is an acknowledgement message, as indicated in block 1510. If it is an acknowledgement message, the program sends its next message. If it is not an acknowledgement message, the program determines whether a virtual circuit (i.e., a connection) is open to the network controller 11, as indicated in block 1512. If a virtual circuit is open, the program proceeds to block 1518. If a virtual circuit is not open, the program determines whether the incoming queue is empty, as indicated in block 1514. If it is not empty, the program sends a new message. If it is empty, indicating that a new virtual circuit is allowed, the program sets time network controller CREDIT to the maximum CREDIT, sets the C OPEN flag to true and proceeds to block 1518. The program then extracts data from the message and decrements the network controller CREDIT to reflect received data if needed, as indicated in block 1518. The program then determines whether the message is XDATA (extended data), as indicated in block 1520. If it is XDATA, the program sends its next message. If it is not XDATA, then it is the final data message and the program sets the network CREDIT equal to zero, in block 1522, sets the network controller OPEN flag to false, in block 1524, arid sets the MSG RECEIVED (message received) flag equal to true as indicated in block 1526. The program then sends its next message.

Figure 45:
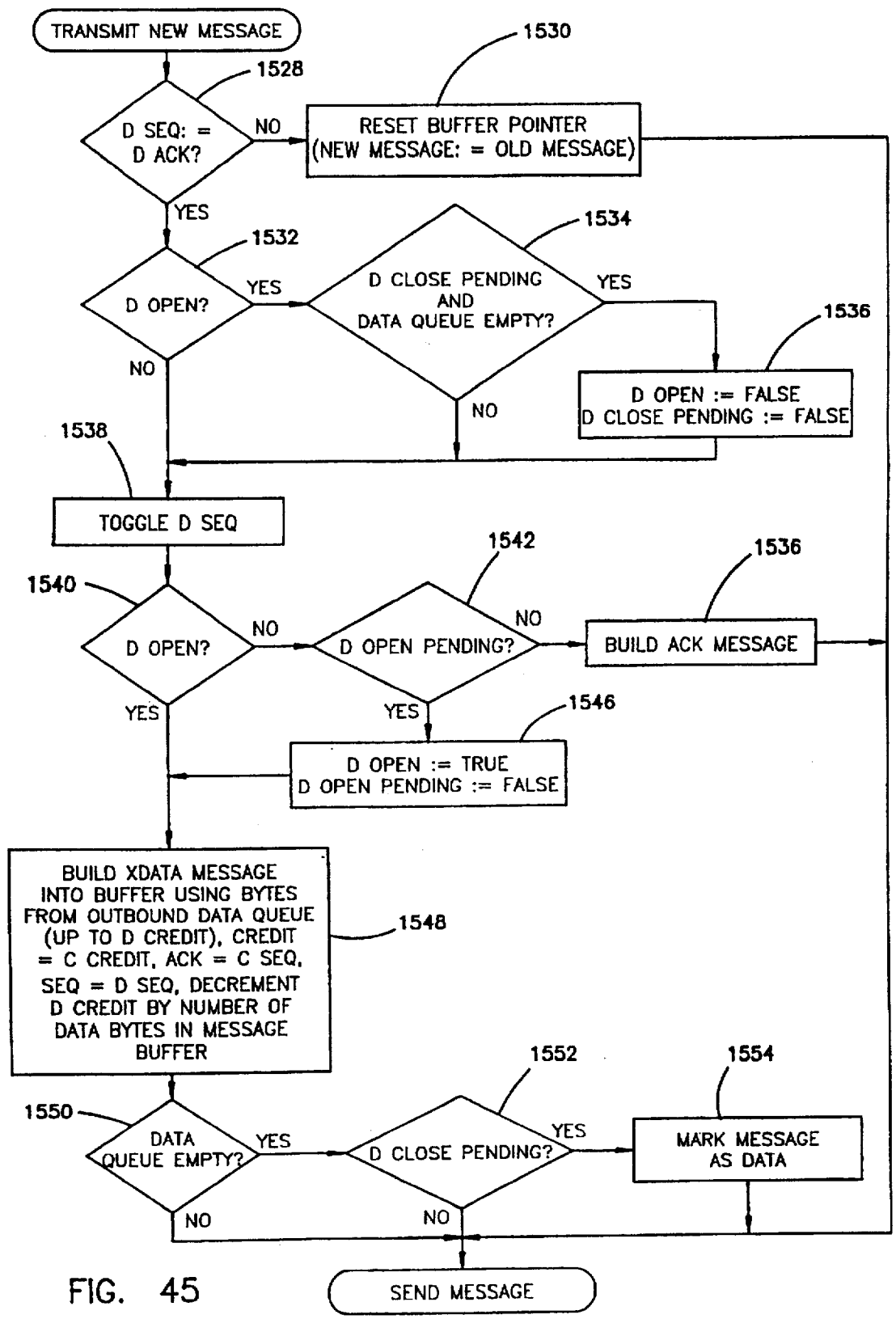

With reference to FIG. 45, to transmit a new message, a utility appliance 13–28 initially determines whether the device D SEQ equals the D ACK, as indicated in decision block 1528. If D SEQ does not equal D ACK, the buffer pointer is reset, such that the new message equals the old message, as indicated in block 1530, and the message is sent. If the device sequence number equals the utility appliance acknowledgement sequence number (D ACK), the microcontroller 251, 385, 385' determines whether the D OPEN flag is set, as indicated in block 1532. If D OPEN is true, the program determines whether D CLOSE PENDING is true arid the data queue is empty, as indicated in block 1334. If the decision is yes, indicating the end of tile message, the D OPEN flag is set to false and the D CLOSE PENDING flag is set to false, as indicated in block 1536, closing the virtual circuit. The program changes the D SEQ from 0 to 1 or 1 to 0 in block 1538. The program then determines whether the D OPEN flag is set in block 1540. If D OPEN is not true, and D OPEN PENDING is false, as indicated in block 1542, an acknowledgement message is created, as indicated in block 1544, and the message is transmitted. If D OPEN PENDING is true, I) OPEN is set equal to true and D OPEN PENDING equals false, whereby the virtual circuit is open, as indicated in block 1546. In block 1548, the program builds an XDATA (extended data) message using bytes from the outbound message queue (up to the network controller credit), the CREDIT is set to the network controller CREDIT, the ACK is set to the network controller sequence, SEQ is set to D SEQ, and the device credit (D CREDIT) is decremented by the number of data bytes in the message buffer. The program then determines whether the data queue is empty as indicated in block 1550. If the data queue is empty, the program determines whether the D CLOSE PENDING flag is set, as indicated in block 1552. If the data queue is not empty or D CLOSE PENDING is false, the program sends the extended data message as it is. If D CLOSE PENDING is false, the program marks the message as DATA, as indicated in block 1554, as this is the end of all data.

Figure 46:
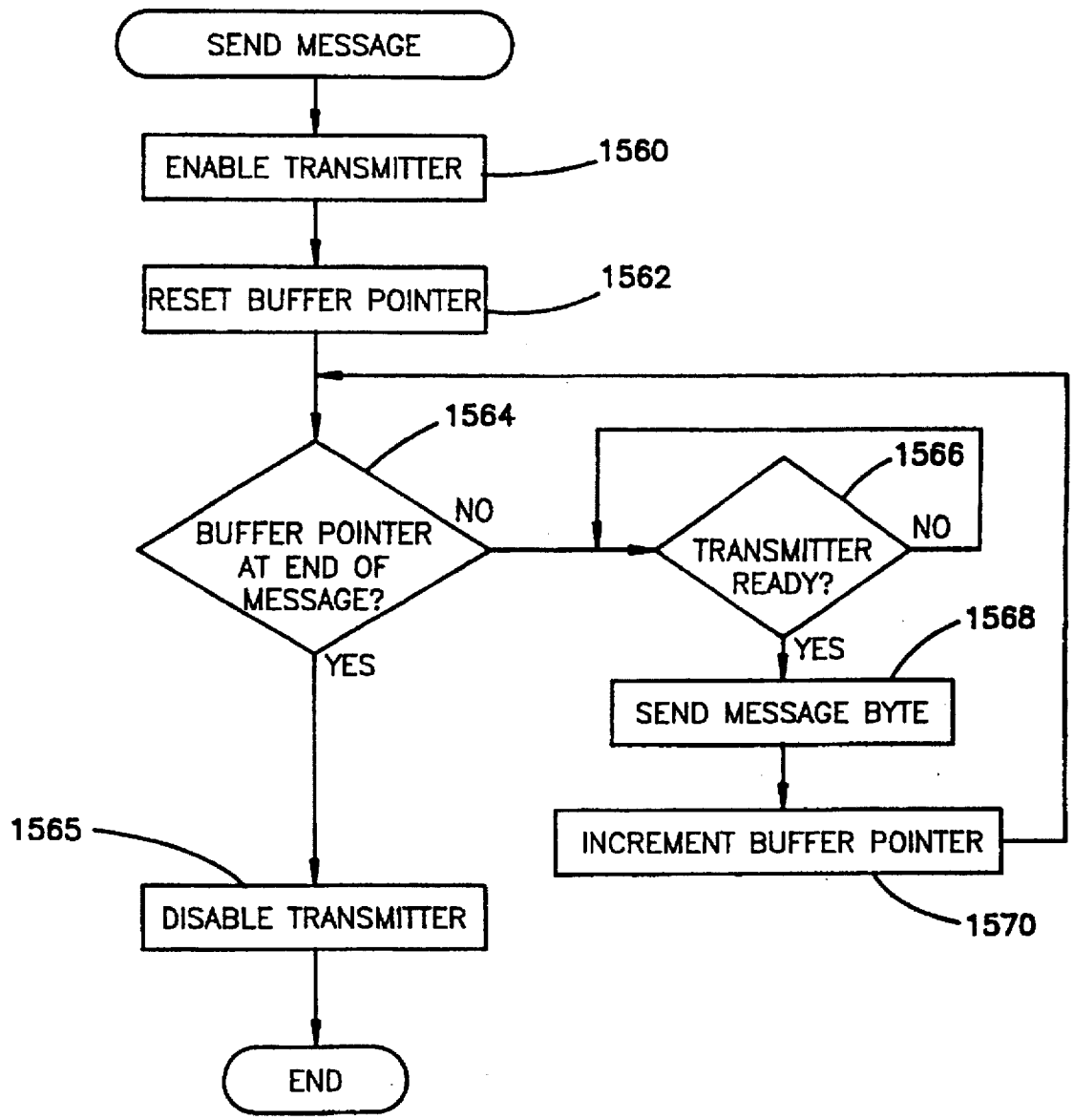

To send a message, the program enables the transmitter portion of bridge module 75A, network controller 11, or utility appliances 13–28, as indicated in block 1560 (FIG. 46). The buffer pointer is reset in block 1562. The program then determines if the buffer pointer is at the end of message as indicated in block 1564. If the pointer is at the end of a message, the program disables the transmitter and returns to receive a new message as indicated in block 1565. If the pointer was not at the end of a message, as determined in block 1564, the program determines whether the transmitter is ready in block 1566. If the transmitter is not ready, the program waits for the transmitter to become available. When the transmitter becomes available, the message byte is transmitted as indicated in block 1568. The buffer is then incremented, as indicated in block 1570, and the program returns to block 1564.

Figure 47:
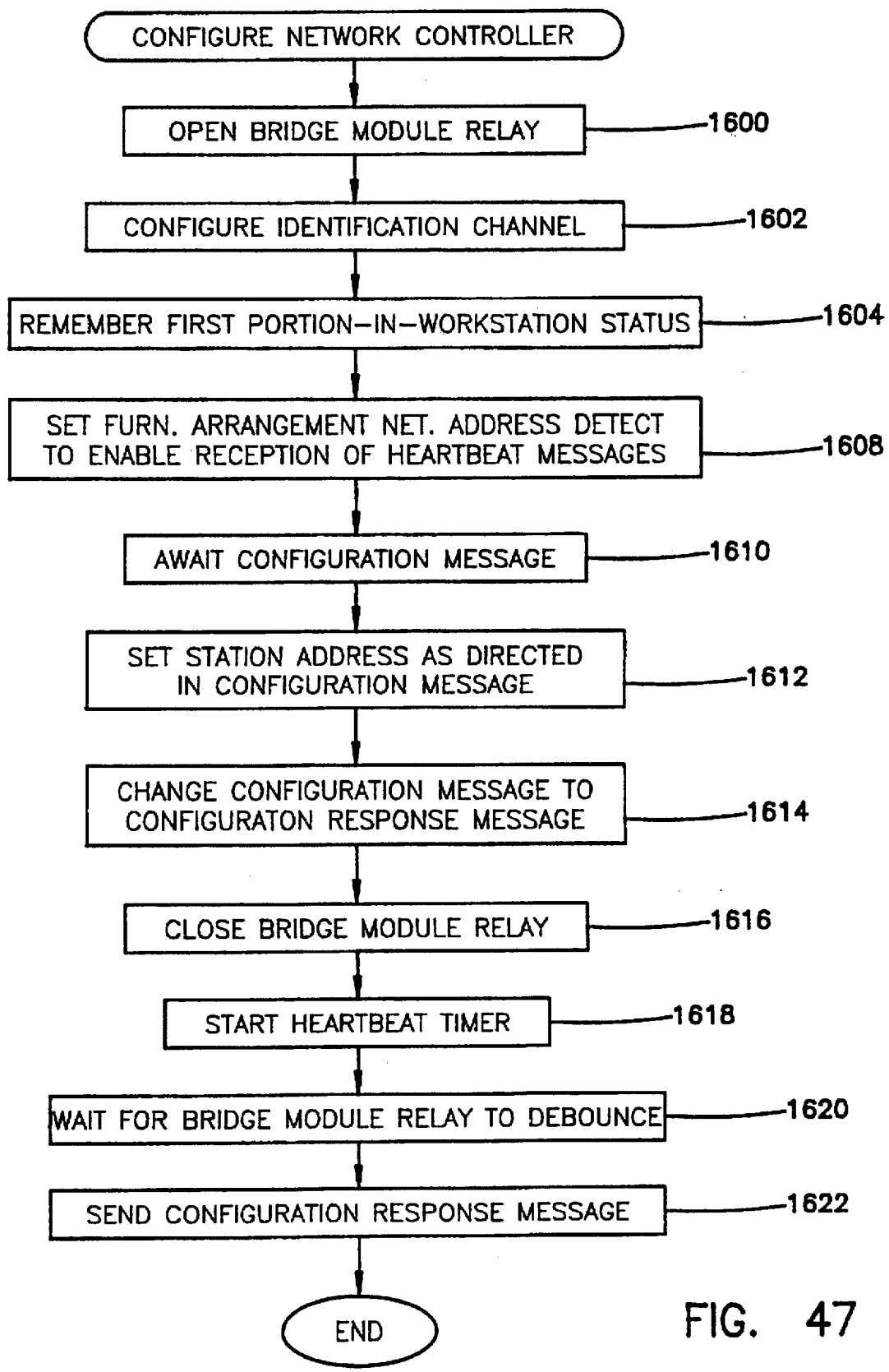
FIGS. 47, 48A, 48B, 49, 50, 51, 52, 53A, 53B, 53C, and 53D are flow diagrams of a program in the bridge module according to FIGS. 15 and 16.

The configuration of the bridge module 75A will now be described. Whenever a bridge module 75A looses power, or does not detect the heartbeat message for a period of 0.5 second, the bridge module 75A enters the unconfigured state. In the unconfigured state, the relay switches 136, 137 (FIG. 28B) are opened which disconnects all downstream (counterclockwise) bridge modules 75A on data channel 130, as indicated in block 1600 of FIG. 47. A resistor 140 is connected between the open switches 136, 137 to terminate channel 130 with a suitable finite impedance. The microcontroller 165 then uses a Dallas Semiconductor Subroutine (not further described herein) to determine the identity of all downstream identification modules 75B (e.g., the 48 bit identification code stored in identification module 127) by signaling downstream on channel 131, as indicated in block 1602. The microcontroller 165 also looks upstream on channel 131 to determine the stains of upstream bridge modules 75A. The bridge module 75A also determines if it is the first bridge module 75A of the workstation 4 by monitoring conductor 156 (FIG. 15) of channel 132 to see if one of the switches 9 is closed. If one or more of the switches 9 connected between bridge modules 75A is dosed, conductor 156 will be connected to ground.. If none of these switches are closed, conductor 156 will be pulled up to five volts by resistor 160. The bridge module 75A thus learns if it is associated with the first ported panel face 46 of a workstation 4, as indicated in block 1604 (FIG. 47). If any upstream switches 9 are closed, including its own switch 9, the microcontroller 165 stores its first panel status for transmission to the network controller 11.

The program in the bridge module 75A then sets itself to look for heartbeat messages, as indicated in block 1608 (FIG. 47). The program waits for receipt of a configuration message from the network controller 11, identifying its station number, as indicated in block 1610. When the configuration message is received, the microcontroller 165 program stores the station number, as indicated in block 1612. The microcontroller 165 program then generates the configuration response message, as indicated in block 1612. The microcontroller 165 program closes switches 136, 137, as indicated in block 1616. The heartbeat timer is started (FIG. 45), as indicated in block 1618. The microcontroller 165 then waits for switches 136, 137 to debounce, as indicated in block 1620. The microcontroller 165 then transmits the configuration response message to the network controller 11.

Figure 48A:
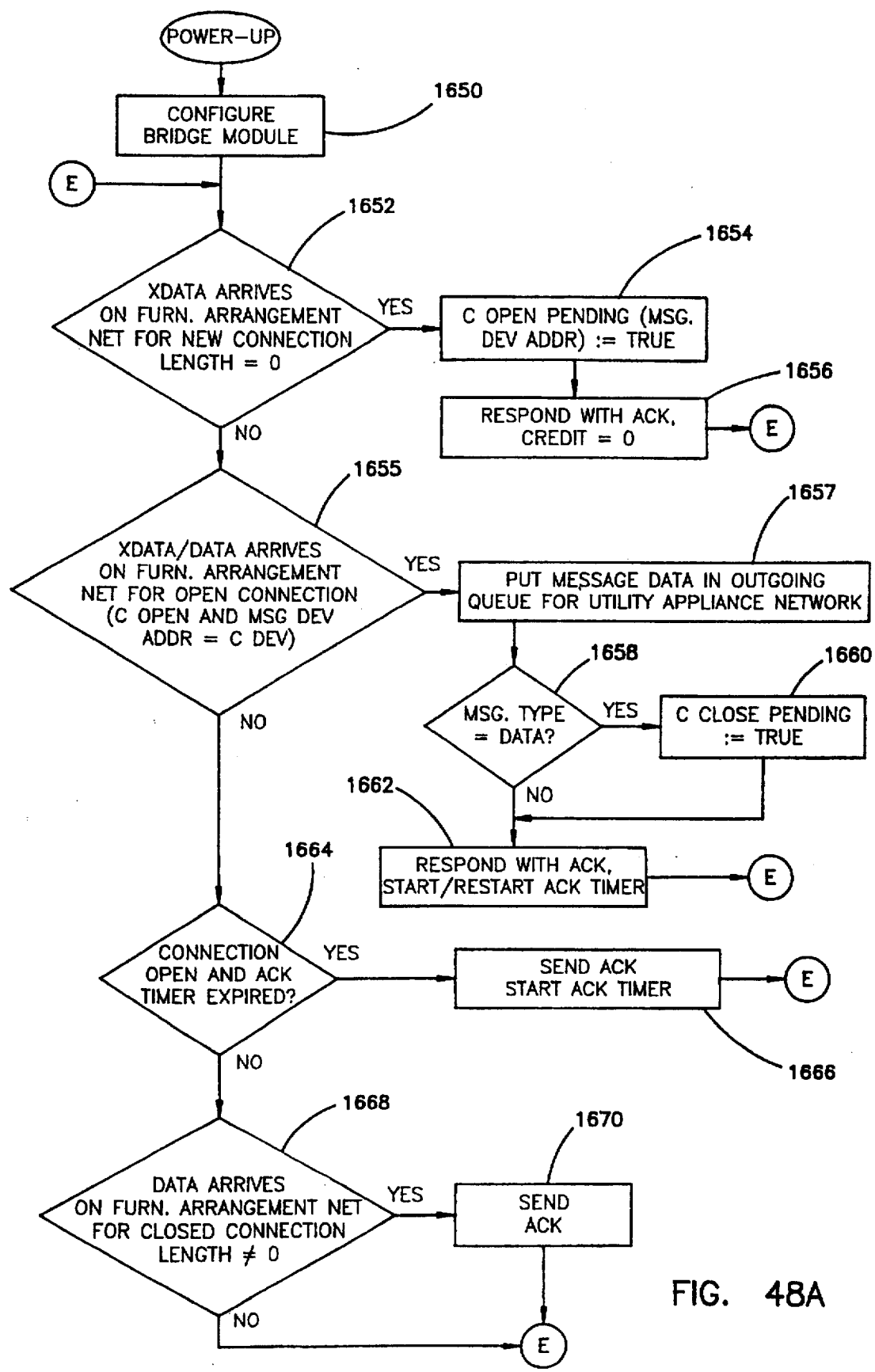

Upon power-up of the bridge module 75A, the program in microcontroller 165 is configured, as indicated in block 1650 (FIG. 48A). The program then waits for messages from the network controller 11. If extended data having a length equal to zero arrives following a new virtual circuit, the program identifies the message as a request for a connection with the bridge module 75A from one of the utility appliances 13-28 which is at the utility appliance address indicated in the message. The C OPEN PENDING (MSG DEV ADD TO flag is set, as indicated in block 1654. The bridge module 75A responds with an acknowledgement having a credit of zero (i.e., connection is okay, but the microcontroller is not ready to receive a message), as indicated in block 1656. If either an XDATA (extended data) message or a data message is detected, with the virtual circuit open, and the utility appliance identified in the message is the credited utility appliance, as indicated in decision block 1655, the message is placed in the message queue outgoing to the utility appliance network 37 as indicated in block 1657. If the message type is DATA, block 1658, the C CLOSE PENDING flag is set to true, indicating the end of message, in block 1660. The program then responds with an acknowledgement, and starts the acknowledgement timer, as indicated in block 1662. If an XDATA (extended data) message did not arrive, as determined in block 1655, the program determines whether the virtual circuit is open (block 1664), and the acknowledgement timer is expired. If this is true, another acknowledgement is transmitted and the timer is started, as indicated in block 1666. If the decision of block 1664 is no, the program looks for a DATA message or an XDATA message, having a length which does not equal zero, on the furniture arrangement network, for a closed virtual circuit, as indicated in decision block 1668. If this information is received, the program responds with an acknowledgement.

Figure 48B:
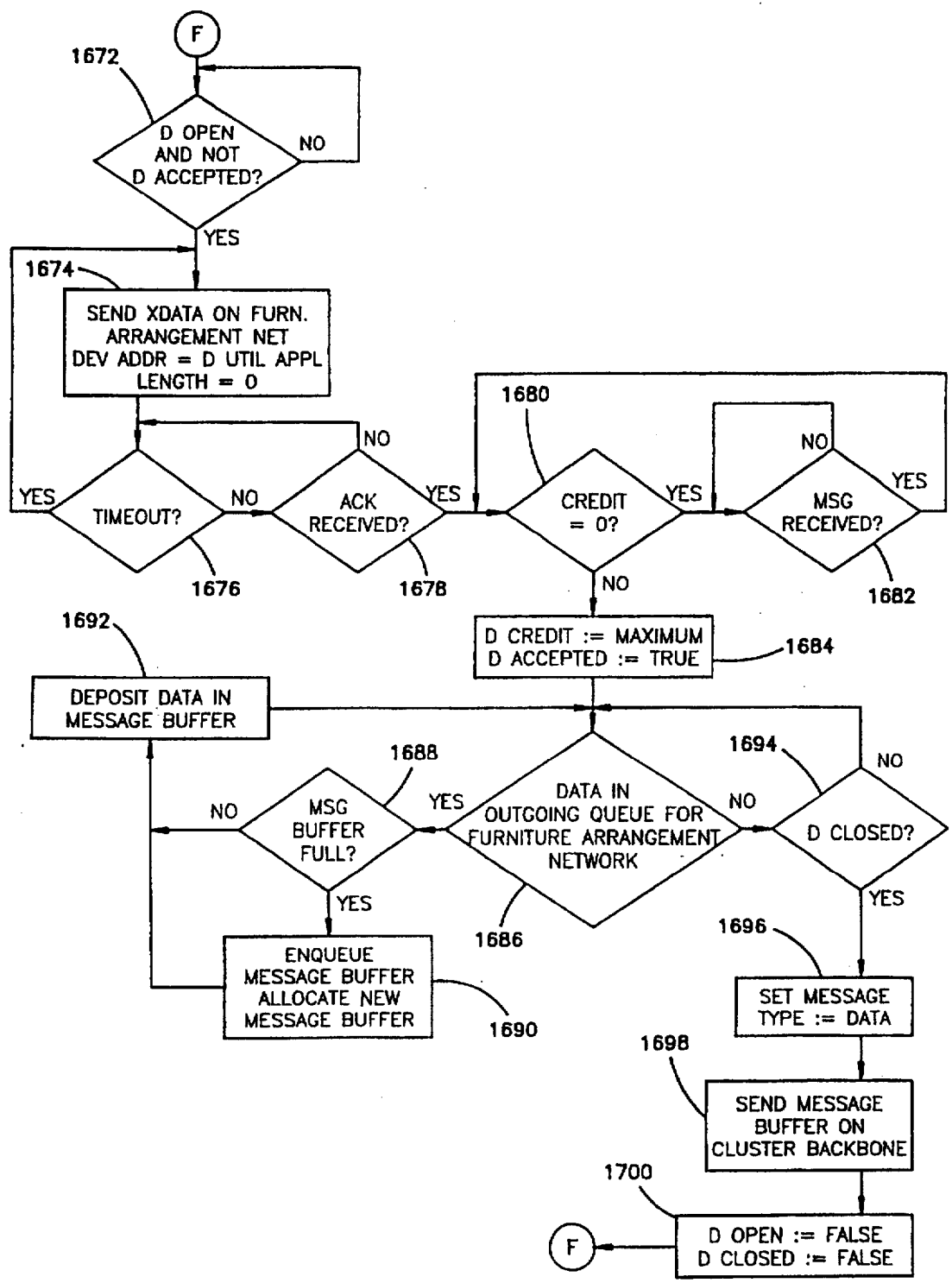

Referring to FIG. 48B, in block 1672, to transmit a signal to network controller 11, the bridge module 75A program waits for D OPEN true and D ACCEPTED false. The bridge module 75A sends the XDATA message on the furniture arrangement network 36 with the utility appliance address (D ADDR) equal to the address of the utility appliance (D UTIL APPL), and having a length equal to zero (i.e., a request to speak to the network controller), as indicated in block 1674. The program waits for an acknowledgement before a timeout, as indicated in blocks 1676 and 1678. When the acknowledgement is received, the program determines whether the credit equals zero as indicated in block 1680. If the credit equals zero, the program waits for a message to be received with a credit greater than zero, as indicated in blocks 1680 and 1682. When the message received has credit greater than zero, meaning the network controller 11 will receive the message, the utility appliance credit is set to the maximum data allowed by the network controller 11 and bridge module 75A, and the data accepted flag is set to true in block 1684. The program then determines whether data is present in the outgoing queue as indicated in block 1686. If data is present in the outgoing queue, the program checks if the message buffer is full as indicated in block 1688. When the message buffer is full a new buffer is allocated, as indicated in block 1690. The program then deposits the data in the message buffer, as indicated in block 1692, and the program returns to block 1686. When no more data is in the outgoing queue, the program waits for the virtual circuit to close or for more data to be placed in the queue as indicated in blocks 1686 and 1694. When the virtual circuit closes, the message type is set to DATA, as indicated in block 1696, the message buffer for the continuous network is transmitted in block 1698, and the D OPEN flag is set to false and the D CLOSED flag is set to false, in block 1700. The program then returns to block 1672 to wait for another message.

Figure 49:
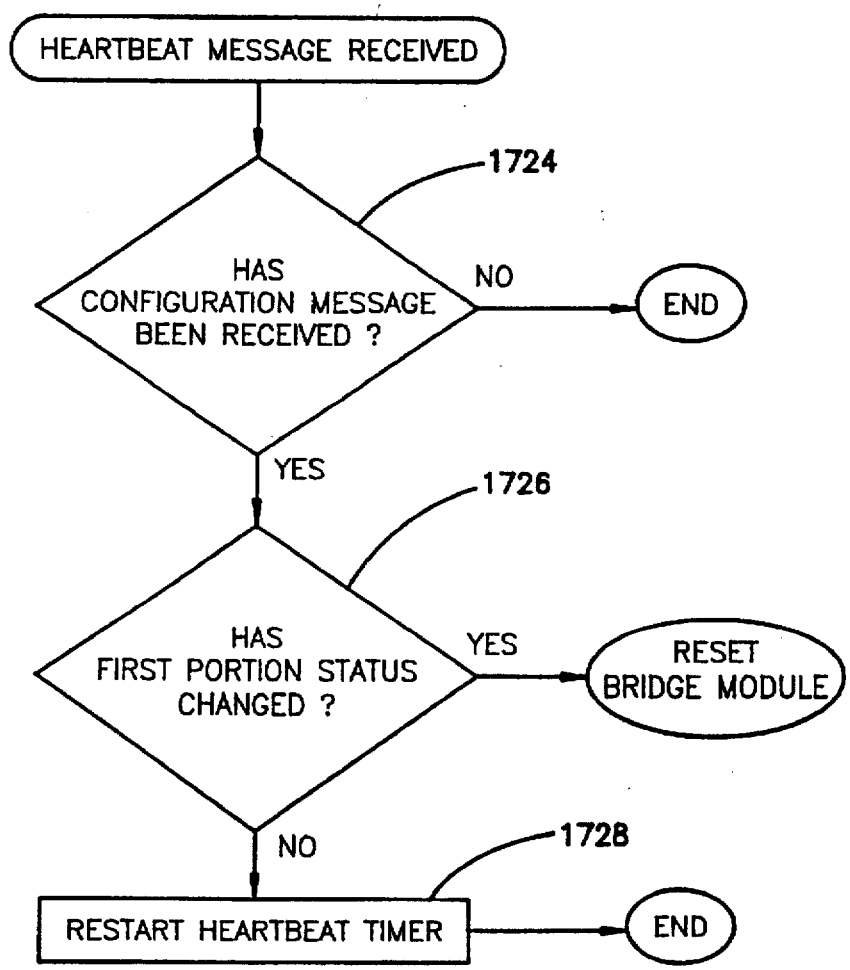
Figure 50:
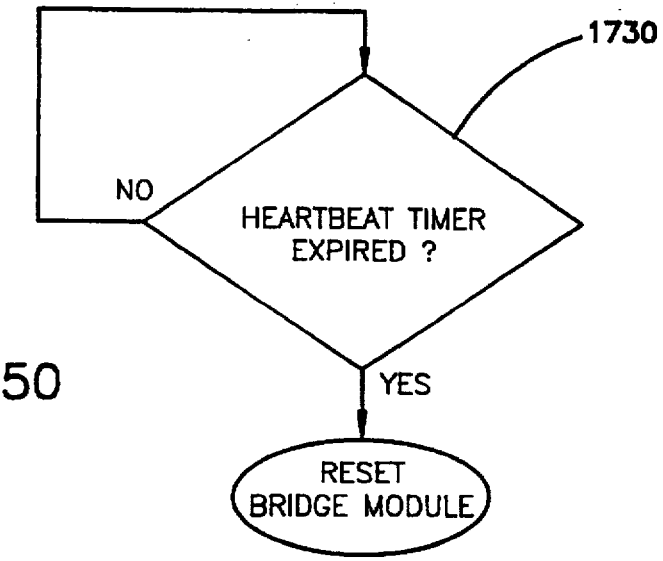
Figure 51:
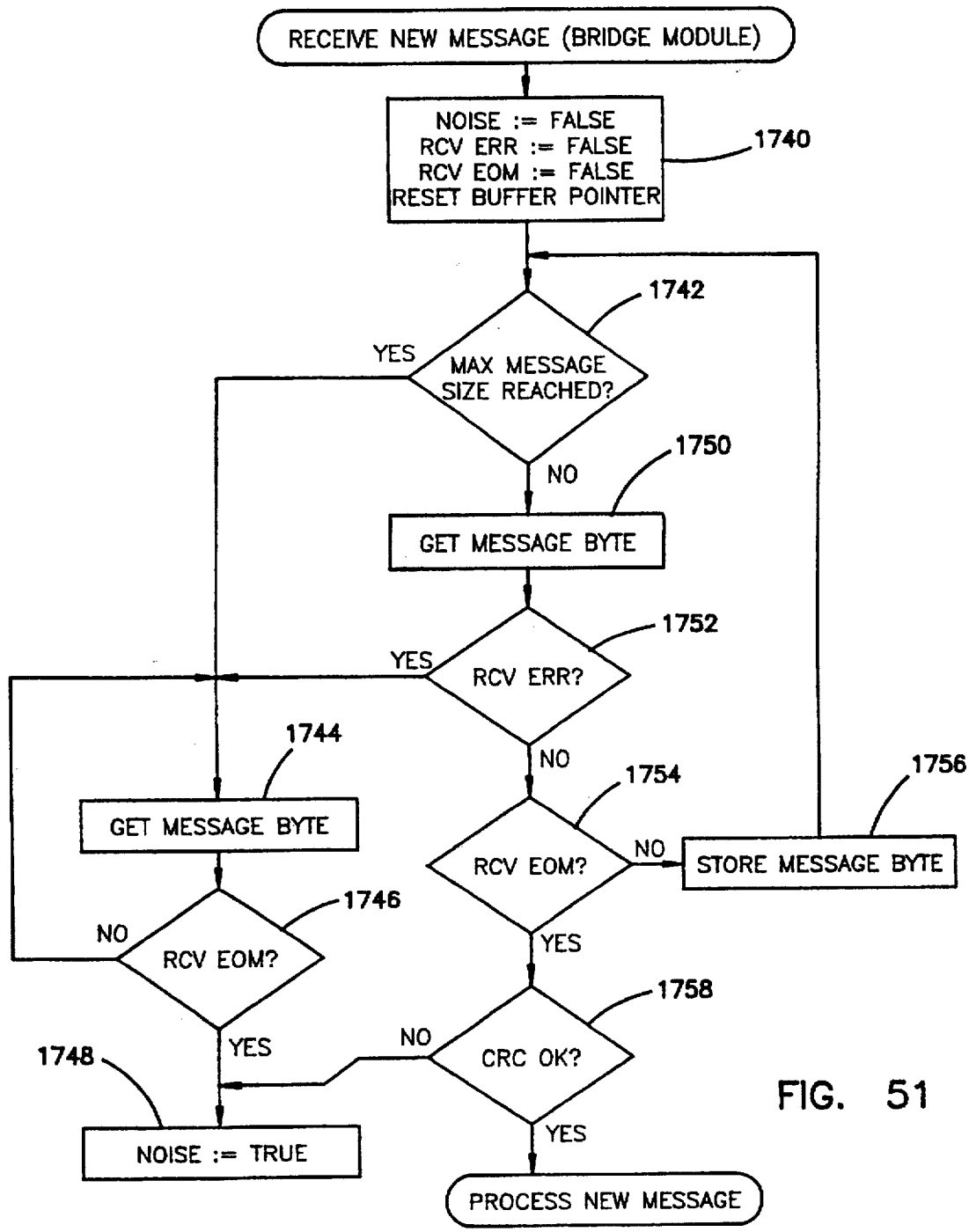

As mentioned above, one function of bridge module 75A (FIGS. 15 and 16) is to monitor the data channel 130 for heartbeat messages. When a heartbeat message is received at the bridge module 75A, microcontroller 165 in the bridge module 75A determines whether a configuration message has been received. If a configuration message has not been received, time program ends. With reference to FIG. 49, if it is determined in decision block 1724 that a configuration message has been received, the program determines whether the first furniture portion of workstation status has changed. If the first furniture portion status has changed, the bridge module 75A is reset. If the first portion of workstation status has not changed, the heartbeat timer is restarted as indicated in block 1728.

The microcontroller 179 includes a heartbeat timer which monitors the data channel 130 to determine whether a heartbeat message is received within a predetermined time period (block 1730 of FIG. 50), which may for example be one-half of a second. If a heartbeat message is not received within one-half of a second after a previous heartbeat message, the microcontroller 179 determines that the heartbeat timer has expired and the bridge module 75A is reset.

To receive a new message (FIG. 51) from the network controller 11, the bridge module 75A uses the same protocol as described above with respect to network controller 11. To receive a message from utility appliances 13-28 on the utility appliances network 37, the bridge module program sets the NOISE flag to false, the RCV ERR flag to false, the RCV EOM flag to false, and resets the buffer pointer, as indicated in block 1740. The program then determines whether the maximum message size has been reached, as indicated in block 1742. If the maximum message size has been reached, the program gets message bytes from the RCV buffer as indicated in block 1744, until the end of message (EOM) is received, as indicated in block 1746. When the EOM is received, the NOISE flag is set to true, as indicated in block 1748. If the maximum message length was not reached, as indicated in block 1742, the program gets a message byte, as indicated in block 1750. The program then checks for a receiver error, as indicated in block 1752. If there is receiver error, the program waits for an end of message in blocks 1744 and 1746, before setting the NOISE flag. If there is no receiver error, the program checks to see if the RCV data is an EOM as indicated in block 1754. If it is an end of message byte, the message byte is stored, as indicated in block 1756, and the program returns to block 1742. If the RCV EOM test is true, as determined in block 1754, a cyclic redundancy check is performed as indicated in block 1758. If the CRC is not okay, the program sets the noise flag in block 1748. If the CRC is okay, the program processes the new message.

Figure 52:
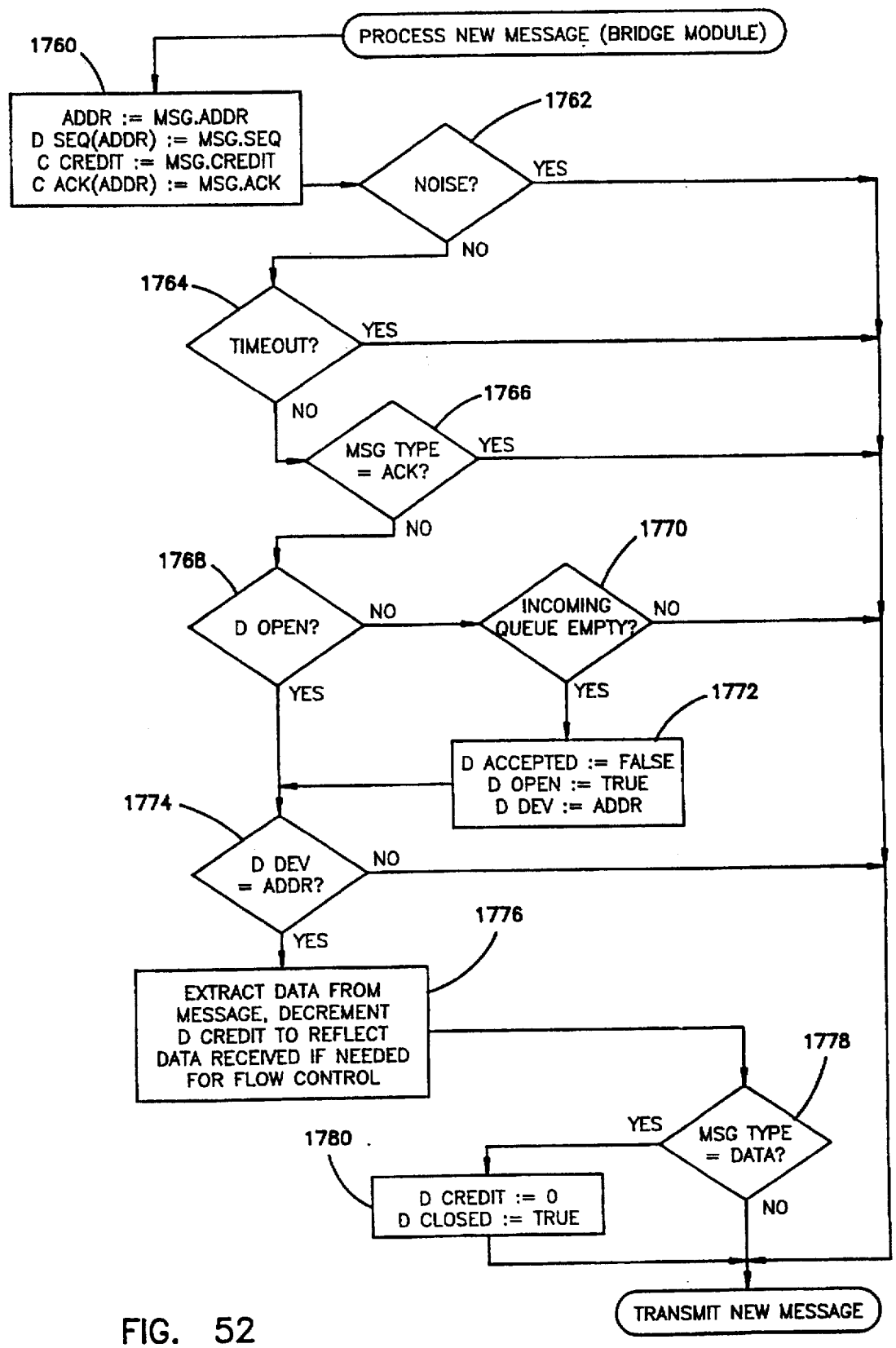

To process a new message in the communication bridge module 75A, as shown in FIG. 52, the microcontroller 165 program sets the ADDR (an address variable) equal to the MSG ADDR (message address), the D SEQ ADDR (utility appliance sequence) equal to the MSG SEQ (message sequence), the network controller credit (C CREDIT) equal to the message credit (MSG CREDIT), and the network controller acknowledge address (C ACK ADDR), equal to message acknowledge (MSG ACK) as indicated in block 1760. The program then determines whether the NOISE flag is true in decision block 1762. If the noise flag is true, the program proceeds to TRANSMIT NEW MESSAGE. If the NOISE flag is not true, the program determines whether a timeout has occurred, as indicated in block 1764. If a timeout has occurred, the program proceeds to the TRANSMIT NEW MESSAGE subroutine. If a timeout has not occurred, the program determines whether the message is an ACK (acknowledgement) message, in decision block 1766. If it is an acknowledgement message, the program proceeds to the TRANSMIT NEW MESSAGE subroutine. If it is not, the program determines whether a virtual circuit is open to the utility appliance, as indicated in block 1768. If a virtual circuit is not open, the program determines whether the incoming queue is empty in decision block 1770. If it is not empty, the program proceeds to the TRANSMIT NEW MESSAGE subroutine. If the incoming queue is empty, the D ACCEPTED flag is set equal to false, the D OPEN flag (utility appliance virtual circuit open) is set to true, and the utility appliance 13–28 is set equal to address variable as indicated in block 1772. The program then determines whether the utility appliance (D DEV) 13–28 is set to the address variable (ADDR.), as indicated in block 1774. If the utility appliance 13–28 does not equal the address variable, the program proceeds to TRANSMIT NEW MESSAGE. If the utility appliance 13–28 equals the address, the program extracts data from the message and decrements D CREDIT to reflect that data is received, if needed for flow control, as indicated in block 1776. The program then determines if the message type (MSG TYPE) is DATA in decision block 1778. If the message type is DATA, the utility appliance credit is set equal to zero, and the D CLOSED flag is set to true, indicating that the utility appliance connection is closed. The subroutine for TRANSMIT NEW MESSAGE is then entered.

Upon reconfiguration, the bridge module 75A must determine the address of all utility appliances 13–28 connected to its utility appliance network 37. To accomplish this, the program looks to a wide range of addresses of the parted face 46, and transmits a configuration message thereto. If the bridge module 75A gets more than one reply, the message is garbled, and is therefore considered to be noise. The program then reduces the number of utility appliances 13–28 it addresses until it gets a clear response from a single utility appliance. The program looks at the other ranges of addresses until all utility appliances 13–28 are configured. In operation, the program repeatedly polls the utility appliances. For example, if stations are at addresses 2, 5 and 6, the bridge module 75A polls the utility appliances at addresses 2, 5, 6, 2, 5, 6, 2, 5, 6, 2, 5, 6, etc. The program conducts a reconfiguration after it has polled utility appliances on the network a predetermined number of times.

Figure 53A:
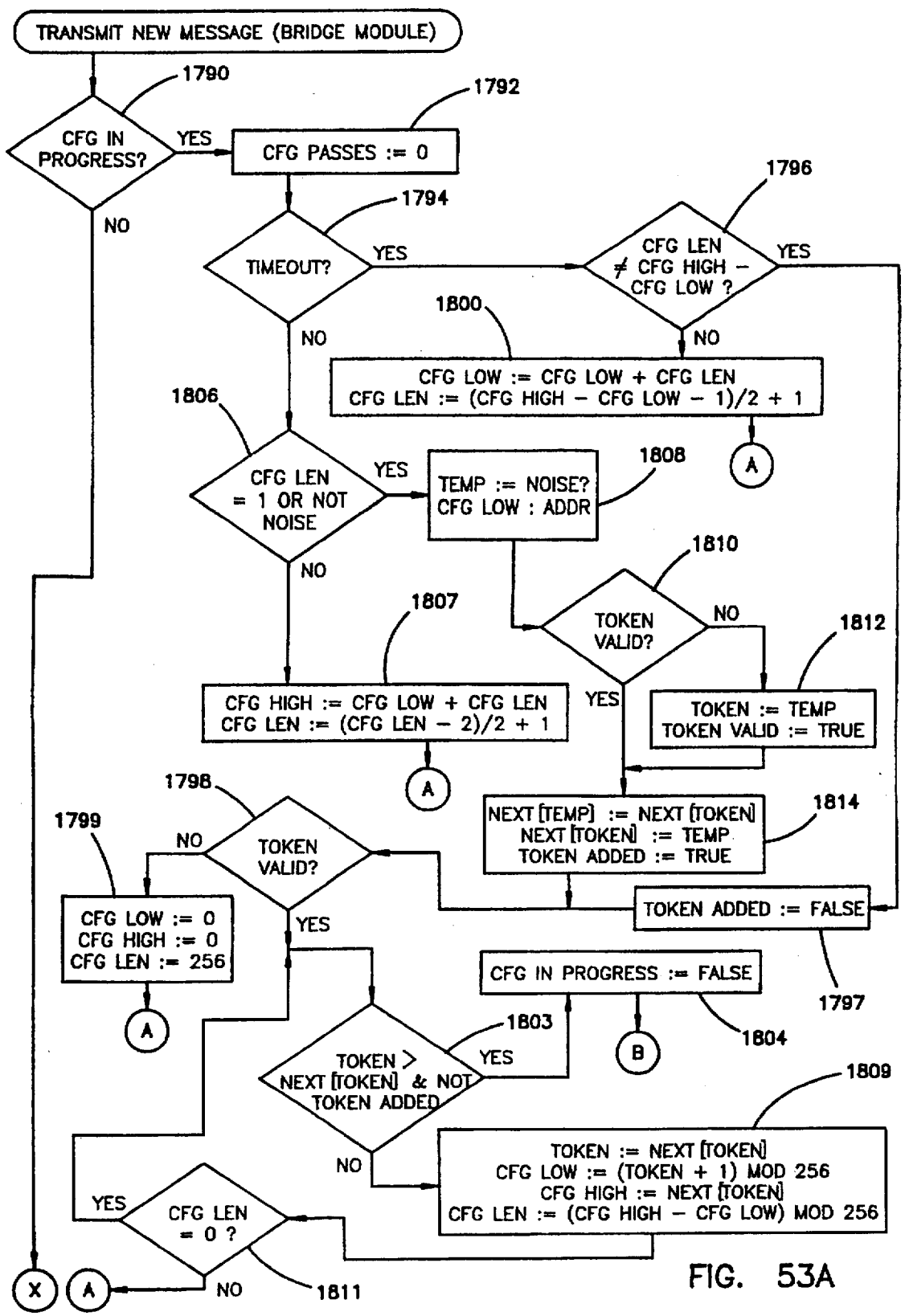

More particularly, the program initially determines if a configuration is in progress in decision block 1790 (FIG. 53A). If a configuration is in progress, the program sets CFG PASSES to zero. CFG PASSES is a count of the number of passes since the last configuration. The program then determines if a timeout has occurred, as indicated in block 1794. If a timeout has occurred, the program determines whether CFG LEN (the number of addresses less one in the range of addresses of utility appliances being polled for configuration) is equal to the high station (the numeric address of the last unconfigured station in the range of unconfigured stations) minus the low station (the numeric address of the first unconfigured station in the range of unconfigured stations), as indicated in block 1796. If the decision is yes, the program sets TOKEN ADDED to false in block 1797, and proceeds to TOKEN VALID decision block 1798. If the decision in block 1796 is no, the program sets CFG LOW (the low address in the range of addresses of utility appliances being polled for configuration) and the CFG LEN, as indicated in block 1800. The program then proceeds to block 1802 (FIG. 53B), and transmits a CONFIG message to the utility appliance network. If a timeout did not occur, as determined in block 1794, the program determines whether the configure length equals one (i.e., there is one utility appliance 13–28 on the network), or the NOISE flag is not set in block 1806. If the decision in block 1806 is yes, then there is exactly one utility appliance 13–28 in the range, and the program sets TEMP equal to CFG LOW, if there is no noise, or it sets TEMP equal to the utility appliance address, as indicated in block 1808. FEMP is a temporary memory location that holds the address of the new utility appliance. The program then determines whether the TOKEN VALID flag is set in decision block 1810. If the TOKEN VALID flag is not set, TOKEN is set equal to the TEMP variable, and the TOKEN VALID flag is set equal to zero, as indicated in block 1812. TOKEN is the address of the utility appliance to which the bridge module 75A is currently talking. Because there is either no noise, or a single utility appliance 13–28, the address is assumed to be valid. The program then sets the NEXT[TEMP] equal to NEXT [TOKEN] (NEXT[TOKEN]) is the next configured utility appliance, (e.g., if TOKEN equals five, NEXT[TOKEN] equals 6), the NEXT[TOKEN] is set equal to the current TEMP, and the program then sets TOKEN ADDED to true, as indicated in block 1814, and proceeds to TOKEN VALID decision block 1798. If decision 1806 is no, the program sets CFG HIGH (high configured address) and CFG LEN, as indicated in block 1807. Block 1807 essentially cuts the configuration length in half each time the program goes through this block. The program then goes to block 1802 to send a CONFIG message. In decision block 1798, the program determines whether the TOKEN VALID flag is set. If it is not set, the program sets CFG LOW to zero, CFG HIGH to zero, and the CFG LEN equal to 256 (i.e., where the system includes 256 addresses, this encompasses all utility appliances on the utility appliance bus), as indicated in block 1799. The program proceeds to block 1803. If the token is valid, the program determines whether TOKEN is greater than NEXT[TOKEN]. If this is true, and if TOKEN ADDED is false, the CFG IN PROGRESS flag is set to false, as indicated in block 1804, and the program proceeds to block 1844 (FIG. 53C). If decision 1803 (FIG. 53A) is no, then TOKEN, CFG LOW, CFG HIGH, and CFG LEN are set, as indicated in block 1809. The program then determines whether the configuration length equals zero in block 181 1. The program continues the cycle through blocks 1803, 1809, and 1811 until the configuration length does not equal zero. When the configuration length does not equal zero, the program goes to block 1802 to transmit a CONFIG message.

Figure 53B:
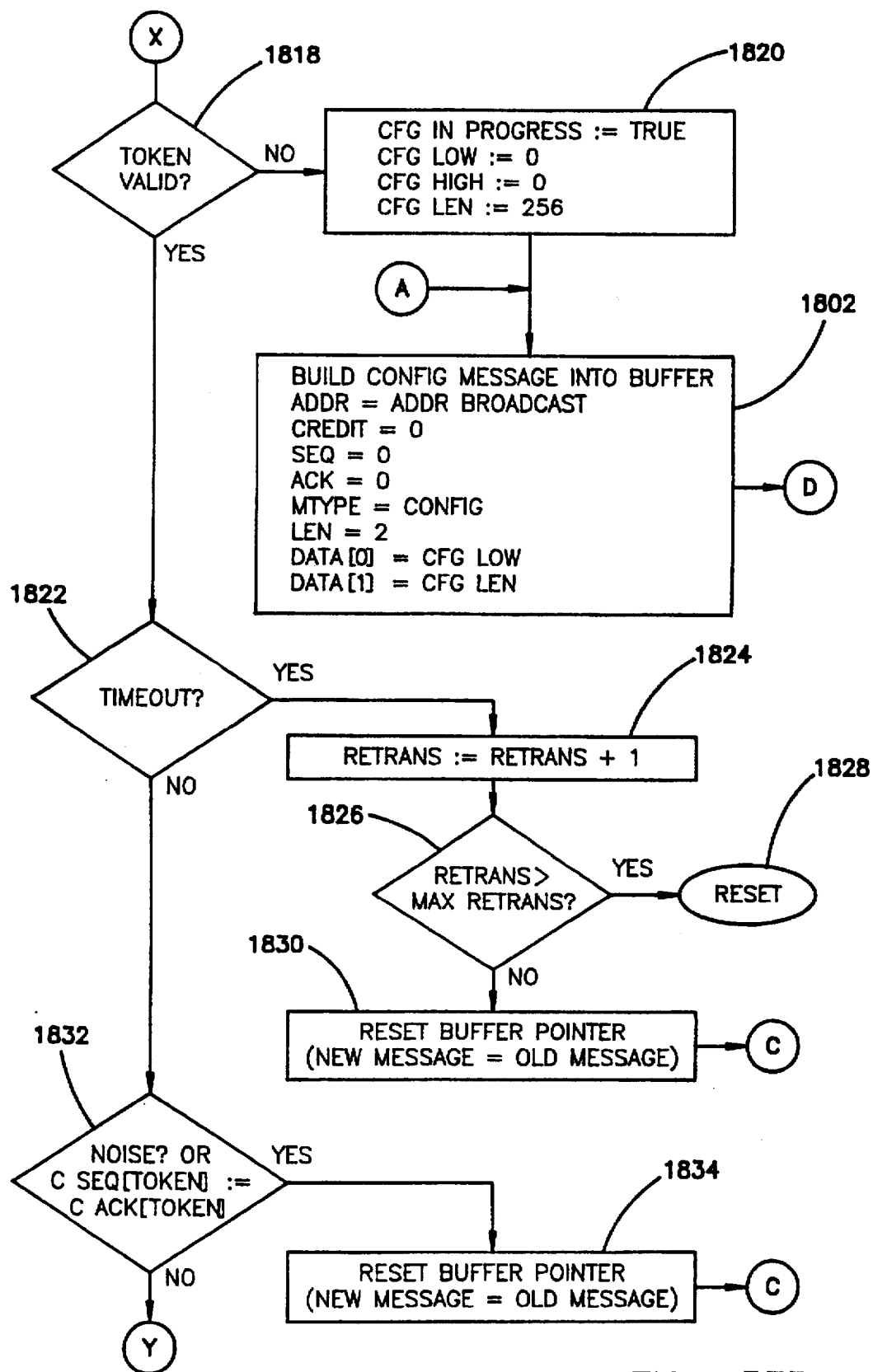
Figure 53C:
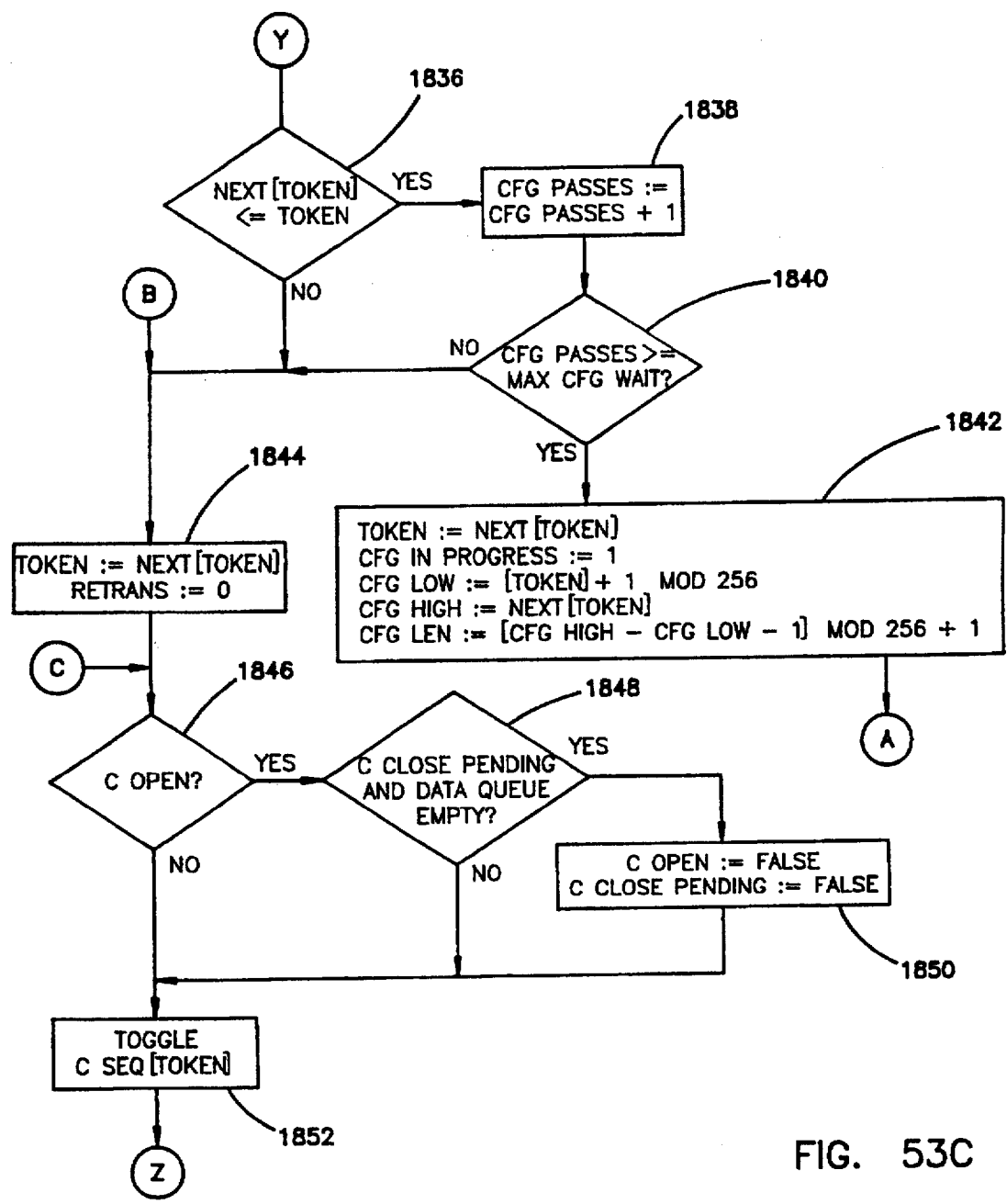

If a configuration was not in progress, as determined in block 1790 (FIG. 53A), the microcontroller 165 program determines whether the TOKEN VALID flag is set in block 1818, as shown in FIG. 53B. If the token is not valid, the program sets CFG IN PROGRESS, CFG LOW, CFG HIGH, and CFG LEN, as indicated in block 1820. The program then builds a configuration message as indicated in block 1802 and sends the message. If the TOKEN VALID is true, the program determines whether a timeout has occurred in decision block 1822. If a timeout has occurred, the program sets the RETRANS to RETRANS+1 as indicated in block 1824. The program then determines whether RETRANS is greater than RETRANS MAX, as indicated in block 1826. If RETRANS is greater than RETRANS MAX, then the bridge module 75A resets, as indicated in block 1828. If the decision in block 1826 is no, the buffer pointer is reset such that new message equals old message, the indicated in block 1830, anti the program goes to block 1846. If a timeout has not occurred, as determined in decision block 1822, the program determines whether noise is present, or network controller SEQ [TOKEN] equals network controller ACK [TOKEN], as indicated in block 1832. If the decision is yes, the program resets the buffer pointer, such that the new message equals the old message, and the program goes to block 1846.

If the decision in block 1832 (FIG. 53B) is no, the microcontroller 165 program determines whether the NEXT [TOKEN] is less than or equal to TOKEN (i.e., a poll cycle is completed). If it is less than or equal to TOKEN, the program increments CFG PASSES as shown in block 1838 of FIG. 53C. The program then determines whether CFG PASSES are greater than or equal to MAX CFG WAIT, as indicated in block 1840. If the decision is yes, indicating that a predetermined number of passes though the transmit new message routine have occurred since configuring the utility appliance network 37, the program sets TOKEN, CFG IN PROGRESS, CFG LOW, CFG HIGH, and CFG LEN in block 1842. Accordingly, the next time through this subroutine, the bridge module 75A will reconfigure the utility appliance network 37. If the decision from either block 1836 or 1840 is no, the program sets the TOKEN equal to NEXT[TOKEN], and RETRANS equal to zero in block 1844. The microcontroller 165 program then determines whether a virtual circuit is open to the network controller 11 in decision block 1846. If the virtual circuit is open, the program determines whether a network controller CLOSE PENDING flag is set and whether the data queue is empty in decision block 1848. If decision 1848 is true, the program closes the virtual circuit by setting the C OPEN flag to false anti the C CLOSE PENDING to false. If the decision in block 1846 or 1848 is no, or following execution of block 1850, the program toggles the network controller DSEQ [TOKEN], as indicated in block 1852.

Figure 53D:
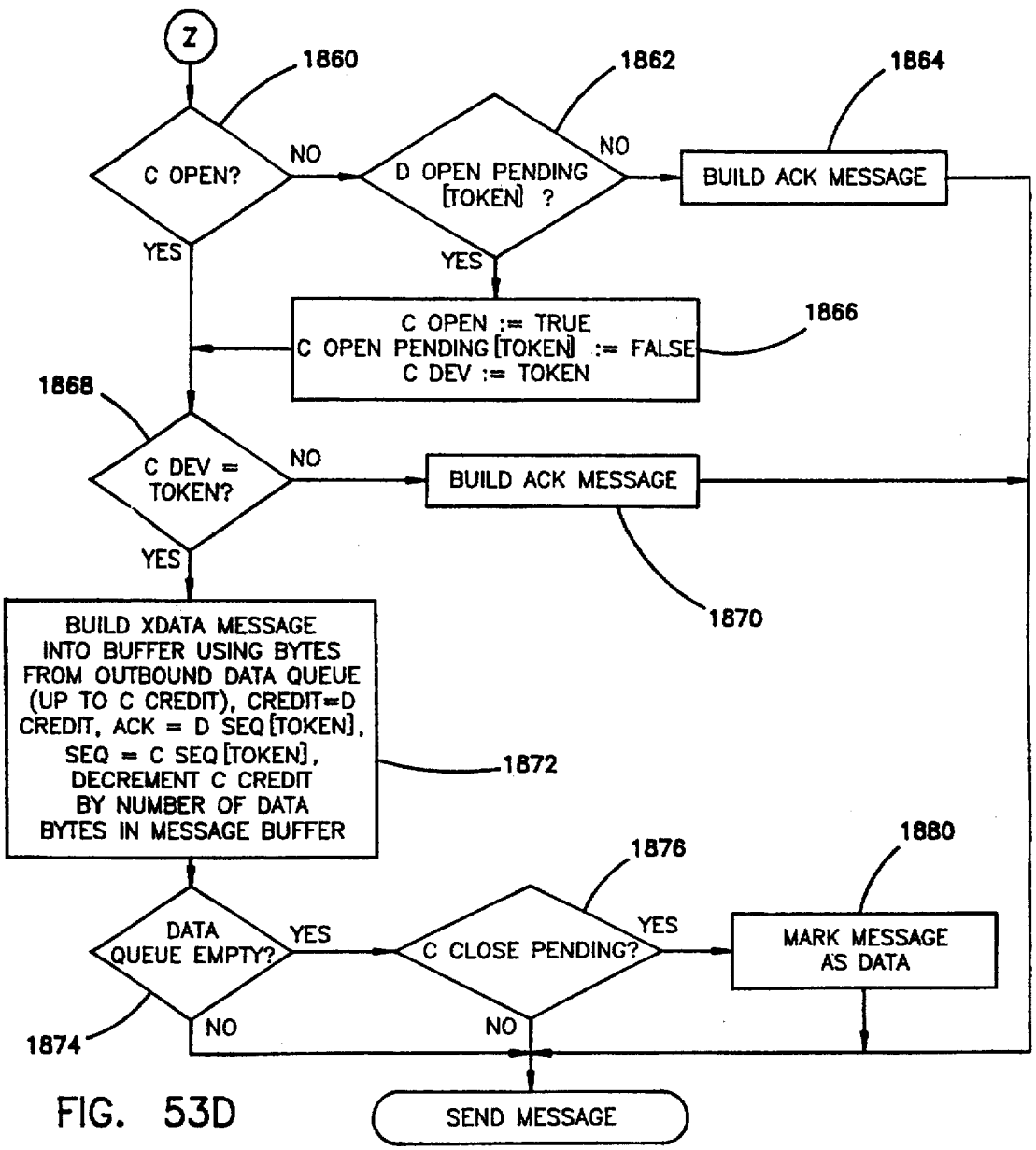

As shown in FIG. 53D, the microcontroller 165 program next determines whether a virtual circuit is open to the network controller 11 in block 1860. If the virtual circuit is not open, the utility appliance network program determines whether the network controller C OPEN PENDING [TOKEN] is set to true in block 1862. If not, the program builds an ACK message and sends the message in block 1864. If there is a network controller C OPEN PENDING, as indicated in decision block 1862, the program sets network controller C OPEN, C OPEN PENDING[TOKEN], and CDEV, as indicated in block 1866. The program then determines whether the network controller 11 has a utility appliance 13-28 address (C DEV) for the open virtual circuit that equals TOKEN, as indicated in does not, that does not, the program builds and sends an ACK message. If the CDEV equals TOKEN, the program builds an extended data message using bytes from the outbound message queue up to the utility appliance credit, the credit is set equal to the utility appliance credit, the acknowledgement is set equal to the utility appliance D SEQ[TOKEN], the sequence is set to the network controller DSEQ[TOKEN] and the network controller 11 credit is decremented by the number of data bytes in the message buffer, as indicated in block 1872. The program then determines whether the data queue is empty as indicated in block 1874. If the data queue is empty, the program determines whether a furniture arrangement network 36 close is pending, as indicated in block 1876. If decisions 1874 or 1876 are no, the program sends the extended data message as it is. If a close is pending, the program marks the message as DATA, as indicated in block 1880, as this is the end of all data.

Figure 54:
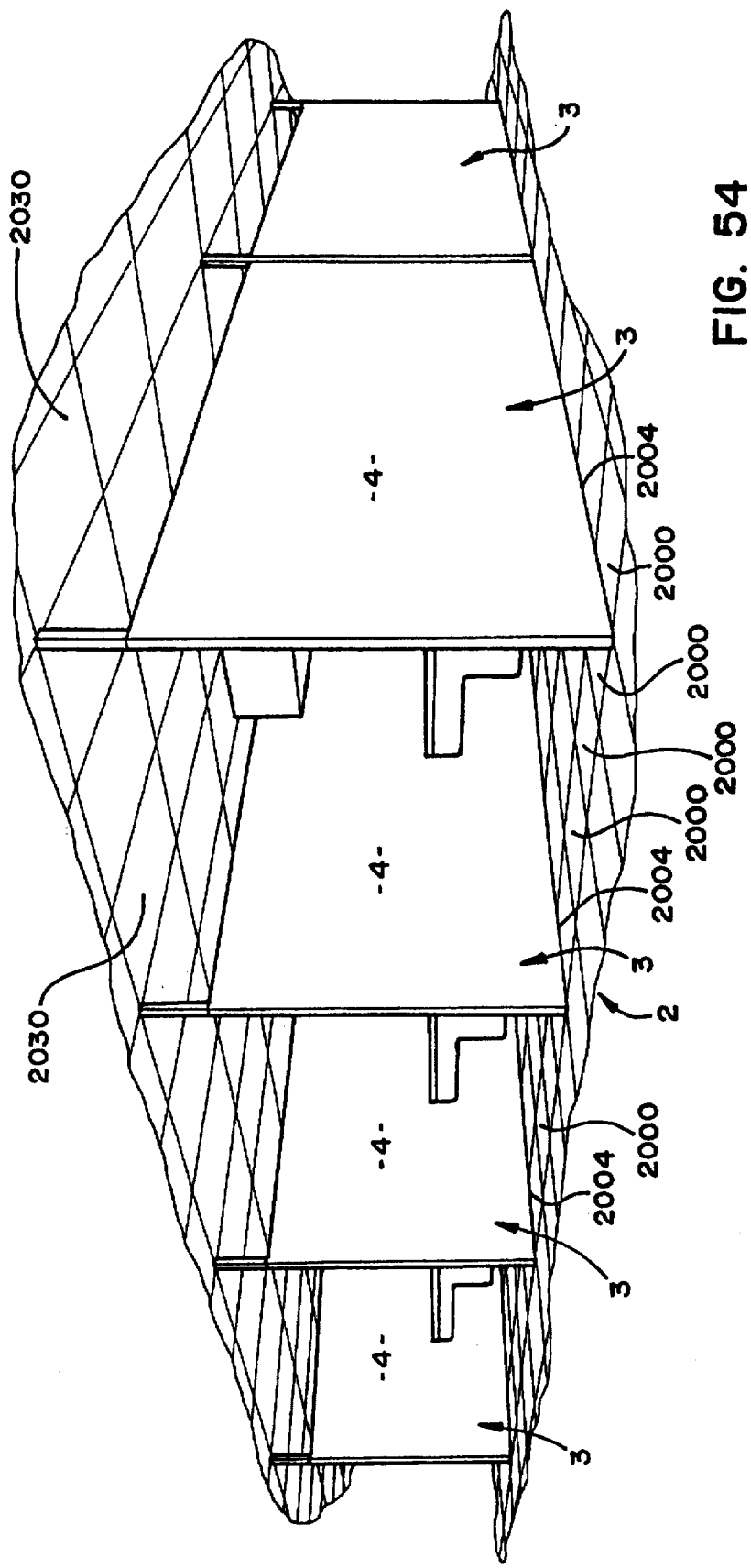
FIG. 54 is a perspective view of a system according to an alternate embodiment of the invention.

The operating system for communications network 8 may also be used in other environments, such as with the floor tiles 2000, the ceiling tiles 2030 and/or the furniture tiles 3 illustrated in FIG. 54. The illustrated floor tiles 2000 are preferably part of a raised floor having electrical access therebelow. The floor tiles 2000 may be provided by any suitable conventional raised floor. The panels 3 are preferably oriented in parallel and aligned with the edges of the floor tiles 2000.

Figure 55:
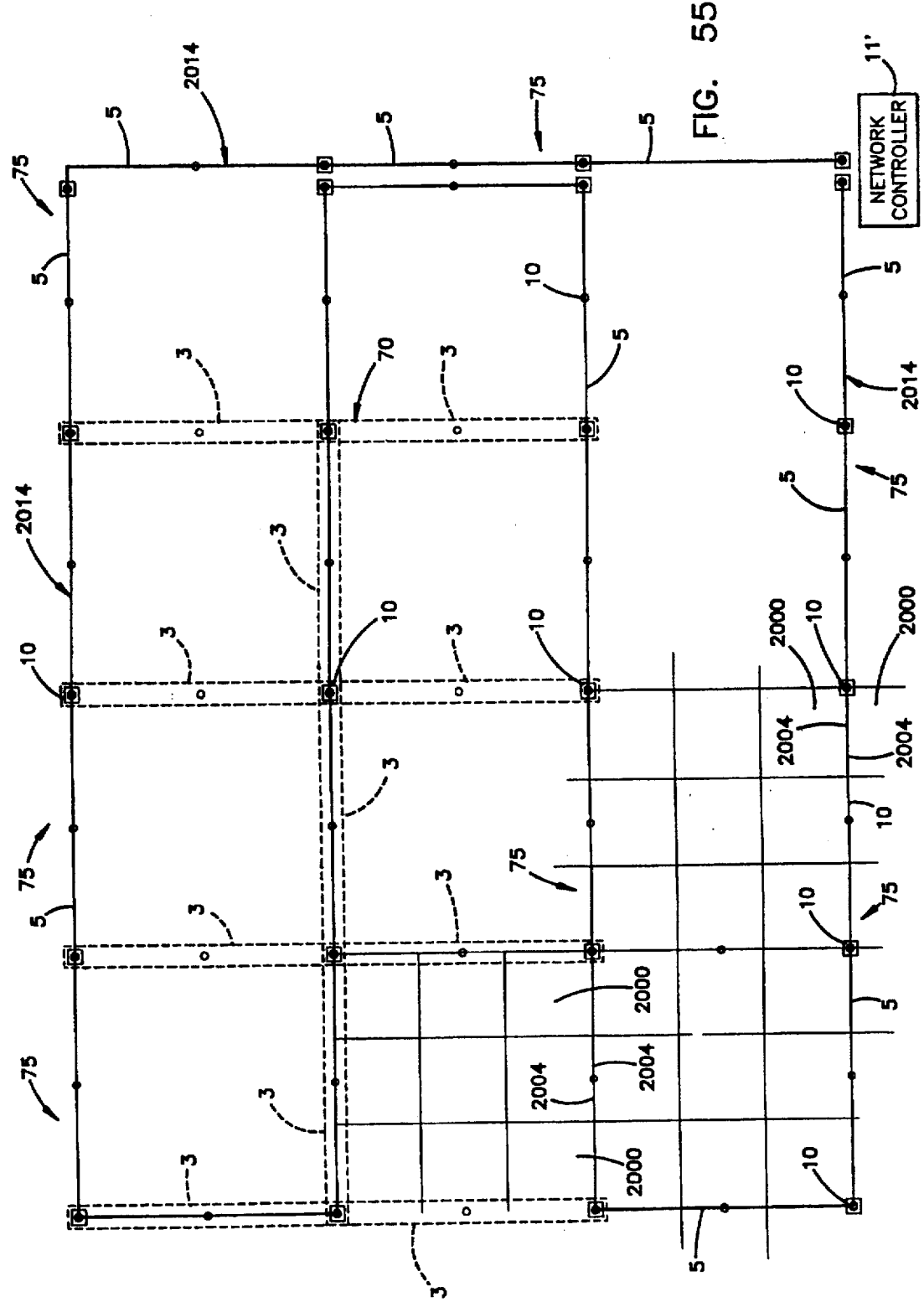
FIG. 55 is a bottom plan view of a grid for the embodiment according to FIG. 54 with a panel system illustrated in phantom.

The the based system may include an electronic network 2014, as illustrated in FIG. 55, which extends below tiles 2000. The network 2014 includes signal conductors 5 (only some of which are numbered) which extend between couplers 10 of communication modules 75. Communication modules 75 are of the same construction as the previously described communication modules 75 illustrated in FIGS. 2, 15 and 16. The signal conductors 5 are connected end-to-end using quick-disconnect connectors 6, 7 (FIG. 3 not shown in FIG. 55) to form a loop with network controller 11. The communication modules 75 are spaced at predetermined locations relative to tiles 2000, such that network controller 11 has a map of their locations. These communication modules 75 each have a unique identification, and a unique physical location in the grid. The unique address may be provided by an IC No. DS 2400 available from Dallas Semiconductor.

The illustrated network 2014 (FIG. 55) is preferably laid out in a predetermined pattern relative to the floor tiles, such that the communication modules 75 are aligned with edges 2004 of tiles 2000. The identification techniques described herein with respect to FIGS. 1–53 are utilized by the floor network controller 11 to determine which communication molecules 75 have an end of panel 3 connected thereto. By identifying the connection points on the network, and identifying physical location of the communication modules 75, the the based system may be used in combination with the network based system of FIGS. 1–53 to create three-dimensional mapping of the electrical utility appliances 13–28 and furniture units 3 within a furniture arrangement 2.

In summary, the network controller 11 (FIG. 1) and the bridge module 75A, as described above, automatically evaluate communications network 8, and more particularly, networks 36 and 37, as described above. This automatic evaluation includes auto-location of: workstations 4 using signalers 9; bridge module 75A on furniture arrangement network 36; utility appliances 13–28 on panel hoes 46; couplers 10; a failure in furniture arrangement network 36; a failure of one or more utility appliances 13–28; and power usage at power outlets 25 and power-in utility appliances 28. The automatic evaluation also includes the ability to automatically identify: the type of utility appliances 13-28 which identity is communicated from the utility appliance ROM to the network controller 11; communication modules 75 using identifier 127 (FIGS. 7, 11); and the "geographic" location of utility appliances 13–28. Additionally automatic evaluation includes automatic configuration of: the bridge modules 75A on furniture arrangement network 36 in sequential order around the network loop; a communication link between utility appliances 13–28 and network controller 11 through a bridge module 75A; utility appliances in a workstation; and binding within workstations 4 and throughout communications network 8.

Utility distribution system 1 provides an efficient and effective arrangement for distributing utilities in a wide variety of different modular furniture arrangements 2, and other similar environments. The prewiring of each of the individual furniture units 3 with signal conductor 5, signaler 9 and quick-disconnect connectors 6 and 7 permits the furniture units 3 to be quickly and easily arranged into the desired workstations 4, and interconnected, so as to form an uninterrupted furniture arrangement network 36 which communicates with network controller 11, and is capable of evaluating the communications network 8 and the furniture units 3. The ported cover panels 46 provide a convenient means to service a wide variety of service utility appliances 13-28, so as to meet the ever-changing needs of even the most advanced knowledge workers. Furniture units 3, as well as the associated utility appliances 13-28 include identifiers and/or operating instructions, which are communicated to the network controller 11 through communications network 8 to evaluate and monitor utility distribution to the various workstations 4, as well as to control the same, such as by power shedding, communication lines switching, and the like. Utility distribution system 1 is also preferably capable of monitoring and controlling physical support equipment, such as lighting, HVAC, security, sound, and other similar environmental accommodations. Thus, furniture units 3 not only have built-in utility capabilities, but the distribution system 1 is able to determine the location of each particular furniture unit 3 in any given furniture system 2, monitor its utility usage, and then control the same, all at a relatively low cost, and readily adaptable fashion, which will function effectively, regardless of where the individual furniture unit 3 is positioned or configured in the furniture system 2.

In the forgoing description, it will be readily perceived by those skilled in the art that modifications may be made without departing from the concepts disclosed herein. Such modifications are to be considered included in the following claims, unless these claims by their language expressly state otherwise.

The embodiments of the invention in which an exclusive property or privilege is claimed are defined as follows:

1. A method of self-configuring a utility distribution system in an office environment, including:
   providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;
   providing a network controller adapted to transmitting control signals to each said communication module and receiving control signals from at least the communication modules associated with said particular ones of said furniture units;
   interconnecting each said communication module and said network controller into a communication network with at least one signal conductor;
   configuring said communication modules according to the physical location of each of said furniture units in the office environment; and
   automatically evaluating said communications network and said furniture units to facilitate the distribution of utilities to the utility appliances by transmitting control signals to said communication modules and receiving control signals from at least the communication modules associated with said particular ones of said furniture units wherein said network controller evaluates said communications network and said furniture units based upon said control signals.

2. The method of claim 1 wherein said evaluating includes identifying the location of furniture units in the communication network.

3. The method of claim 1 wherein said evaluating includes transmitting a periodic message on said signal conductor.

4. The method of claim 1 wherein said evaluating includes receiving operating instruction and operating parameters from said at least one utility appliance.

5. The method of claim 1 further including initializing said communication network after said interconnecting and reinitializing said communication network upon correction of a fault.

6. The method of claim 1 wherein said plurality of furniture units are organized into work spaces including a raised floor and wherein said interconnecting includes extending said at least one signal conductor at least partially below said raised floor.

7. The method of claim 1 wherein said plurality of furniture units are organized into workstations made up at least in part of partition panels and wherein said interconnecting includes extending said at least one signal conductor between opposite lateral edges of said partition panels.

8. The method of claim 1 wherein said communication module is a single physical assembly.

9. The method of claim 1 wherein other ones of said furniture units do not include a said coupler or a said utility appliance.

10. The method of claim 1 wherein said interconnecting includes interconnecting each said communication module and said network controller in a loop.

11. The method of claim 10 including determining if the furniture unit associated with each signaler is positionally the first one of said furniture units in a work space as disposed sequentially about said communication network.

12. The method of claim 10 including checking with each communication module's adjacent communication module to determine if said adjacent communication module is operational.

13. The method of claim 10 including transmitting a periodic message with said network controller and passing said periodic message with each signaler in order to determine breaks in said loop.

14. A method of self-configuring a utility distribution system in an office environment, including:
   providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;
   providing a network controller adapted to transmitting control signals to each said communication module and receiving control signals from at least the communication modules associated with said particular ones of said furniture units;
   interconnecting each said communication module and said network controller into a communication network with at least one signal conductor;
   configuring said communication modules according to the physical location of each of said furniture units in the office environment; and
   evaluating said communications network and said furniture units to facilitate the distribution of utilities to the utility appliances by transmitting control signals to said communication modules and receiving control signals from at least the communication modules associated with said particular ones of said furniture units, wherein said evaluating includes identifying the physical location of said at least one utility appliance with respect to the respective furniture unit.

15. A method of self-configuring a utility distribution system in an office environment, including:

providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;

providing a network controller adapted to transmitting control signals to each said communication module and receiving control signals from at least the communication modules associated with said particular ones of said furniture units;

interconnecting each said communication module and said network controller into a communication network with at least one signal conductor;

configuring said communication modules according to the physical location of each of said furniture units in the office environment; and evaluating said communications network and said furniture units to facilitate the distribution of utilities to the utility appliances by transmitting control signals to said communication modules and receiving control signals from at least the communication modules associated with said particular ones of said furniture units, wherein particular ones of said signalers include a portion-of-work space identification mechanism to positionally associate a plurality of said furniture units within a given work space.

16. A method of self-configuring a utility distribution system in an office environment, including:

providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;

providing a network controller adapted to transmitting control signals to each said communication module and receiving control signals from at least the communication modules associated with said particular ones of said furniture units;

interconnecting each said communication module and said network controller into a communication network with at least one signal conductor;

configuring said communication modules according to the physical location of each of said furniture units in the office environment; and evaluating said communications network and said furniture units to facilitate the distribution of utilities to the utility appliances by transmitting control signals to said communication modules and receiving control signals from at least the communication modules associated with said particular ones of said furniture units, further including providing an identification module with each furniture unit to assist in identification of that furniture unit.

17. A method of associating a utility distribution system to a physical space in an office environment, including:

providing a plurality of furniture units organized into work spaces, particular ones of said furniture units including a utility appliance network including a plurality of utility appliances for distributing utilities to one of said work spaces and a utility appliance controller;

providing a network controller adapted to make determinations for controlling said utility appliances;

providing a communication network for communicatively interconnecting said utility appliance networks with said network controller;

determining with the respective said utility appliance controller a physical location of each said utility appliance with respect to the respective furniture unit;

communicating data including said physical location of each utility appliance from each utility appliance controller to said network controller on said communication network; and providing correspondence in said network controller between a logical address for each said utility appliance and the physical location of that utility appliance using said data communicated from said utility appliance controllers.

18. The method of claim 17 further including joining each said utility appliance network to said communication network with a communication bridge.

19. The method of claim 17 wherein said determining the physical location of each utility appliance includes providing a port for each utility appliance and providing each said port with an address associated with a physical location on the respective furniture unit.

20. The method of claim 19 wherein said providing each said port with an address includes providing a cable having multiple conductors and interconnecting each said port with a different combination of said conductors.

21. The method of claim 19 wherein each said utility appliance includes a storage element storing control routines which are transmitted to said network controller.

22. The method of claim 17 wherein each said utility appliance includes a storage element storing control routines which are transmitted to said network controller.

23. The method of claim 19 wherein said correspondence includes a hierarchical organization of said utility appliances.

24. The method of claim 23 wherein said hierarchical organization includes grouping utility appliances according to respective furniture units.

25. The method of claim 24 wherein said hierarchical organization further includes grouping furniture units into respective work spaces.

26. The method of claim 17 further including associating particular ones of said utility appliances together for mutual operation thereof.

27. The method of claim 26 wherein said associating includes providing multiple position selector switches with each of said utility appliances, wherein utility appliances having selector switches set to the same position are associated.

28. The method of claim 19 wherein said work space is a workstation and said furniture units are partition panels defining said workstations.

29. The method of claim 17 wherein said communication module is a single physical assembly.

30. The method of claim 17 wherein other ones of said furniture units do not include a said utility appliance network.

31. The method of claim 17 wherein particular ones of said signalers include a portion-of-work space identification mechanism to positionally associate a plurality of said furniture units within a given work space.

32. A method of installing a utility distribution system in an office space, including:

providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;

physically arranging said furniture units in the office space in a pattern that defines a plurality of work spaces;

providing a network controller adapted to transmitting control signals to each said communication module and receiving control signals from the communication modules associated with said particular ones of said furniture units;

interconnecting said communication modules with each other and with said network controller in a communication network with at least one signal conductor; and identifying a physical relationship between signalers in said communication network and said pattern of furniture units in order to establish correspondence between said communication network and furniture units, wherein said identifying includes identifying the physical location of said at least one utility appliance with respect to the respective furniture unit.

33. The method of claim 32 wherein said determining the physical location of each utility appliance includes providing a port for each utility appliance and providing each said port with an address associated with a physical location on the respective furniture unit.

34. The method of claim 33 wherein said providing each said port with an address includes providing a cable having multiple conductors and interconnecting each said port with a different combination of conductors.

35. A method of installing a utility distribution system in an office space, including:

providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;

physically arranging said furniture units in the office space in a pattern that defines a plurality of work spaces;

providing a network controller adapted to transmitting control signals to each said communication module and receiving control signals from the communication modules associated with said particular ones of said furniture units;

interconnecting said communication modules with each other and with said network controller in a communication network with at least one signal conductor; and automatically identifying a physical relationship between signalers in said communication network and said pattern of furniture units in order to establish correspondence between said communication network and furniture units based upon information the network controller receives from said signalers.

36. The method of claim 35 wherein said identifying includes transmitting a periodic message on said signal conductor.

37. The method of claim 35 further including receiving operating instruction and operating parameters from utility appliances in the communications network.

38. The method of claim 35 further including initializing said communication network after said interconnecting and reinitializing said communication network upon correction of a fault.

39. The method of claim 35 wherein said plurality of furniture units are organized into work spaces including a raised floor and wherein said interconnecting includes extending said at least one signal conductor at least partially below said raised floor.

40. The method of claim 35 wherein said plurality of furniture units are organized into workstations made up at least in part of partition panels and wherein said interconnecting includes extending said at least one signal conductor between opposite lateral edges of said partition panels.

41. The method of claim 35 wherein said communication module is a single physical assembly.

42. The method of claim 35 wherein other ones of said furniture units do not include a said coupler or a said utility appliance.

43. The method of claim 35 wherein said interconnecting includes interconnecting each said communication module and said network controller in a loop.

44. The method of claim 43 including determining if the furniture unit associated with each signaler is positionally the first one of said furniture units in a work space as disposed sequentially about said communication network.

45. The method of claim 43 including checking with each communication module's adjacent communication module to determine if said adjacent communication module is operational.

46. The method of claim 43 including transmitting a periodic message with said network controller and passing said periodic message with each signaler in order to determine breaks in said loop.

47. A method of installing a utility distribution system in an office space, including:

providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;

physically arranging said furniture units in the office space in a pattern that defines a plurality of work spaces;

providing a network controller adapted to transmitting control signals to each said communication module and receiving control signals from the communication modules associated with said particular ones of said furniture units;

interconnecting said communication modules with each other and with said network controller in a communication network with at least one signal conductor; and identifying a physical relationship between signalers in said communication network and said pattern of furniture units in order to establish correspondence between said communication network and furniture units, wherein particular ones of said signalers include a portion-of-work space identification mechanism to positionally associate a plurality of said furniture units within a given work space.

48. A method of installing a utility distribution system in an office space, including:

providing a plurality of furniture units, each furniture unit having a communication module including a signaler physically associated with that furniture unit, particular ones of said furniture units further including a coupler in the associated communication module connected with said signaler and at least one utility appliance connected with said coupler for distributing utilities;

physically arranging said furniture units in the office space in a pattern that defines a plurality of work spaces;

providing a network controller adapted to transmitting control signals to each said communication module and receiving control signals from the communication modules associated with said particular ones of said furniture units;

interconnecting said communication modules with each other and with said network controller in a communication network with at least one signal conductor; and identifying a physical relationship between signalers in said communication network and said pattern of furniture units in order to establish correspondence between said communication network and furniture units, further including providing an identification module with each furniture unit to assist in identification of that furniture unit.

49. The method of claim 1, wherein said plurality of furniture units include modular furniture units.

50. The method of claim 49, wherein said modular furniture units include portable furniture units.

51. The method of claim 50, wherein said portable furniture units include portable partition panels.

52. The method of claim 1, wherein said plurality of furniture units include portable furniture units.

53. The method of claim 17, wherein said plurality of furniture units include modular furniture units.

54. The method of claim 53, wherein said modular furniture units include portable furniture units.

55. The method of claim 54, wherein said portable furniture units include portable partition panels.

56. The method of claim 17, wherein said plurality of furniture units include portable furniture units.

57. The method of claim 35, wherein said plurality of furniture units include modular furniture units.

58. The method of claim 57, wherein said modular furniture units include portable furniture units.

59. The method of claim 58, wherein said portable furniture units include portable partition panels.

60. The method of claim 35, wherein said plurality of furniture units include portable furniture units.

* * * * *

UNITED STATES PATENT AND TRADEMARK OFFICE
CERTIFICATE OF CORRECTION

PATENT NO. : 5,684,469  
DATED : November 4, 1997  
INVENTOR(S) : John S. Toms et al.

It is certified that error appears in the above-identified patent and that said Letters Patent is hereby corrected as shown below:

Column 4, line 9, "or" should be --of--.

Column 15, line 29, "1531" should be --131--.

Column 17, line 46, after "information" insert --for--.

Column 20, line 23, after "Varister" insert --(MOV).--.

Column 20, line 33, "272-271" should be --272-274--.

Column 27, line 58, "eluent" should be --current--.

Column 28, line 65, after "circuit," insert --communication--.

Column 30, line 5, "frown" should be --from--.

Column 30, line 50, "reset." should be --msec.--.

Column 30, line 51, "tile" should be --the--.

Column 31, line 61, "dosed" should be --closed--.

Column 32, line 11, "chapel" should be --channel--.

Column 35, line 2, "oft" should be --on--.

Column 36, line 35, "CHP" should be --CLIP--.

Column 38, line 41, "art" should be --an--.

UNITED STATES PATENT AND TRADEMARK OFFICE
CERTIFICATE OF CORRECTION

PATENT NO. : 5,684,469
DATED : November 4, 1997
INVENTOR(S) : John S. Toms et al.

It is certified that error appears in the above-identified patent and that said Letters Patent is hereby corrected as shown below:

Column 38, line 42, "mid" should be --and--.

Column 39, line 32, "arid" should be --and--.

Column 39, line 47, "arid" should be --and--.

Column 39, line 48, "tile" should be --the--.

Column 40, line 39, "stains" should be --status--.

Column 40, line 44, "dosed" should be --closed--.

Column 41, line 10, "ADD TO" should be --ADDR--.

Column 41, line 58, "cheeks" should be --checks--.

Column 42, line 11, "time" should be --the--.

Column 42, line 52, "cheek" should be --check--.

Column 43, line 36, "of the parted" should be --on the panel--.

Column 44, line 12, "FEMP" should be --TEMP--.

Column 45, line 1, "the" should be --as--.

Column 45, line 2, "anti" should be --and--.

Column 45, line 34, "anti" should be --and--.

UNITED STATES PATENT AND TRADEMARK OFFICE
CERTIFICATE OF CORRECTION

PATENT NO. : 5,684,469
DATED : November 4, 1997
INVENTOR(S) : John S. Toms et al.

It is certified that error appears in the above-identified patent and that said Letters Patent is hereby corrected as shown below:

Column 45, lines 51-52, "does not, that does not," should be --block 1868. If it does not,--.

Column 46, line 10, "the" (second occurrence) should be --tile--.

Column 46, line 33, "molecules" should be --modules--.

Column 46, line 36, "the the" should be --the tile--.

Column 46, line 47, "hoes" should be --faces--.

Column 50, claim 28, line 59, "claim 19" should be --claim 17--.

Column 50, claim 23, line 42, "claim 19" should be --claim 17--.

Signed and Sealed this

Nineteenth Day of May, 1998

Attest:

BRUCE LEHMAN

*Attesting Officer*   *Commissioner of Patents and Trademarks*